(12) United States Patent
McCarthy

(10) Patent No.: US 7,785,514 B2
(45) Date of Patent: Aug. 31, 2010

(54) SNORKELS, FLEXIBLE TUBES, MOUTHPIECES AND METHODS

(76) Inventor: Peter T. McCarthy, 2109 Spyglass Trail West, Oxnard, CA (US) 93036

( * ) Notice: Subject to any disclaimer, the term of this patent is extended or adjusted under 35 U.S.C. 154(b) by 636 days.

(21) Appl. No.: 11/804,117

(22) Filed: May 17, 2007

(65) Prior Publication Data

US 2007/0267012 A1 Nov. 22, 2007

Related U.S. Application Data

(60) Provisional application No. 60/801,976, filed on May 18, 2006, provisional application No. 60/801,977, filed on May 18, 2006, provisional application No. 60/810,608, filed on Jun. 2, 2006.

(51) Int. Cl.
  *B29C 39/12* (2006.01)
  *B29C 65/00* (2006.01)
  *B29C 45/00* (2006.01)

(52) U.S. Cl. .............. 264/245; 264/248; 264/267; 264/328.1; 264/328.8

(58) Field of Classification Search ............... 264/251, 264/255, 261, 266, 267, 328.1, 328.7, 328.8, 264/328.11, 328.12, 328.13, 245, 256, 247, 264/248, 250, 328.18, 26; 128/201.11, 201.27; 138/121, 122
See application file for complete search history.

(56) References Cited

U.S. PATENT DOCUMENTS

| | | | |
|---|---|---|---|
| 3,844,281 A | 10/1974 | Shamlian | |
| 3,885,594 A | 5/1975 | Tanaka | |
| 3,993,060 A | 11/1976 | Mitchell | |
| 4,465,330 A * | 8/1984 | De Cenzo | ............ 439/92 |
| 4,587,145 A | 5/1986 | Kanao | |
| 4,613,389 A | 9/1986 | Tanaka | |

(Continued)

FOREIGN PATENT DOCUMENTS

WO   WO 9635069 A1 * 11/1996

OTHER PUBLICATIONS

Atomic Aquatics diving mouthpiece (picture), $1^{st}$ production approximately 2004.

*Primary Examiner*—Joseph S Del Sole
*Assistant Examiner*—Ryan Ochylski

(57) ABSTRACT

Methods are disclosed for designing improved flexible tubes and production methods which have improved flexibility and resistance to collapsing under load or during bending. Methods for injection molding a flexible tube (2) and providing at least one support member (4) that is arranged to provide improved lateral support to reduce lateral collapsing of the flexible tube (2). Methods for using and fabricating flexible tubes (2) are also provided for various shapes of support members (4) including annular ribs, helical ribs, spaced apart coils (128), narrow ribs, wide supports, as well as for various cross sectional shapes of flexible tubes (2), including streamlined elongated hydrofoil shaped cross sectional shapes relative to the longitudinal axis of flex tube (2). Methods and designs are disclosed for providing an improved diving mouthpiece (14) used for diving snorkels or other underwater breathing equipment which can reduce jaw fatigue, reduce chaffing to the soft tissues of the mouth and provide increased structural integrity. Methods are provided for reducing collapsing of the mouthpiece (30) around a transverse axis under load created during use. Molding methods and designs are also disclosed for reducing material costs, material weight, fabrication time, manufacturing costs and improving function, structure and/or styling for diving mouthpieces (14). Other methods also disclosed.

36 Claims, 30 Drawing Sheets

U.S. PATENT DOCUMENTS

| | | | |
|---|---|---|---|
| 4,860,739 A | | 8/1989 | Vandepol |
| 4,862,903 A | | 9/1989 | Campbell |
| 4,928,710 A | * | 5/1990 | Campbell ................... 128/861 |
| 5,199,422 A | * | 4/1993 | Rasocha ................ 128/201.11 |
| 5,267,556 A | * | 12/1993 | Feng ..................... 128/201.11 |
| 5,305,741 A | * | 4/1994 | Moles .................. 128/207.14 |
| 5,305,800 A | | 4/1994 | Kolberg |
| 5,358,580 A | | 10/1994 | Miyamura et al. |
| 5,443,098 A | * | 8/1995 | Kertesz ...................... 138/109 |
| 5,568,944 A | * | 10/1996 | Kawasaki .................. 285/21.1 |
| 5,622,165 A | * | 4/1997 | Huang ................... 128/201.11 |
| 5,700,493 A | * | 12/1997 | Scarazzo et al. ............ 425/116 |
| 5,701,885 A | * | 12/1997 | Hale ................... 128/201.26 |
| 5,829,432 A | * | 11/1998 | Semeia ................. 128/201.27 |
| 5,845,635 A | * | 12/1998 | Hermansen et al. .... 128/201.11 |
| 5,865,170 A | | 2/1999 | Moles |
| 5,901,754 A | * | 5/1999 | Elsasser et al. ............. 138/118 |
| 5,937,850 A | * | 8/1999 | Kawashima et al. ... 128/201.11 |
| 5,944,929 A | | 8/1999 | Vallauri et al. |
| 6,073,626 A | | 6/2000 | Riffe |
| 6,079,410 A | | 6/2000 | Winefordner et al. |
| 6,079,411 A | * | 6/2000 | Garofalo ................. 128/201.27 |
| 6,085,744 A | * | 7/2000 | Hermansen et al. .... 128/201.11 |
| 6,161,591 A | * | 12/2000 | Winter et al. ............... 138/121 |
| 6,202,644 B1 | * | 3/2001 | Takeuchi et al. ....... 128/201.11 |
| 6,244,303 B1 | | 6/2001 | Adams |
| 6,305,371 B1 | * | 10/2001 | Frid et al. .............. 128/203.12 |
| 6,306,235 B1 | | 10/2001 | Henderson |
| 6,394,145 B1 | * | 5/2002 | Bailly ........................ 138/129 |
| 6,450,205 B1 | * | 9/2002 | Check ........................ 138/116 |
| 6,478,024 B1 | * | 11/2002 | White, Jr. .............. 128/201.11 |
| 6,537,484 B2 | * | 3/2003 | Nakagawa et al. .......... 264/513 |
| 6,666,233 B1 | * | 12/2003 | Sorkin ........................ 138/121 |
| 6,722,708 B2 | * | 4/2004 | Morohoshi et al. .......... 285/423 |
| 7,089,929 B1 | * | 8/2006 | Feng ..................... 128/201.11 |
| 7,678,324 B2 | * | 3/2010 | Nakagawa et al. .......... 264/534 |
| 2002/0017331 A1 | * | 2/2002 | Renaud ...................... 138/121 |
| 2002/0026939 A1 | * | 3/2002 | Silvestri ................ 128/201.11 |
| 2002/0132713 A1 | * | 9/2002 | Lerch et al. .................... 492/19 |
| 2003/0041400 A1 | * | 3/2003 | Knapp ..................... 15/104.061 |
| 2004/0041302 A1 | * | 3/2004 | Siferd et al. ................. 264/295 |
| 2004/0079366 A1 | * | 4/2004 | Kawashima et al. ... 128/201.11 |
| 2004/0211413 A1 | * | 10/2004 | Monnich ............... 128/201.11 |
| 2005/0071915 A1 | * | 4/2005 | Hawley et al. ................. 4/581 |
| 2005/0268906 A1 | * | 12/2005 | Mix ..................... 128/201.11 |
| 2006/0254663 A1 | * | 11/2006 | Renaud ...................... 138/121 |
| 2008/0053435 A1 | * | 3/2008 | Pan ...................... 128/201.11 |
| 2008/0314381 A1 | * | 12/2008 | Garraffa ................ 128/201.11 |

\* cited by examiner

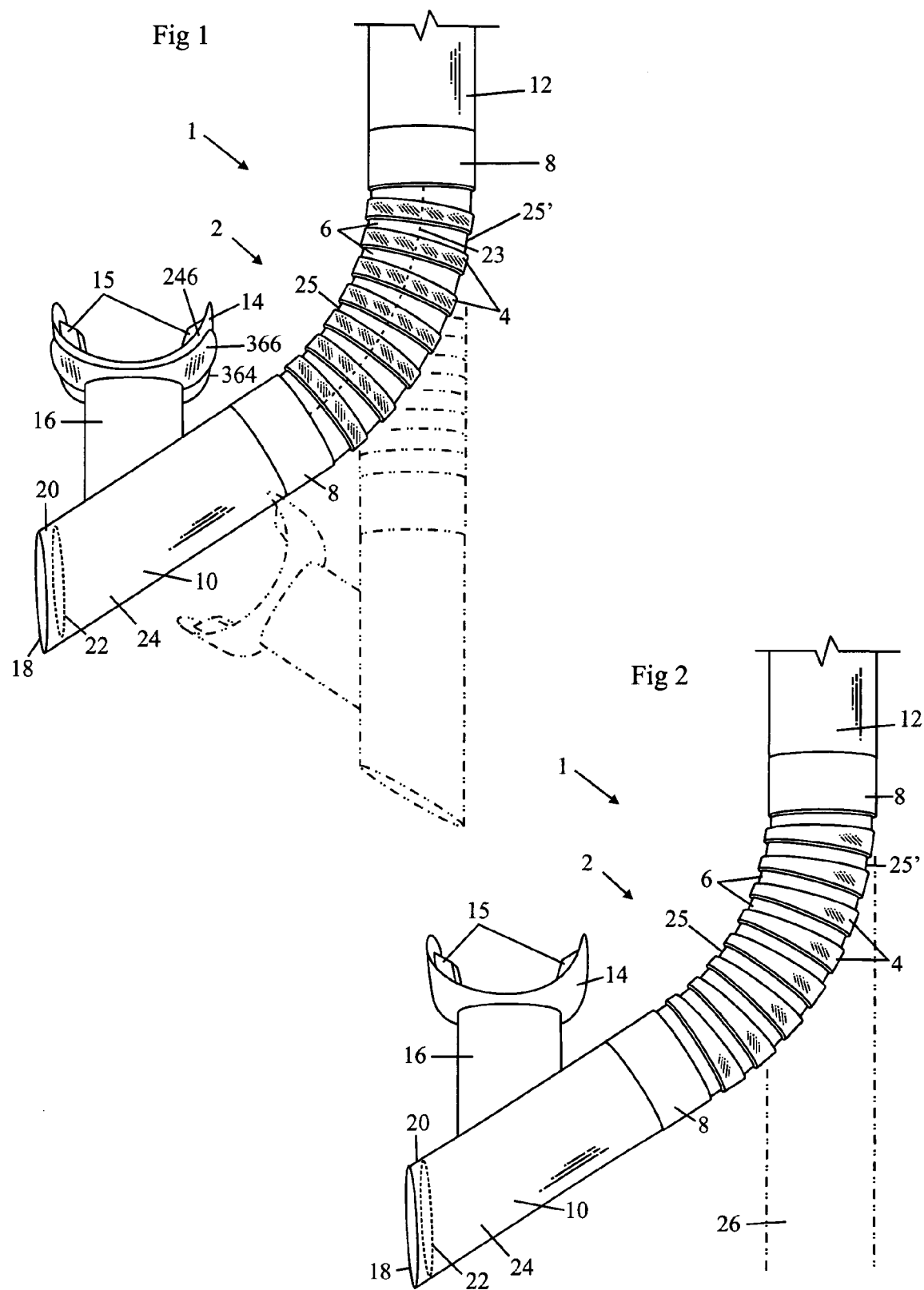

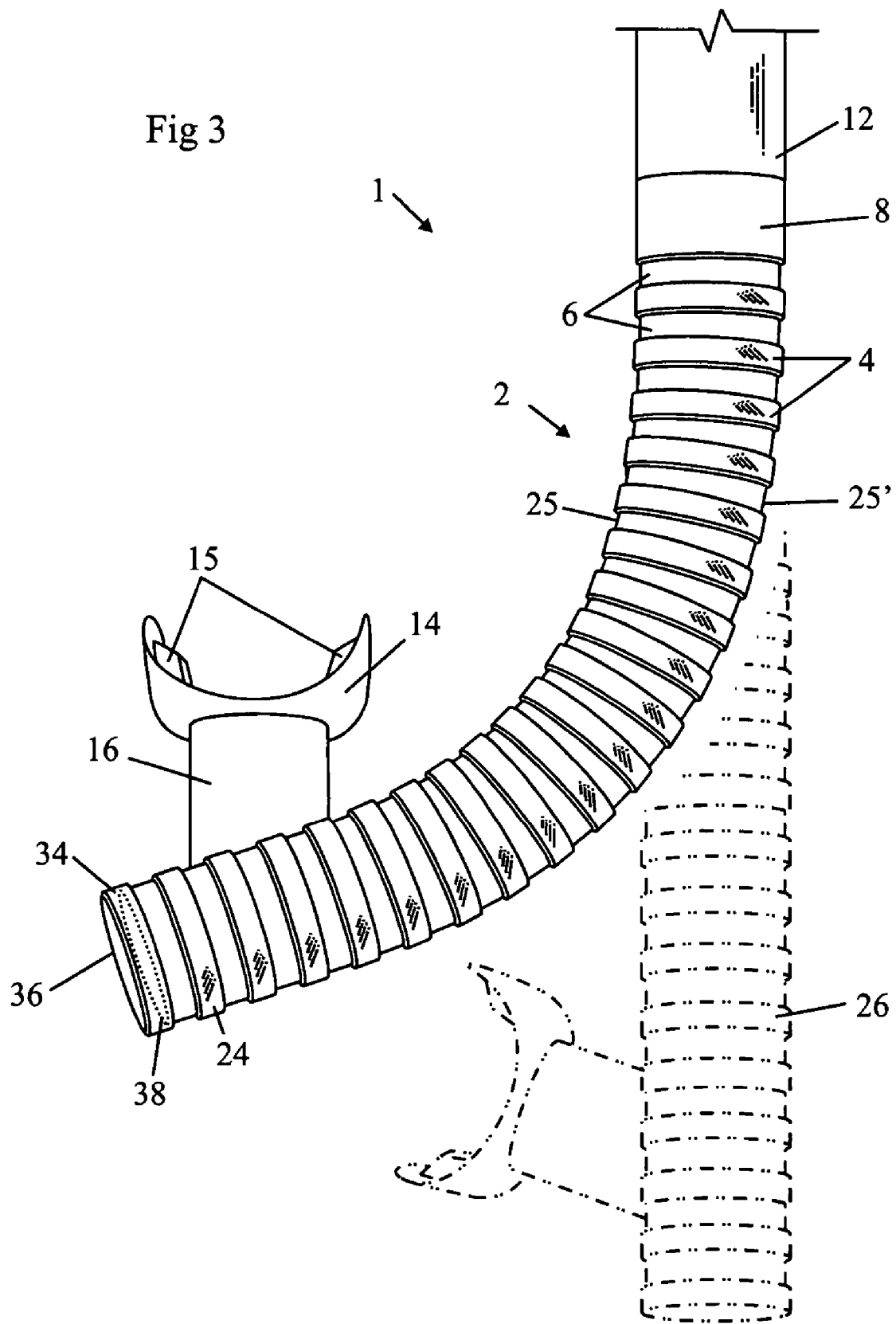

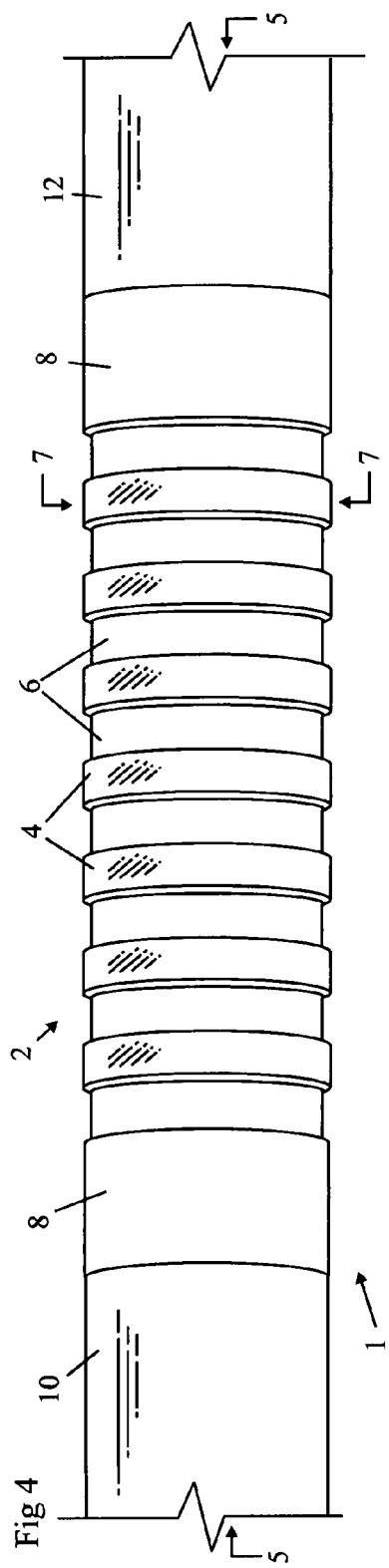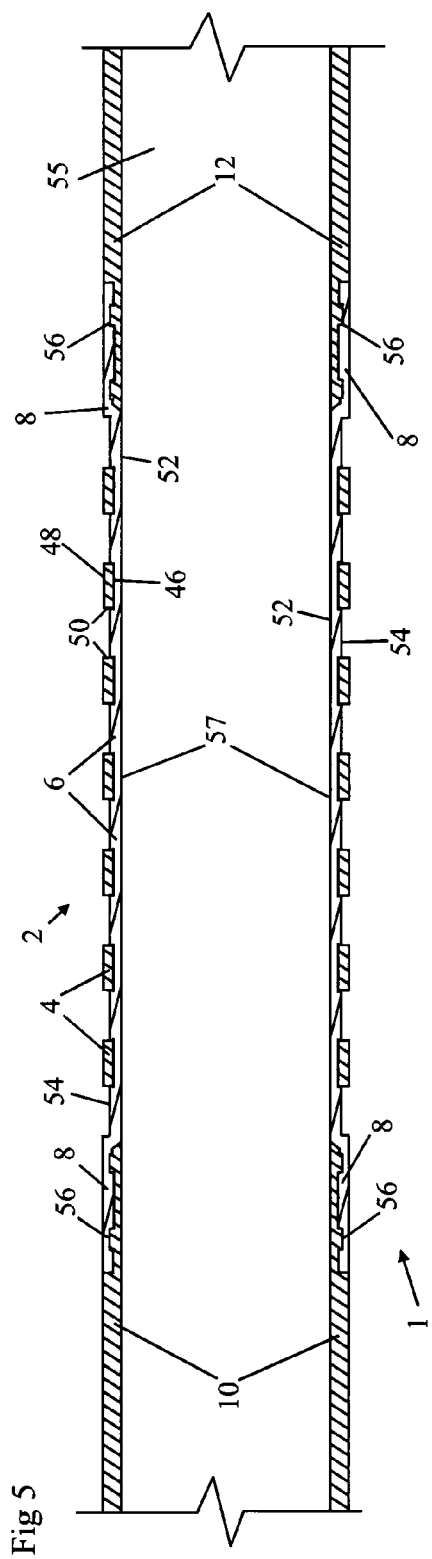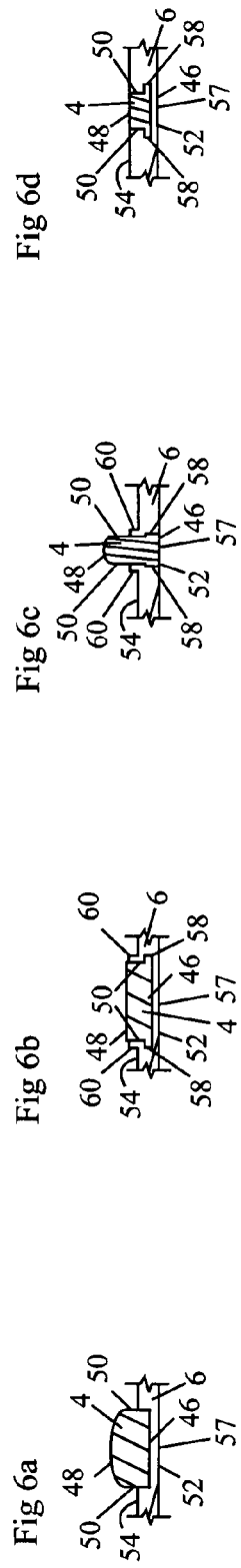

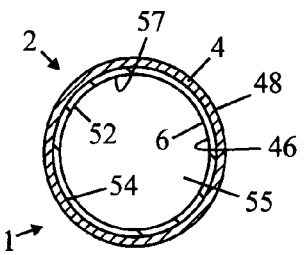
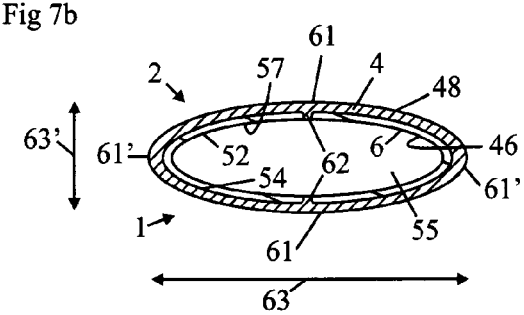
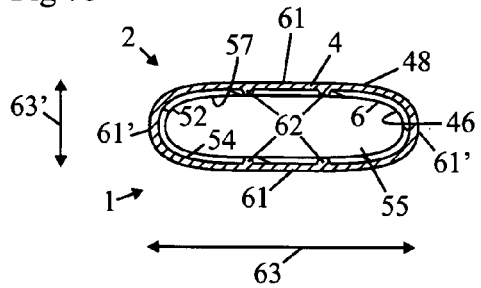
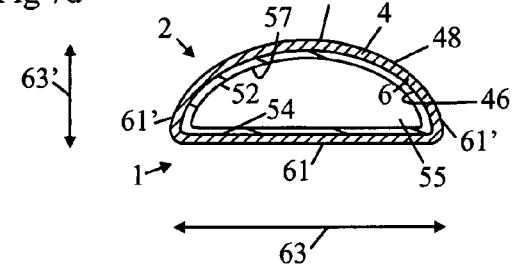
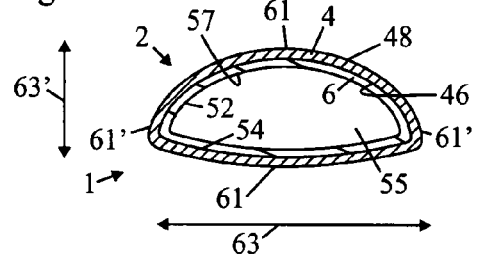
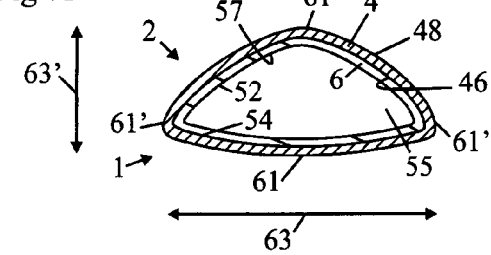
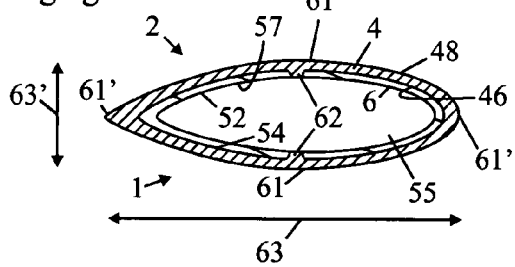
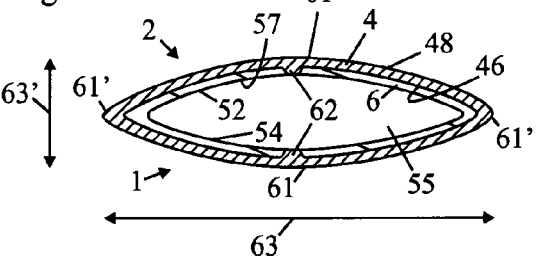
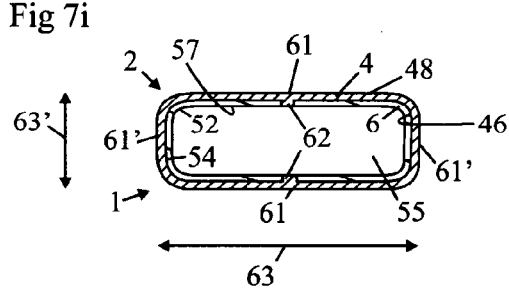

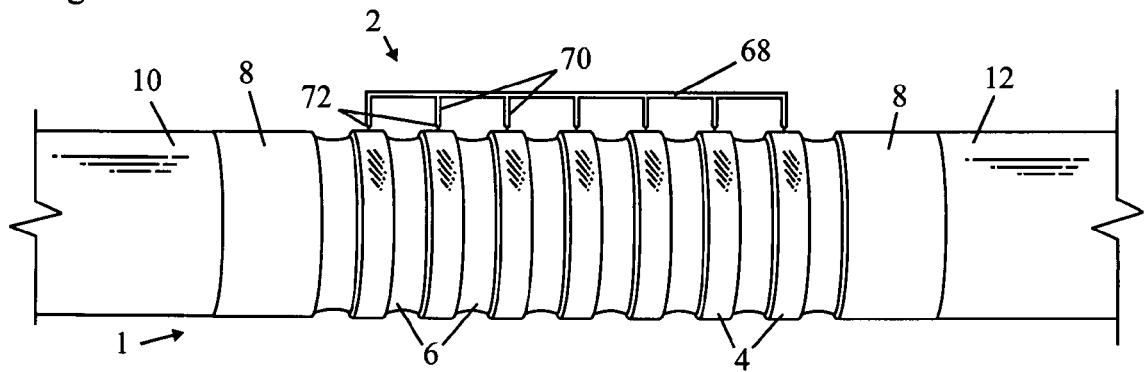
Fig 8a
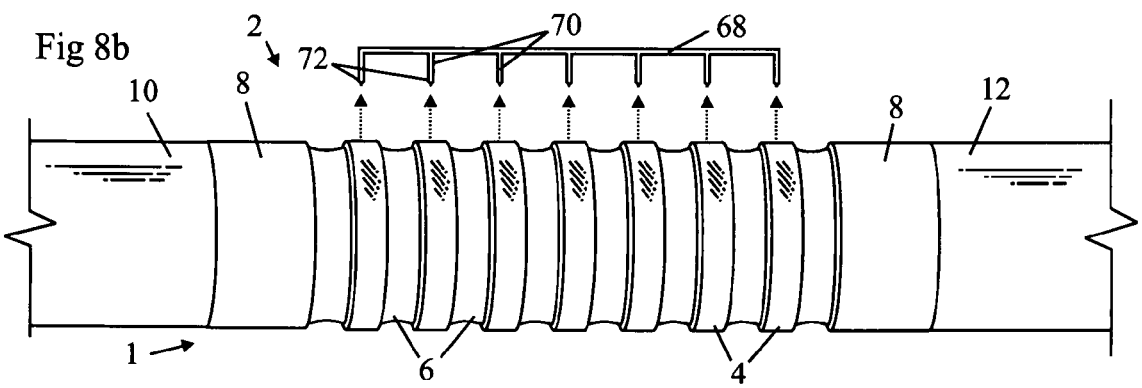
Fig 8b
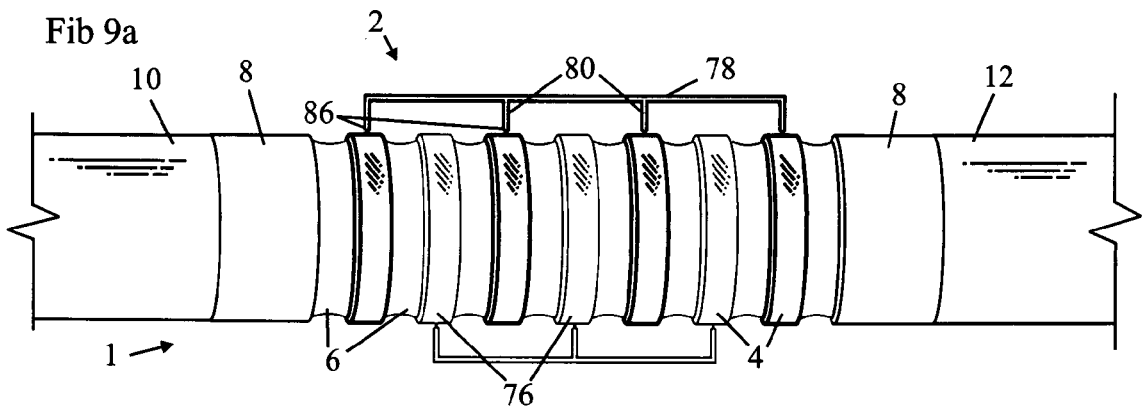
Fib 9a
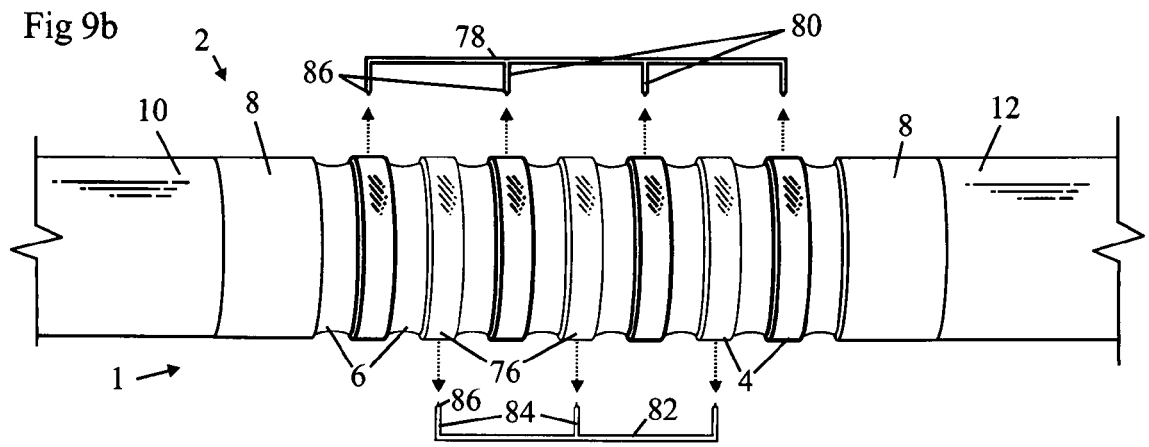
Fig 9b

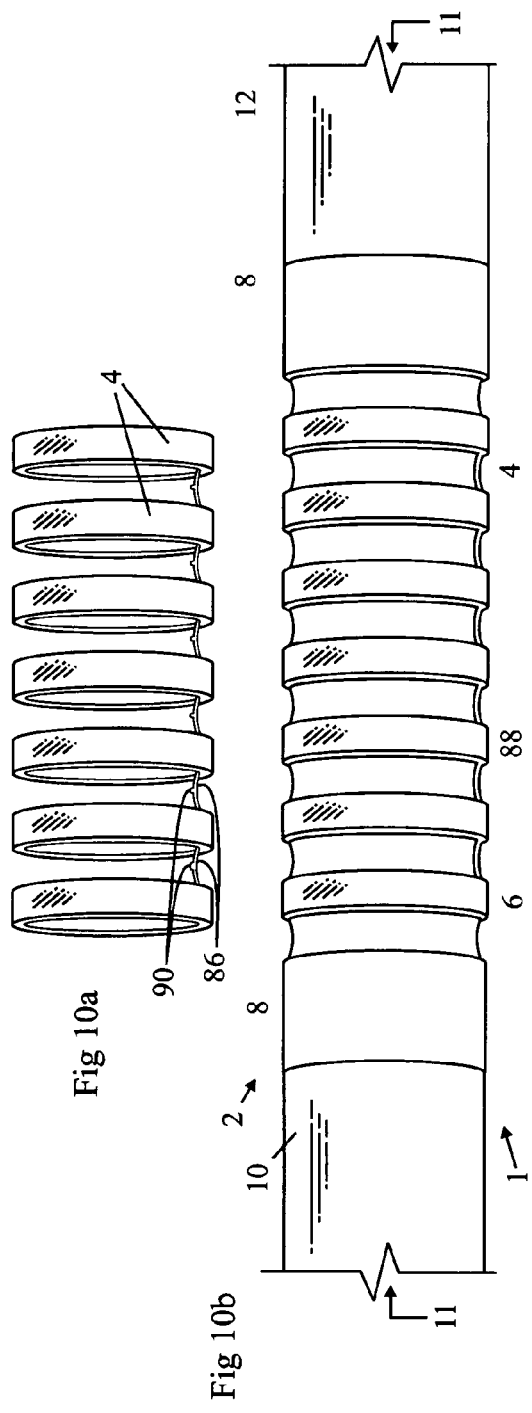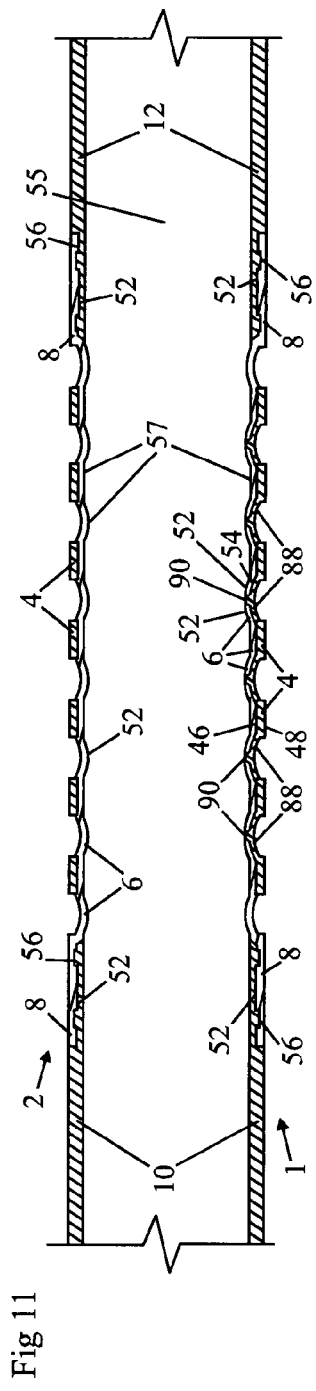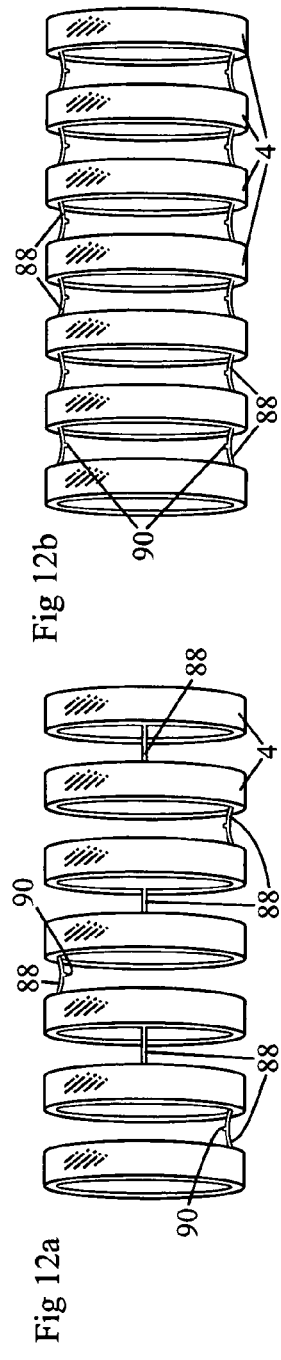
Fig 10a  Fig 10b  Fig 11  Fig 12a  Fig 12b

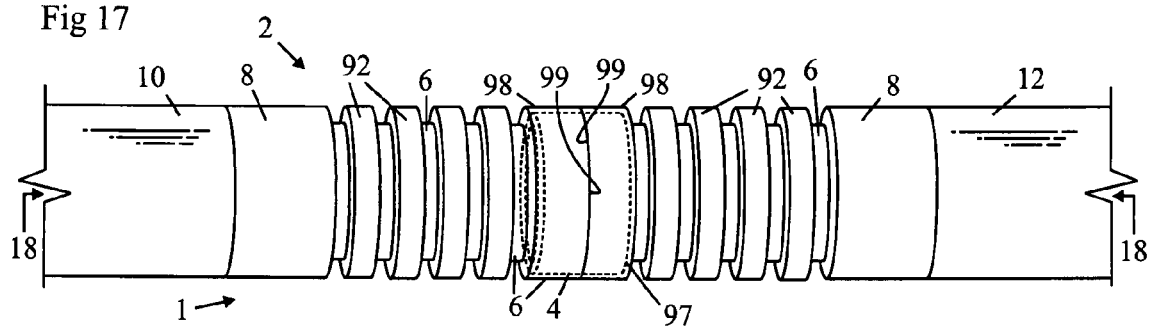
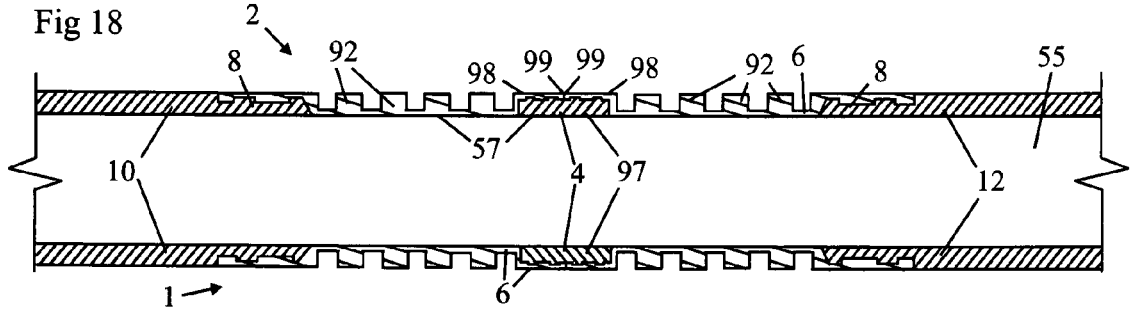
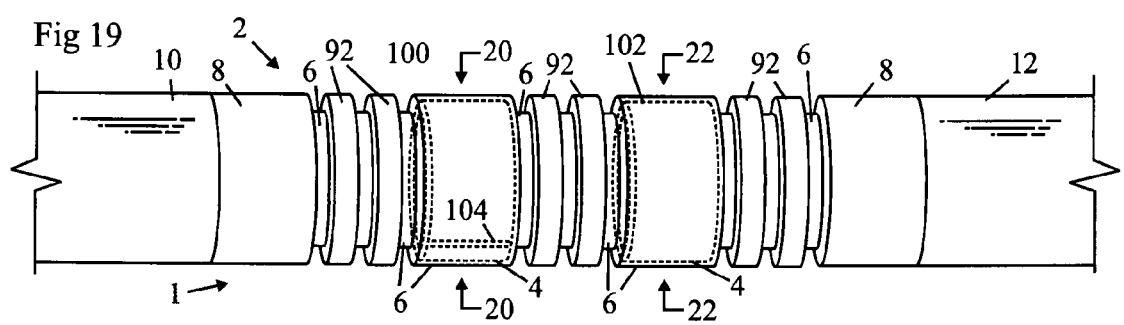
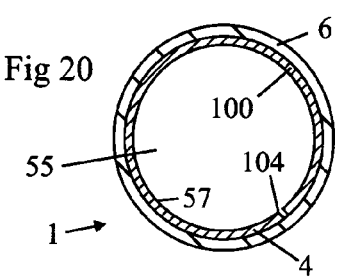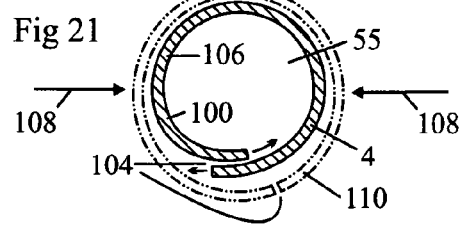
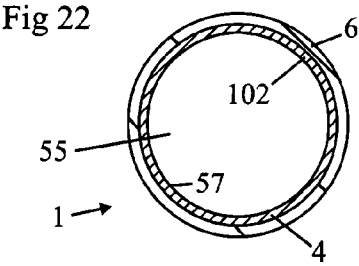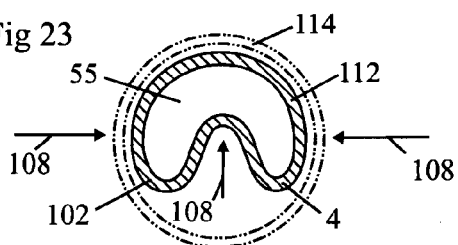

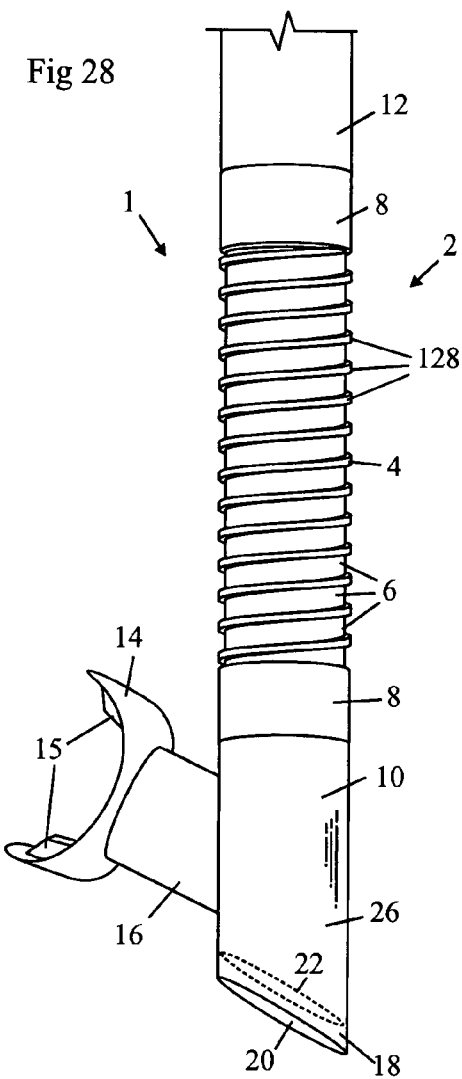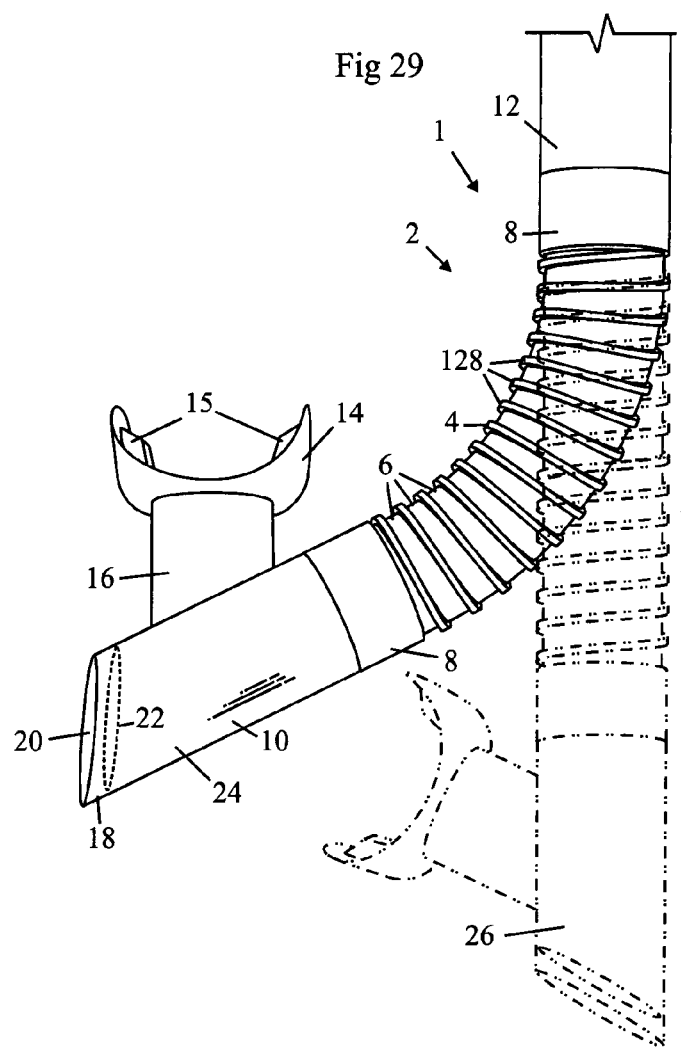

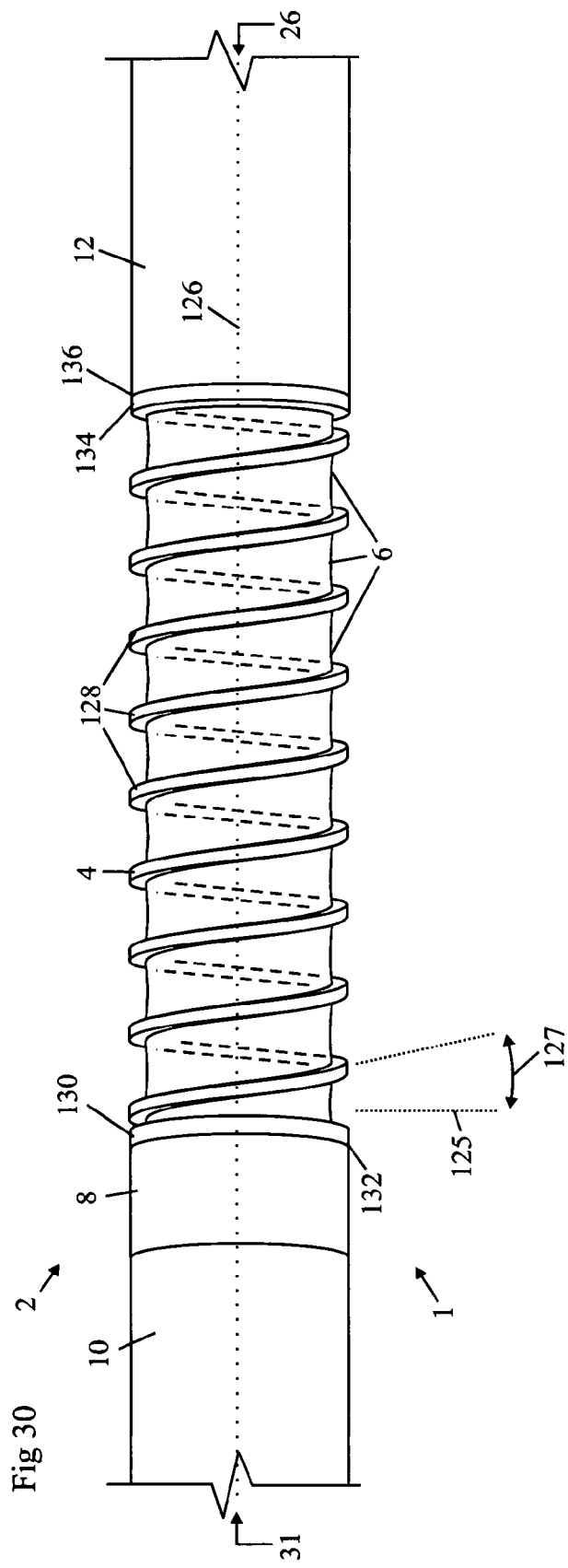
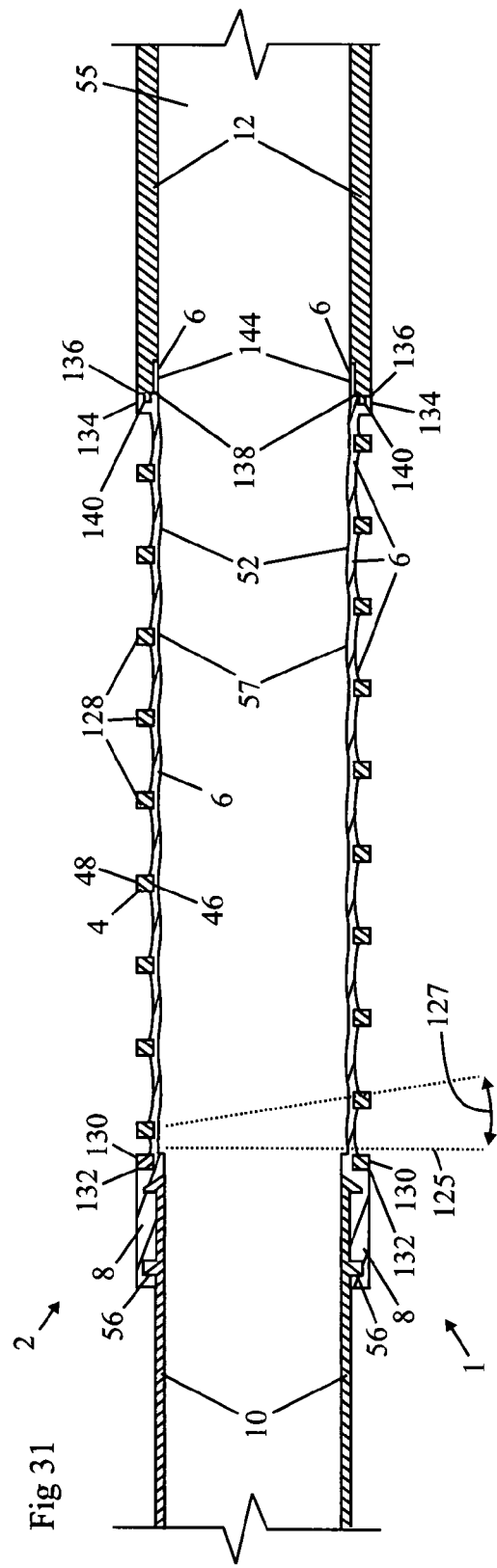
Fig 30
Fig 31

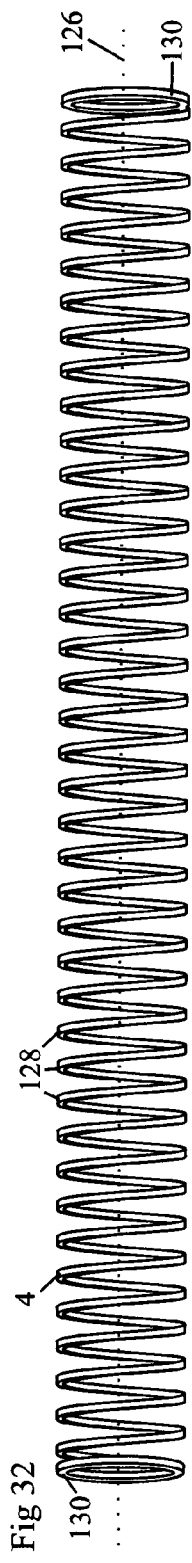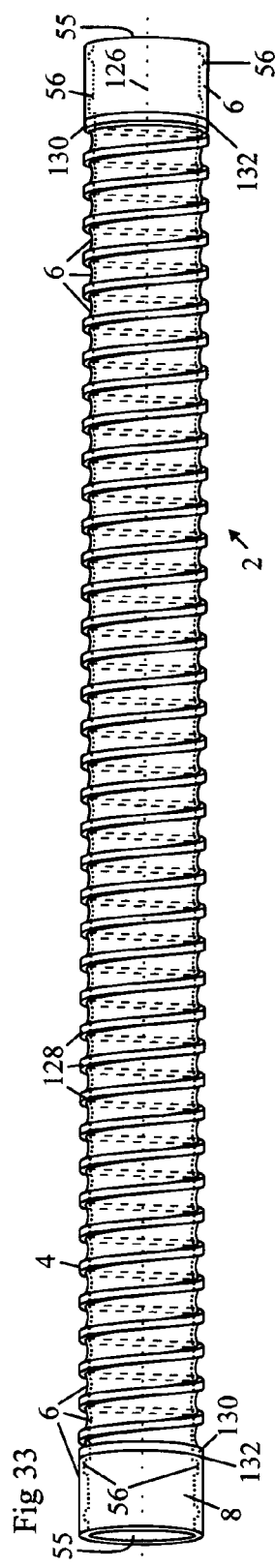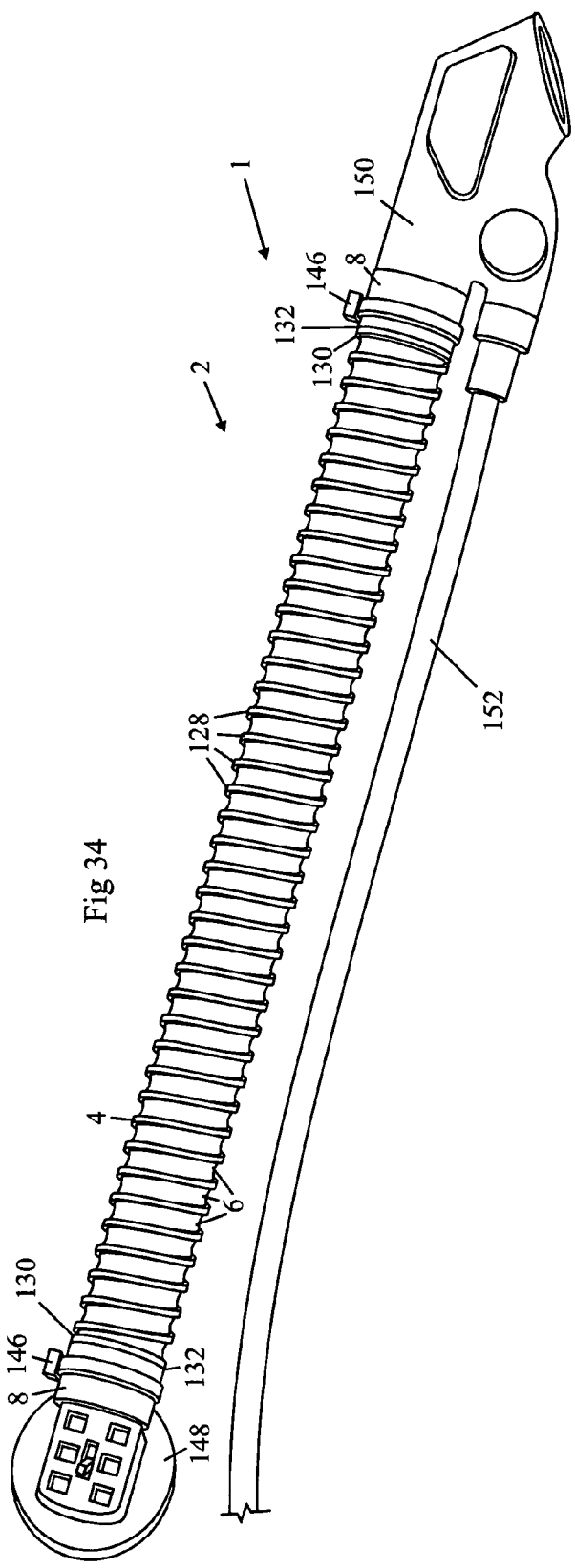
Fig 32
Fig 33
Fig 34

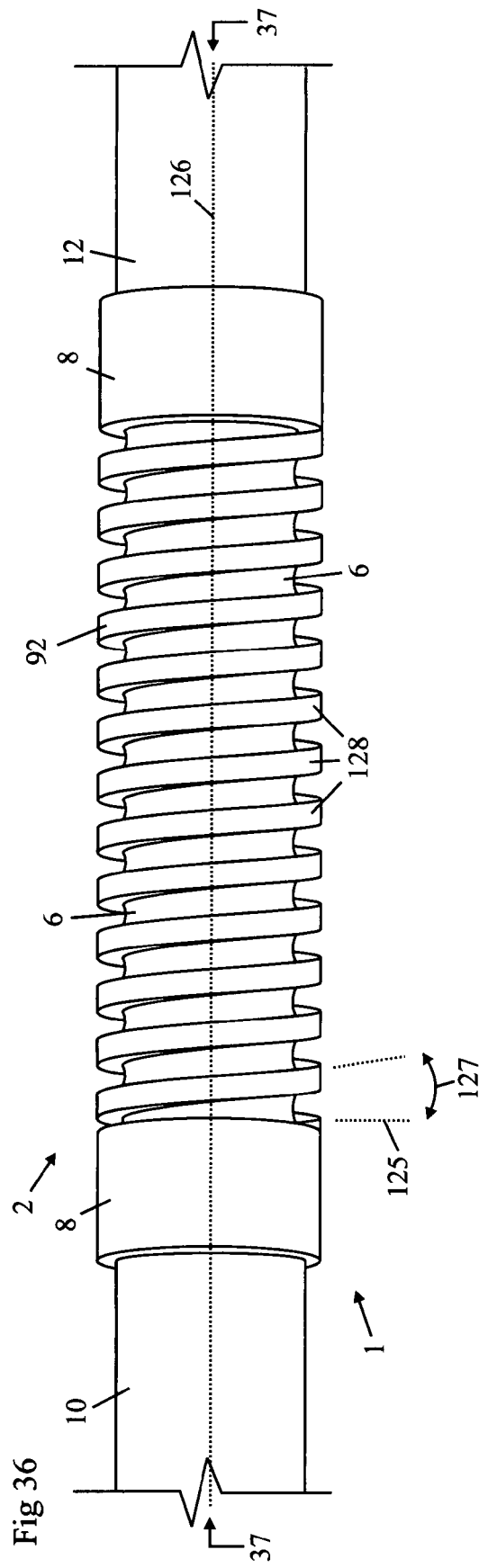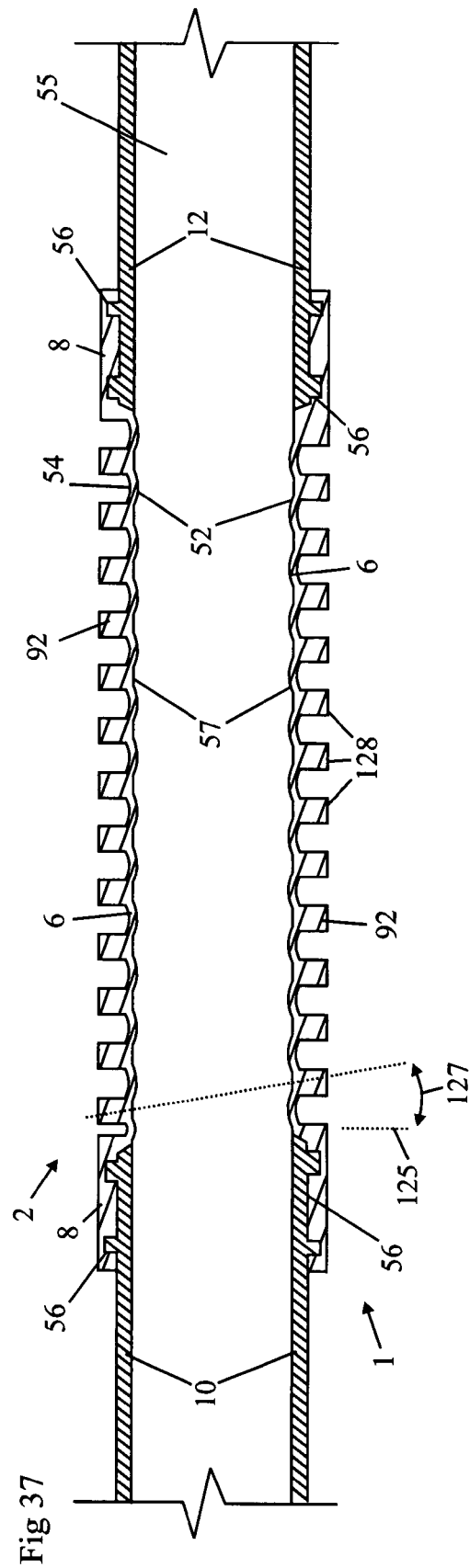
Fig 36
Fig 37

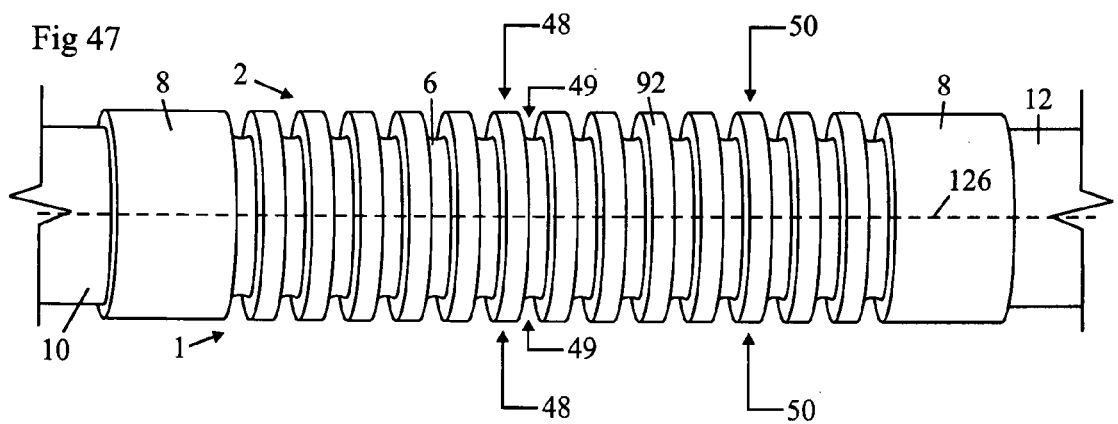
Fig 47
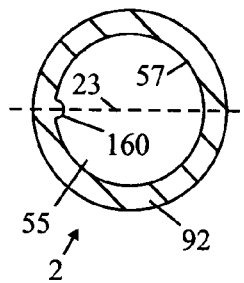
Fig 48a
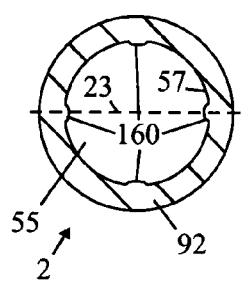
Fig 48b
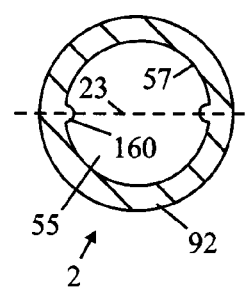
Fig 48c
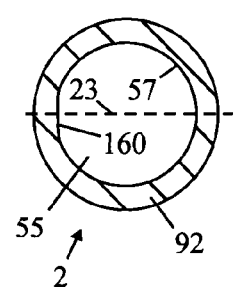
Fig 48d
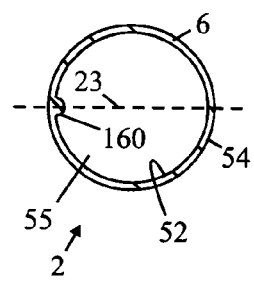
Fig 49a
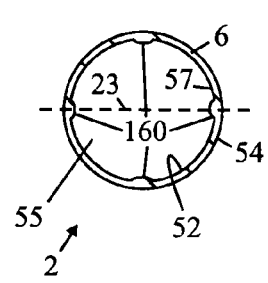
Fig 49b
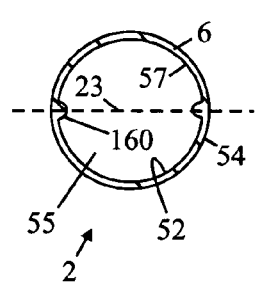
Fig 49c
Fig 49d

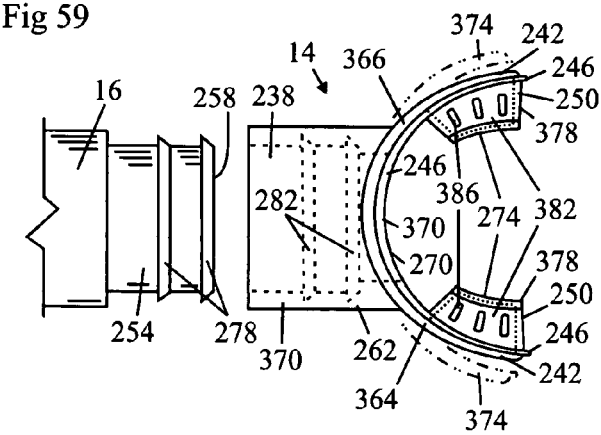
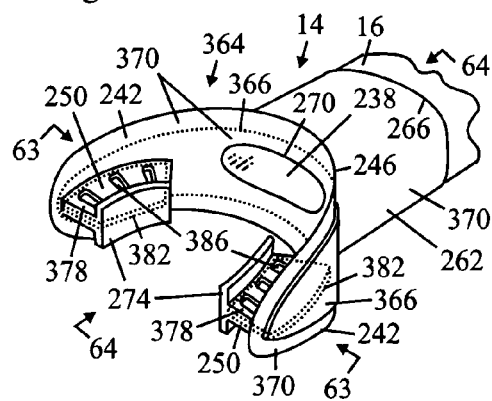
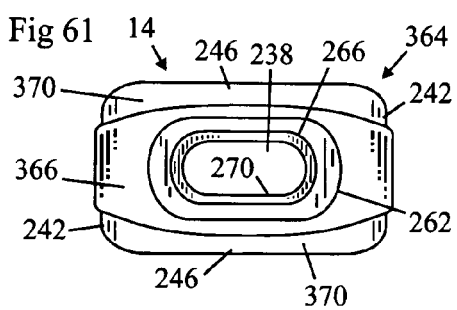
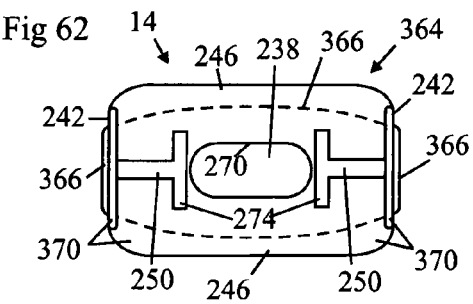
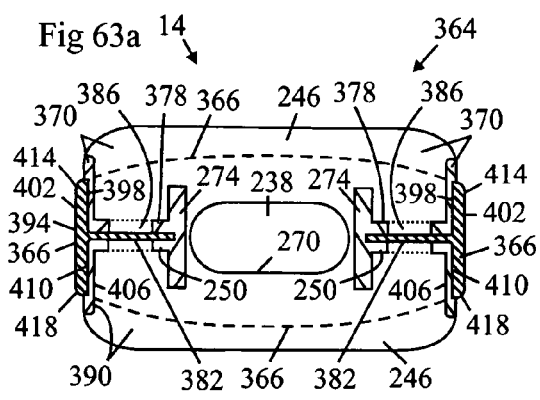
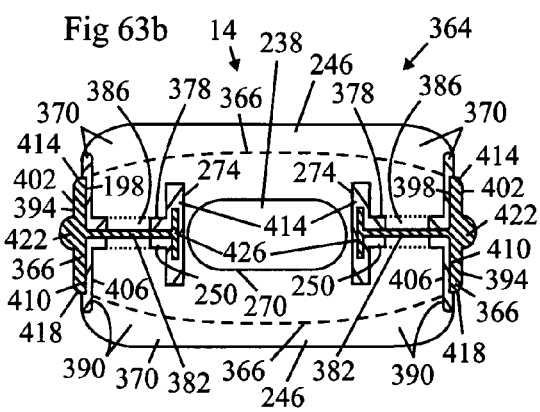
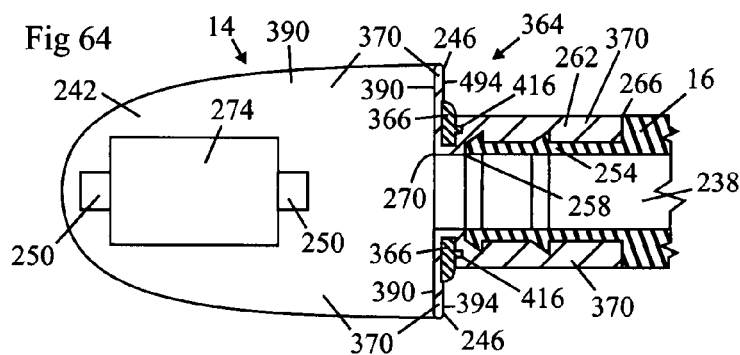

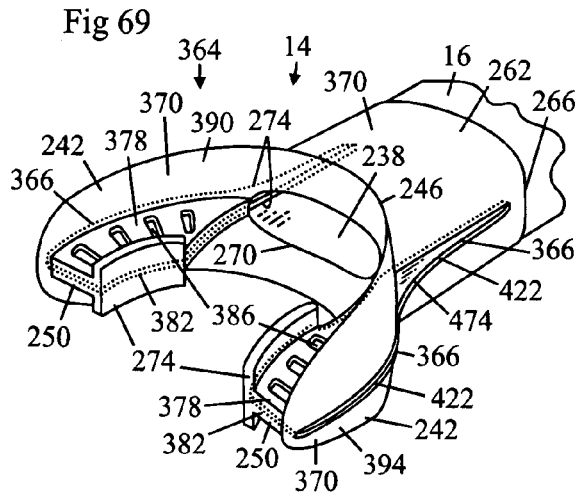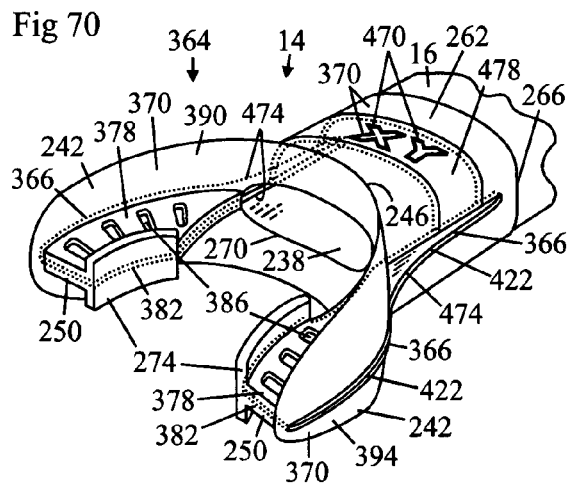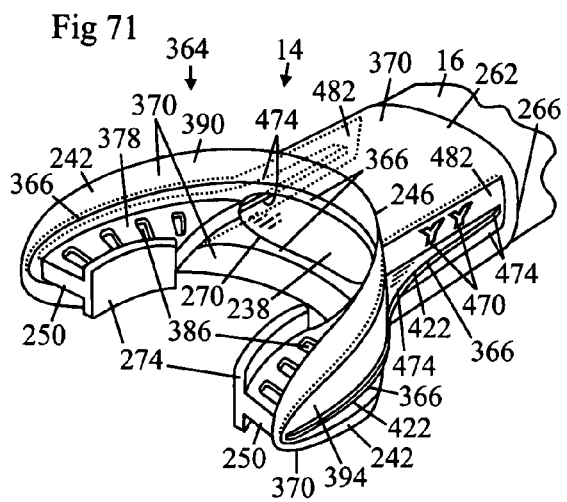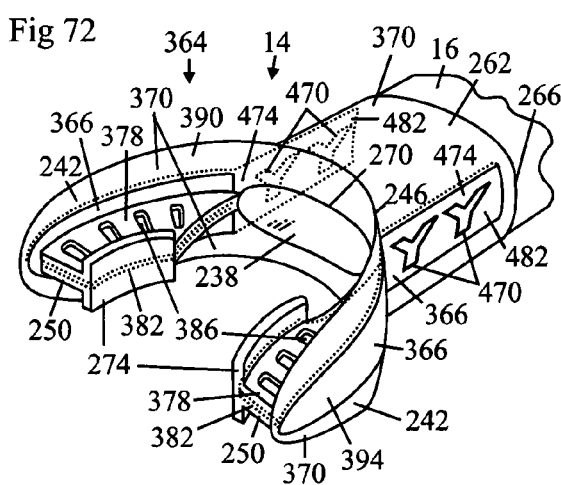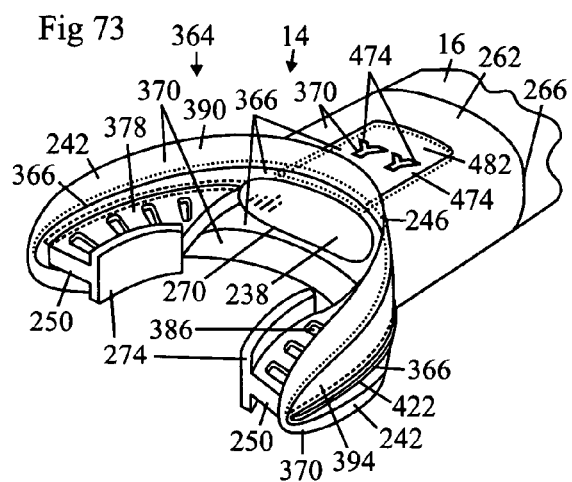

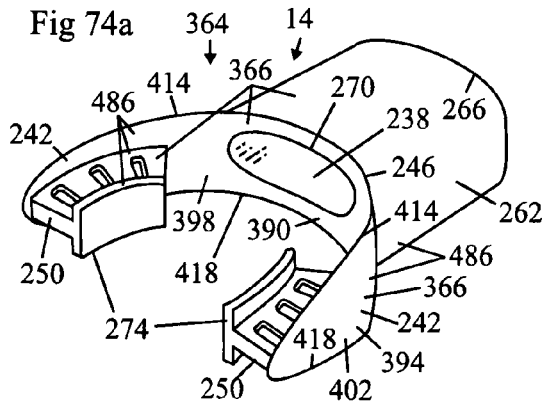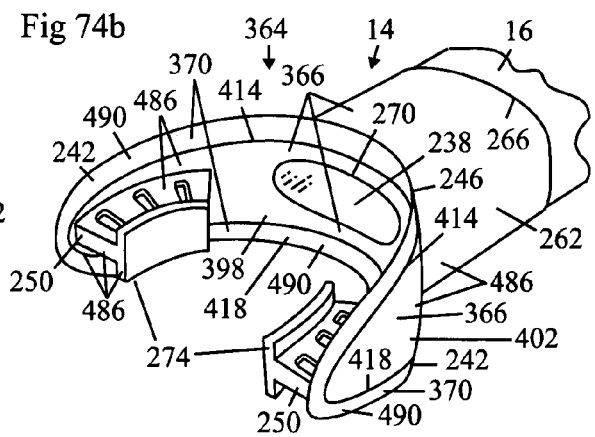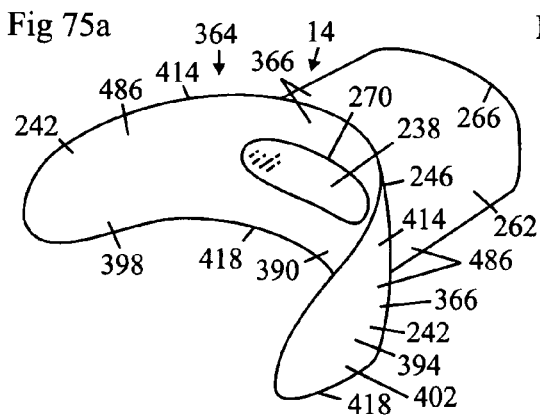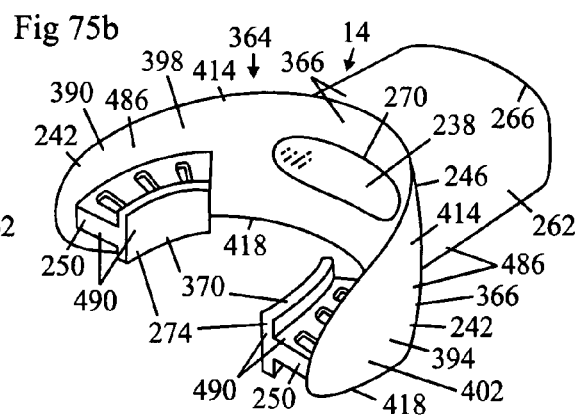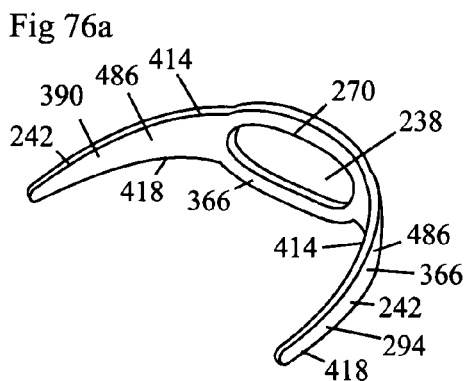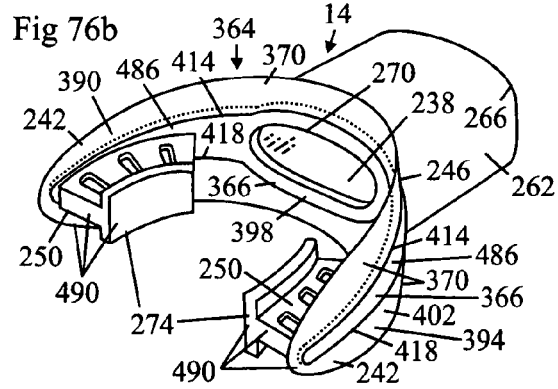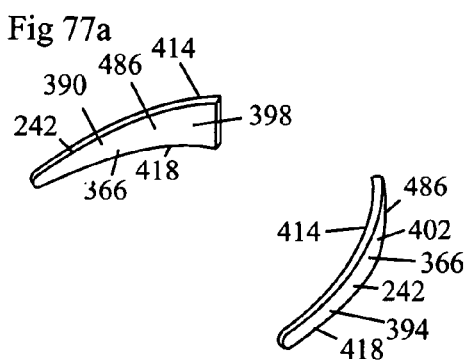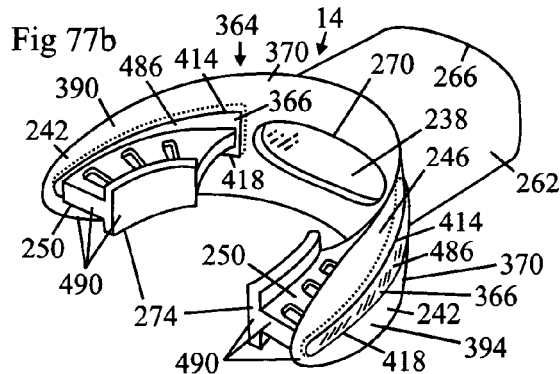

SNORKELS, FLEXIBLE TUBES, MOUTHPIECES AND METHODS

This application claims the benefit under 34 U.S.C. §119 (e) of the following U.S. Provisional applications: U.S. Provisional Application No. 60/801,976, filed May 18, 2006, titled Flexible Tubes And Snorkels; U.S. Provisional Application No. 60/801,977, filed May 18, 2006, titled Methods For Snorkels And Flexible Tubes; and U.S. Provisional Application No. 60/810,608, filed Jun. 2, 2006, titled Diving Mouthpiece Designs and Methods. The entire contents of these provisional applications are hereby incorporated by reference herein and made part of this specification.

BACKGROUND

1. Field of Invention

The present invention relates to snorkels, specifically to such devices and methods using flexible breathing tubes for delivering breathable gas, including facilitating breathing while underwater, as well as other uses for such methods and devices. The present invention also relates generally to a flexible hose or tube, and more particularly to a flexible hose or tube which is particularly useful for conveying gases or fluids including snorkels, diving equipment, ventilation hoses or the like, and such hoses that can be installed within various vehicle compartments or machinery which may be characterized by having limited spacing or limited lengths. This invention relates to diving and snorkel mouthpieces typically used while swimming which may be used with or without flexible tubes.

2. Description of Prior Art

Prior art attempts to create a flexible tube for snorkels are vulnerable to collapsing and buckling during use. If stiffer and thicker materials are used to reduce such collapsing or buckling, the prior art tubes create jaw fatigue and discomfort. The use of a softer material to increase comfort makes the tube more vulnerable to collapsing. Collapsing or buckling of snorkel flex tubes can greatly increase breathing resistance and reduce air delivery while swimming. Collapsing and deformation can also occur during storage to cause reduced flow capacity during use later on. Furthermore, prior art methods for manufacturing flexible tubes can require significantly long cycle times during injection molding that increase production costs and reduce production rates. Prior art flexible tubes lack eye catching styling and/or color contrast.

Prior art mouthpieces for scuba diving and snorkeling create discomfort in the mouth, gums, internal mouth tissues and jaw fatigue. When such mouthpieces are made from a softer material to reduce irritation, abrasion and chaffing to gums and internal mouth tissues, such softer material renders the load bearing portions of the mouthpiece vulnerable to deformation such as buckling, twisting, collapsing and bending out of the intended position when loads are applied to the device that the mouthpiece is coupled to, due to weight and, or drag forces on such device during diving as well as leverage forces created by bending resistance or drag in attached air supply hosing or tubes. Such deformation can cause additional discomfort within the mouth tissues, pressure and deformation on the swimmer's gums and lips, increased jaw fatigue by an actual or perceived need to increase biting tension, reduced water seal, deviated alignment of the water seal portions of the mouthpiece, deviated alignment of airflow from the device the mouthpiece is coupled to relative to the alignment of the airway in the swimmer's mouth, and other problems. The use of a relatively stiff material for the mouthpiece increases chaffing, abrasion and irritation to the soft tissues of the swimmer's mouth including the gums and lips as well as the supporting tissues of the teeth and even the teeth themselves. These problems reduce the comfort, duration and enjoyment of scuba diving and snorkeling due to tissue irritation within the mouth and jaw fatigue in attempting to hold onto the mouthpiece as loads are applied to the device that the mouthpiece is coupled to. In addition, the use of a soft material to provide increased comfort to the teeth under biting pressure reduces the longevity of the mouthpiece as the teeth eventually tear through the soft material, which can cause an inability to retain the mouthpiece and can be a hazard during diving. Also, jaw strain can cause headaches and distraction while diving and can also lead to jaw and mouth problems and, or can be accentuated by jaw or mouth problems including TMJ, tooth pain, muscle strain, or sores and abrasions in the soft tissues of the mouth. Diving mouthpieces that are desired or intended to be sufficiently flexible to be able to collapse or buckle during use, lack eye catching style and color contrast along the U-shaped portion of the mouthpiece as well as along the tubular connection member that connects the mouthpiece to the underwater breathing equipment, such as snorkels, regulators and rebreathers.

OBJECTS AND ADVANTAGES

Accordingly, several objects and advantages of the present invention are:

(a) to provide both increased resistance to collapse along with increased flexibility for comfort;

(b) to provide reduced jaw fatigue;

(c) to provide reduced bending resistance;

(d) to provide improved structural integrity;

(e) to provide increased strength and durability;

(f) to provide increased breathing efficiency;

(g) to provide increased ease of manufacturing;

(h) to provide increased sales and marketing advantages; and (i) to provide methods for manufacture and assembly;

(k) to provide increased ease of assembly;

(l) to provide methods that can potentially be used to reduce product weight, manufacturing time and material costs;

(m) to provide methods of manufacturing and design methods that can greatly increase aesthetics for sales appeal as well as increased comfort and ease of use;

(n) to provide improved protection against deformation during storage and packing;

(o) to provide increased airflow and comfort;

(p) to provide improved material combinations and assembly methods;

(q) to provide improved flexible tubes for other uses;

(r) to provide improved material combinations for increased durability, protection against environmental conditions, and extended product life;

(s) to provide additional methods and designs for improved performance and benefits.

Still further objects and objectives will become apparent from a consideration of the ensuing description and drawings.

DRAWING FIGURES

FIG. 1 shows a side view of an improved snorkel.

FIG. 2 shows a side view an alternate embodiment improved snorkel.

FIG. 3 shows a side view of an alternate embodiment.

FIG. 4 shows a side view of an improved flex tube on a snorkel.

FIG. 5 shows a cross section view taken along the line 5-5 in FIG. 4.

FIG. 6a to 6d show close up views of alternate support member shapes and molding methods for the support members shown in FIG. 5.

FIGS. 7a to 7i show alternate cross sectional shapes taken along the line 7-7 in FIG. 5.

FIGS. 8a to 8b show a method for manufacturing an improved flex tube for a snorkel.

FIGS. 9a to 9b show an alternate method for manufacturing an improved flex tube for a snorkel.

FIG. 10a shows a side view of a set of interconnected support members created during an early step in manufacturing.

FIG. 10b shows a side view of an improved flex tube in which a more flexible material has been molded to the support members shown in FIG. 10a after a subsequent step in manufacturing, and the flex tube is shown to be attached to a stiffer conduit.

FIG. 11 shows a cross section view along the line 11-11 in FIG. 10b.

FIGS. 12a and 12b show alternate examples of connecting spaced apart support members created during an early step in manufacturing.

FIG. 17 shows a side view of an alternate embodiment

FIG. 18 shows a cross section view taken along the line 18-18 in FIG. 17.

FIG. 19 shows a side view of an alternate embodiment.

FIG. 20 shows a cross section view taken along the line 20-20 in FIG. 19.

FIG. 21 shows a cross section view of the insert shown FIG. 20 as it contracts under applied pressure for manual insertion into the flex tube.

FIG. 22 shows a cross section view taken along the lines 22-22 in FIG. 19.

FIG. 23 shows a cross section view of an alternate embodiment insert shown FIG. 22 as it contracts under applied pressure for manual insertion into the flex tube.

FIG. 28 shows a side view of a snorkel with the flex tube shown in FIG. 25.

FIG. 29 shows a shows a side view of the embodiment shown in FIG. 28 in a bent position.

FIG. 30 shows a side view of an alternate embodiment.

FIG. 31 shows a cross section view taken along the line 31-31 in FIG. 30.

FIG. 32 shows a side view of helical support member created during an early step in manufacturing.

FIG. 33 shows a side view of an improved flex tube in which a more flexible material is molded to the helical support member in FIG. 32 during a subsequent step in manufacturing.

FIG. 34 shows a side view of the flex tube in FIG. 33 being used on a SCUBA inflator device for a buoyancy compensator.

FIG. 36 shows a side view of an improved flexible tube.

FIG. 37 shows a cross section view taken along the line 37-37 in FIG. 1.

FIG. 47 shows a side view of an alternate embodiment.

FIGS. 48a to 48d show alternate cross section views along the line 48-48 in FIG. 12.

FIGS. 49a to 49d show alternate cross section views along the line 49-49 in FIG. 47.

FIG. 59 shows a top view of an improved diving mouthpiece with a detached predetermined body which couples with the mouthpiece.

FIG. 60 shows a perspective view of the embodiment shown in FIG. 59 coupled to a predetermined body.

FIG. 61 shows a front view of the embodiment shown in FIG. 59 in which the coupling end is viewed.

FIG. 62 shows a rear view of the embodiment shown in FIG. 59 in which the mouth securing portion is viewed.

FIGS. 63a and 63b show alternate embodiment cross section views taken along the line 63-63 in FIG. 60.

FIG. 64 shows a cross section view taken along the line 64-64 in FIG. 60.

FIGS. 69 to 73 show perspective views of alternate embodiments.

FIG. 74a shows a portion of an alternate embodiment that is made during an early phase of an injection molding process.

FIG. 74b shows the portion shown in FIG. 74a with overmolded material added during a subsequent phase of an injection molding process.

FIG. 75a shows a portion of an alternate embodiment that is made during an early phase of an injection molding process.

FIG. 75b shows the portion shown in FIG. 75a with overmolded material added during a subsequent phase of an injection molding process.

FIG. 76a shows a portion of an alternate embodiment that is made during an early phase of an injection molding process.

FIG. 76b shows the portion shown in FIG. 76a with overmolded material added during a subsequent phase of an injection molding process.

FIG. 77a shows a portion of an alternate embodiment that is made during an early phase of an injection molding process.

FIG. 77b shows the portion shown in FIG. 77a with overmolded material added during a subsequent phase of an injection molding process.

DESCRIPTION AND OPERATION—FIGS. 1 to 50

Figure 13:
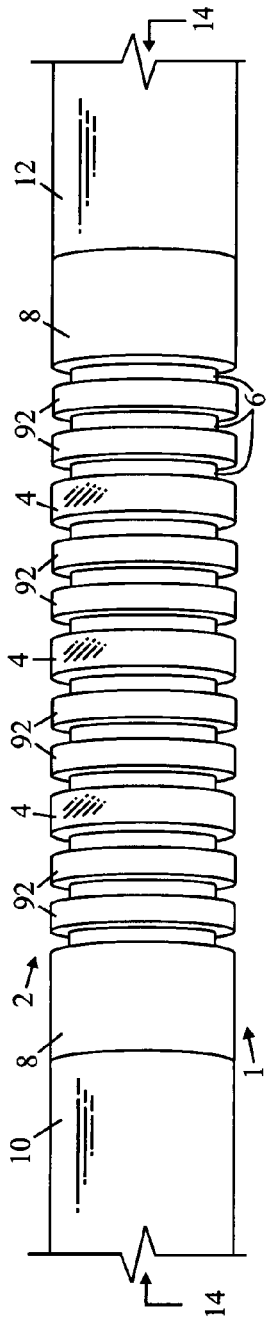
FIG. 13 shows a side view of an alternate embodiment.

FIG. 1 shows a side view of an improved snorkel having a flexible tube region 1 that includes an improved flexible tube section 2. Flex tube 2 has tube support members 4 that are made out of a different material than flexible wall portion 6. Support members 4 are preferably made with an injection molded thermoplastic material that is relatively stiffer and, or harder than flexible portion 6, and flexible portion 6 is preferably made with a relatively flexible thermoplastic material that is relatively more flexible and, or softer than the relatively stiffer and, or harder thermoplastic material used to make support members 4. Flexible portion 6 is preferably injection molded to support members 4 with a thermo chemical bond, or a weld bond during a predetermined phase of an injection molding process; however, any chemical and, or mechanical bond may be used and any method of fabrication, manufacturing or production may be used.

Preferably, support members 4 are axially spaced apart ribs that are substantially annular in shape; however, support members 4 may be non-annular, partially annular, fully encompassing or partially encompassing, or have any shape or configuration whatsoever. Support members 4 and flexible portions 6 can be made out of any suitable material and may be connected to each other and, or to flexible portion 6 in any suitable manner with a chemical and, or mechanical bond. In this embodiment, support members 4 are seen to have a relatively narrow axial dimension relative to the longitudinal center axis of flex tube 2; however, any axial dimension may be used including any variation to narrower or wider axial dimensions. Preferably, support members 4 and flexible portions 6 are made with chemically similar thermoplastic materials so that support members 4 and flexible portion 6 become chemically and physically fused to provide a superior bond; however, alternate embodiments may use any type of mechanical bond and, or chemical bond. Any chemically suitable materials can be used for a thermo chemical bond. Examples of thermoplastic materials may include various harnesses of thermoplastic PVC, thermoplastic rubber, thermoplastic elastomers, thermoplastic olefins, thermoplastic silicones, EVA, polypropylene, as well as any other suitable material. While injection molding is a preferred manufacturing process, any other suitable manufacturing process may be used including compression molding, catalyst cured compounds, room temperature molding, extrusion, lamination blow molding, rotational molding, manual assembly, mechanical interlocking, ultrasonic welding, radio frequency welding, heat welding, chemical welding, or any suitable connection or assembly process.

The configuration in FIG. 1 is merely an example of one potential embodiment and may be varied in any manner. Flexible tube 2 is seen to have connection ends 8 that connect to a lower snorkel portion 10 and an upper snorkel portion 12. A mouthpiece 14 having bite tabs 250 is connected to lower portion 10 with a mouthpiece breathing tube 16. In this embodiment, mouthpiece 14 has a reinforcement member 366 made with a separate material than other portions of mouthpiece 14; however, mouthpiece 14 may have any desired configuration. In this embodiment, lower portion 10 has a lower end 18 that has an opening 20 and a purge valve one-way membrane 22 shown with dotted lines to be recessed within lower end 18. Upper snorkel portion 12 is a tube that extends above the surface to provide a source of breathable air while swimming. In alternate embodiments, connection ends 8 can connect to any predetermined body, which can be any type of device, machinery, part, system. Consequently, the snorkel as well as lower portion 10 and upper portion 12 may be substituted for any such predetermined body.

Connection ends 8 are preferably made with the relatively flexible thermoplastic material of flexible portion 6 during the same phase of injection molding; however, connection ends 8 may be made with any material during any phase of any type of manufacturing process. Preferably, connection ends 8 are made at the same time as flexible portion 6 so that flexible tube 2 is made in two injection molding steps. Connection ends 8 and flexible portion 6 are also preferably made with an elastic material to enable flexible portion 6 to expand and retract during use and to permit connection ends 8 to stretch over the receiving portions of lower portion 10 and upper portion 12 and contract to form an strong bond and a water tight seal. However, non-elastic flexible materials may be used as well. Also, connection ends 8 may also be made with a relatively rigid material that forms a mechanical and, or chemical connection with lower end 10 and, or upper end 12. In such a situation, connection ends 8 may be made with the same stiffer thermoplastic material of support members 4 or out of any separate material or combinations of materials.

In FIG. 1, flexible tube 2 and lower portion 10 are seen to be in a bent position 24 which is arranged to permit a swimmer to place mouthpiece 14 in the mouth for breathing. In this example, neutral bending surface 23 is shown by a dotted line existing between an inner bending surface 25 and an outer bending surface 25'. Neutral bending surface represents a plane which intersects flex tube 2, and is perpendicular to the plane of bending existing between bent position 24 and extended position 26, which is shown by broken lines. Neutral bending surface 23 represents a location along flex tube 2 in which flexible portion 6 experiences no elongation or compression while flex tube 2 experiences bending between positions 24 and 26. Neutral bending surface 23 may be located near the center axis of flex tube 2 or may be located closer to, or even at either inner bending surface 25 or outer bending surface 25' depending on the degree of elongation, if any, occurring on one of surfaces 25 or 25' relative to the degree of compression, if any, occurring on the opposite of these two opposing surfaces 25 or 25'. For example, neutral bending axis 23 will exist closer to whichever of surfaces 25 or 25' that experience less deformation during use, and will exist near the center axis of flex tube 2 if surfaces 25 and 25' experience similar degrees of deformation during bending. Neutral bending surface 23 may exist at any location, encompass any area and dimension, and may change position during use. While this example distinguishes between inward bending surface 25 and outward bending surface 25' in the drawing, such surfaces are provided as an example relative to the direction of actual bending rather than a static condition; and therefore, their positions may reverse if the relative direction of bending and, or the starting and ending portions of bending are changed.

In extended position 26, flexible tube 2 and lower portion 10 have pivoted away from bent position 24 so that mouthpiece 14 and lower portion 10 are spaced from the swimmer's mouth and face when not in use, such as when the swimmer's face is above water or when the swimmer has switched to scuba equipment or another source of breathable air. Being able to flex away from the swimmer's face when not in use such as to extended position 26 is a highly desirable market advantage and is often referred to a "full drop away flex tube". However, the prior art flexible snorkel tubes are plagued with many problems which impede performance and fail to deliver the desired results.

The methods of the present invention provide major advantages over the prior art because the use of two separate materials in flexible tube 2 allows flexible tube 2 to be adjusted so as to provide significantly reduced resistance to moving between bent position 24 and extended position 26 due to the ability use highly flexible materials in flexible portion 6. While using such highly flexible materials in a prior art single material flexible snorkel tube would make the snorkel tube vulnerable to collapsing and restricting air flow, the methods of the present invention can significantly reduce or even completely eliminate collapsing of flexible tube 2 due to the use of significantly stiffer materials in support members 4 that keep the airway open for maximum flow. Because collapsing can be eliminated by the stiffness of support members 4, flexible portion 6 can be made extremely flexible and supple so that bending resistance in bent position 24 is greatly reduced, imperceptible, or even eliminated entirely. This is a massive advantage because this can greatly reduce the biting tension from the user on bite tabs 250 of mouthpiece 14 so that jaw fatigue and strain is greatly reduced. This can greatly improve comfort, reduce headaches, problems of TMJ and maximize airways in the mouth for maximum ease and efficiency of breathing, especially during high exertion. This is a huge improvement over the prior art which is plagued by a "catch 22" in which sufficient flexibility for eliminating jaw fatigue makes the ribs vulnerable to collapsing and sufficient stiffness to reduce collapsing increases bending resistance that causes jaw fatigue and muscle strain. Faced with this problem, prior art solutions fail solve these problems and create further problems. For example, many prior art flexible snorkel tubes mold the flexible tube into a pre-bent position to reduce jaw fatigue; however, such tubes stay bent during use and fail to produce the "full drop away" benefit intended. Also, the vulnerability for the flexible tube to collapse permits the tube to become deformed when packed away or stored as other objects and weight is applied to the tube causing permanent deformity, weakening of the tube, loss of flow space, kinks and twists which reduce or even destroy the useful life and performance of the snorkel. Furthermore, the vulnerability of prior art designs to collapse also causes the flex tubes to collapse under torsional stress as the tube is twisted along a longitudinal axis when the swimmer attempts to maneuver the mouthpiece into the mouth. In addition, prior art flexible tubes can become permanently deformed under the heat of the sun either outdoors or in the back of a car or boat, especially when being compressed, bent, folded or twisted in a bag, suitcase or compartment with other items or diving gear.

The present invention uses relatively rigid materials for support members 4 that can significantly reduce and even eliminate collapsing of flexible tube 2 entirely in many situations including bending, twisting, compression, storage, packing, heat, sunlight, and folding. The methods of the present invention greatly improved the performance, durability and longevity of snorkels as well as any other alternate articles, methods or devices that may use these methods.

The use of more rigid materials within support members 4 can also permit the weight of flexible tube 2 to be significantly reduced over the prior art for improved comfort, ease of travel, ease of use, and lowered cost of manufacturing due to reduced material volume, reduced shipping weight and reduced cycle time or machine time during molding. Where the prior art relies on thick rib sections of the same flexible material used for the thinner wall sections between thick annular ribs, which increases weight, material costs and cycle times in the mold, the methods of the present invention permit support members 4 to made with stiffer materials having much thinner thicknesses for reducing material costs, machine costs, manufacturing cycle time, improved lightweight characteristics and greater strength and durability. Also, because prior art snorkel flex tubes require thick annular rib portions, the interior diameter of the flex tube has to be significantly reduced compared to the outer diameter of the flex tube and this can significantly reduce flow capacity for breathing and clearing the snorkel. In contrast, the increased stiffness of the stiffer material in support members 4 of the present invention allow a greatly increased stiffness to thickness ratio so that greater stiffness can be achieved with much thinner rib dimensions and this allows the inner diameter of flex tube 2 of preferred embodiments of the present invention to be much larger than prior art flex tubes in comparison to the outer diameter of the flex tube. This in turn also increases the streamlined profile of flex tube 2 in comparison to the prior art because prior art flex tubes would require a much larger outside diameter to have the same inside diameter of the present invention.

Additionally, the methods of the present invention permit optimum materials to be selected and independently adjusted for each portion of flex tube 2 to best suit its intended purpose. For example, the rigidity of support members 4 or alternative support members and the flexibility of flexible portion 6 can be independently adjusted to create improved rigidity for support members 4 and improved flexibility for flexible portion 6 with independent adjustments to the materials used for each of these separate parts.

One of the methods of the present invention is to use at least two separate materials for flex tube 2, one material being used for a stiffer reinforcement portion that is arranged to reduce or prevent collapsing of flex tube 2 and a different material being used for flexible portion 6 between the stiffer reinforcement portion and then selectively adjusting the stiffness of the stiffer reinforcement portion and adjusting the flexibility of flexible portion 6. Preferably, two separate thermoplastic materials are used which are connected by thermo chemical adhesion created during a predetermined step in an injection molding process. Preferably, the different materials are selected so as to provide improved resistance to collapsing, improved flexibility or both for flex tube 2

The process of comolding two different materials within flex tube 2 can provide greatly enhanced cosmetic appeal that can increase market appeal and style. Furthermore, the use of two different materials can permit support members 4 to provide a higher degree of durability and protection to flex tube 2 than could be achieved with one flexible material as used by the prior art.

In alternate embodiments, support members 4 and flexible portion 6 can be made with two separate injection molding steps that includes an early step of injection molding with a predetermined thermoplastic material, that may be a first thermoplastic material, to make support members 4 and a subsequent injection molding step in which flexible portion 6 is made with a subsequent thermoplastic material, that may be a second thermoplastic material, which is connected to the predetermined thermoplastic material with a thermo chemical bond created during the subsequent step of injection molding. Many variations of the materials used in this process may be employed. For example, both the first thermoplastic material and the second thermoplastic material may have similar or even identical levels of flexibility or stiffness, but use different colors so that this process produces a contrast in color between support members 4 and flexible portion 6. In such situations, the methods of the present invention permit improved cosmetics to be produced without any variation in stiffness or flexibility between the first and second thermoplastic materials being injected in each phase of injection molding. Any variation can be made, including making support members 4 with a relatively flexible material and flexible portion 6 with a relatively less flexible material.

In FIG. 1, the present invention may be molded in bent position 24 while also making flexible portion 6 sufficiently flexible to permit flexible tube 2 and lower portion 10 to experience a "full drop away" to extended position 26 when not being used. Alternatively, flex tube 2 may be molded in extended position 26 while flexible portion 6 is made sufficiently flexible to permit flexible tube 2 and lower portion 10 to bend to bent position 24 during use with sufficiently low bending resistance to provide a significant reduction in jaw fatigue over the prior art. Preferably, bending resistance within flexible tube 2 at position 24 is sufficiently low enough to not create a perceptible outward and, or sideways pulling tension on mouthpiece 14 during use. In alternate embodiments, any degree of bending resistance may be provided. In other alternate embodiments, flexible tube 2 may stay bent and not flex fully away to extended position 26, may come to rest at any intermediate position between positions 24 and 26, or may not flex away from bent position 24 at all when not in use.

FIG. 1 also shows separate methods of the present invention to provide superior styling, shelf appeal, and color contrast for flex tube 2 and/or mouthpiece 14. In FIG. 1, support members 4 are seen to have angled lines that show that the methods of the present invention permit support members 4 to have a different color and/or color intensity and/or surface contrast than adjacent flexible portions 6, which in this embodiment create an attractive and eye catching banded-look along flex tube 2 for greatly enhanced market appeal. While all prior art flex tubes for snorkels have zero variance in color change, color intensity or surface contrast between rib portions and flexible wall portions in between the rib portions, the present invention provides methods for creating a stylish banded look with dramatic color contrast and/or color intensity contrast. Testing has shown a dramatic increase in shelf appeal, sales demand and market advantage over prior art snorkel flex tubes. While all prior art snorkel flex tubes are either translucent and colorless or are opaque (non translucent) and one color without any contrast between adjacent ribs and flexible wall portions.

While the present invention provides methods for separate injection molding of one color material for support members 4 and a separate color (or contrasted color intensity) for flexible portions 6, the present invention also provides methods for providing eye-catching color contrast and/or color intensity contrast when support members 4 and flexible portions 6 are made with the same material during the same phase of an injection molding process.

As one example of many possible embodiments, a method for providing flex tube 2 with color intensity contrast between support members 4 and adjacent flexible portions 6 can include:

(a) providing an injection mold cavity that is arranged to form support members 4 with a significantly greater radial thickness than flexible portions 6 so that support members 4 are provided with a with a predetermined radial rib thickness and flexible portions 6 are provided with a predetermined radial flexible wall thickness in which the predetermined radial rib thickness is arranged to be significantly thicker than the predetermined radial flexible wall thickness;

(b) providing a predetermined translucent thermoplastic material arranged to be injected in a molten state into the injection mold cavity;

(c) providing a predetermined thermoplastic color pigment having a predetermined color and a predetermined level of translucency.

(d) mixing a predetermined concentration of the predetermined thermoplastic color pigment into the predetermined translucent thermoplastic material prior to injection into the mold cavity so as to provide a predetermined pigmented thermoplastic mixture prior to injection;

(e) arranging the predetermined level of translucency and the predetermined concentration of the predetermined color pigment within the predetermined pigmented thermoplastic mixture, and arranging the respective radial thicknesses of flexible portions 6 and support members 4, so that the predetermined pigmented thermoplastic mixture within the flexible portions 6 is sufficiently translucent enough to permit at least 25% more ambient light to pass through the predetermined radial thickness of flexible portions 6 than through the radial thickness of support members 4 under ordinary indoor or outdoor ambient light conditions, so that flexible portions 6 appear at least 25% lighter in color than support members 4 under ordinary ambient light conditions so as to create a contrast in color between flexible portions 6 and support members 4 under such ordinary ambient light conditions.

In preferred embodiments, the above process would be arranged to permit at least 50% more ambient light to pass through flexible portions 6 than through support members 4 so that flexible portions 6 appear to be at least 50% lighter than support members 4 under ordinary ambient light conditions. In other embodiments, this percentage differential in the ability for ambient light to visibly pass through flexible portions 6 more easily than support members 4, can be at least 75%, at least 100%, at least 150%, at least 200%, at least 300%, at least 400% or at least 500% greater translucency along flexible portions 6 than along support members 4.

In alternate embodiments, the thickness of thicker portions can be arranged to be at least 100%, at least 200%, at least 300% or at least 400% thicker than adjacent thinner portions. In addition, it is preferred that the thinner portions be sufficiently thin enough to experience significantly illumination or lightening under substantially ordinary ambient light conditions in comparison to thicker portions.

This process can be adjusted in many ways, including selecting the predetermined translucency of the thermoplastic pigment to be semi-translucent/semi-opaque so that the semi-translucency appears to be nearly water-clear, or at least less opaque, as ambient light passes through the relatively thinner radial thickness of flexible portions 6, while such semi-translucent/semi-opaque color pigment used within the pigmented mixture becomes significantly less translucent and significantly more opaque as light is less able to pass through the radial thickness of support members 4. For example, a semi-translucent pigment can be added to a highly translucent thermoplastic, a highly translucent pigment can be added to a semi-translucent thermoplastic material, or a semi-translucent pigment can be added to a semi-translucent thermoplastic material in an amount effective to permit sufficient surrounding ambient light to pass through flexible portions 6 so that flexible portions 6 appear either clear, nearly clear, or light in color, while support members 4 preferably appear significantly darker in tone and/or more opaque and/or more clear so as to create a contrast in color and/or contrast in translucency and/or color intensity and/or providing lighter and darker alternating bands or other patterns of contrast for enhanced shelf appeal, eye-catching contrast, styling and improved marketability.

In addition, different surfaces can be arranged to have different textures to create changes in translucency and/or light conveyance. For example, the outer surfaces of support members 4 can be arranged to have a rough textured finish created by texturing the surface of the injection cavity mold that forms support members 4 with a rough finish such as from sand blasting, etching, electrostatic process or any other process, while the surfaces of the injection cavity mold that for the outer surfaces of flexible portions 6 are made with either a less textured surface or a highly polished surface. This can produce a clear or light colored window-like appearance along flexible portions 6, while also producing an opaque appearance along support members 4.

In alternate embodiments, such difference in surface textures can be reversed so that the outer surfaces and/or inner surfaces of flexible portions 6 have a relatively rougher surface finish than the outer surfaces and/or inner surface finishes of support members 4 so that flexible portions 6 appear more opaque than support members 4. For example, these methods can be used to create a frosted and/or relatively opaque appearance along flexible portions 6 while support members 4 are arranged to be less textured or even highly polished to create a differentiation in the appearance of illumination from ambient light conditions between flexible portions 6 and support members 4. This method can also be used to cause a greater quantity of ambient light to pass through support members 4 than through flexible portions 6 so that support members 4 can be arranged to be lighter in color or color intensity than flexible portions 6 and/or a different color tone than flexible portions 6 and/or a different level of clarity than flexible portions 6 so as to create a visual appearance of contrasting light filtering effects under ambient light conditions between support members 4 and adjacent flexible wall portions 6. The opposite arrangement can also be employed.

In addition, surface textures, the selected level of translucency within the thermoplastic material used and the selected level of pigment translucency within the pigment along with the concentration of such pigment and the thicknesses of flexible portions 6 and support members 4 can be arranged to control or maximize the contrast in light filtering effects between any portion or portions of flexible tube 2.

In other embodiments, the methods of the present invention can be used to create contrast between various support members 4 so that the appearance of one support member 4 is contrasted from the appearance of another nearby or farther away support member 4. Similarly, this method can be used to create a contrast between various flexible portions 6 so that the appearance of one flexible portion 6 is contrasted from the appearance of another nearby or farther away flexible portion 6. This method can be used with or without creating a significant differential in appearance between support members 4 and flexible portions 6.

In other embodiments, both the thermoplastic material and the thermoplastic pigment can be highly translucent and the concentration of the translucent pigment can be adjusted to permit a sufficiently higher amount of ambient light to pass through flexible portions 6 than the amount of light able to pass through support members 4 to cause flexible portions 6 to appear to be significantly light in color due to be "illuminated" or highly transparent when in the presence of ordinary ranges of ambient light while support members 4 appear to be significantly darker due to the increased amount of pigment created by the significantly greater radial thickness of support members 4, in which it is preferred that a relative balance is created between the pigment concentration being so small that there is no substantial difference in light passing through flexible portions 6 in comparison to adjacent support members 4, and the pigment concentration being so saturated that the amount of light passing through flexible portions 6 is excessively inhibited so as to cause flexible portions 6 to no longer exhibit a visual contrast with support members 4. Preferably, sufficient contrast should be arranged to create a dramatic eye catching effect of adjacent light and dark portions that give the appearance or feel of two different materials even though only one material is used.

This method also permits filtering of ambient light to be differentiated by arranging the concentration and/or translucency of the thermoplastic pigment within the pigmented thermoplastic mixture so that different light filtering effects are arranged. For example, a translucent blue pigment can be added in an amount sufficient to create only a relatively minor amount of blue filtering along flexible portions 6 such as would be seen on a light blue tinted window, while the increased radial thickness of support members 4 and the adjusted concentration and/or translucency of the pigment combine to cause support members 4 to create many times more filtering of ambient light so as to appear deep an/or dark blue so that dramatic eye-catching alternating bands of light and dark blue appear under the illumination of ordinary ranges of ambient light between flexible portions 6 and adjacent support members 4. For example, in one preferred embodiment, a suitable semi-translucent blue pigment can be added to a semi-translucent flexible thermoplastic silicone, having a Shore A hardness that is preferably less than 65 durometer, prior to injection molding and the pigment mixture is added at a concentration that is preferably selected between 1% and 5% by weight, and flexible portions 6 are arranged to be approximately 0.75 mm thick and support members 4 are arranged to be approximately 3 mm thick so that support members 4 in this example are approximately four times thicker than flexible portions 6, and then such pigment concentration and/or translucency is selected to create a significant and preferably maximized difference in color intensity and/or color contrast between flexible portions 6 and support members 4. Alternatively, support members 4 can be arranged to be at least 100%, 200%, 300%, 400%, 500% or 600% thicker than flexible portions 6. Alternatively, pigment concentrations can be at least 0.01% 0.1%, 0.25%, 0.5%, 0.75%, 1%, 2%, 3%, 4%, 5%, 6%, or 7% by weight, or any suitable concentration that can be used to create desired color contrasts in ordinary ambient light conditions.

As another example, a suitable translucent pigment can be mixed with a semi-translucent pigment and/or opaque pigment in order to create a significantly translucent window-like appearance along the thinner radial thickness of flexible portions 6, while such pigment selection is simultaneously arranged to cause the same pigmented thermoplastic mixture to become significantly darker and/or highly opaque in appearance along the thicker radial thickness of material along support members 4.

Preferably, the pigmented thermoplastic mixture is arranged and selected to create dramatic and contrasting light filtering effects that cause flexible portions 6 to be relatively illuminated under ordinary ambient light conditions such as in ordinary indoor lighting or showroom lighting, or cloudy to sunny outdoor ambient light conditions, while support members 4 are significantly darker and/or deeper and/or more intense in color so as to create a contrasted eye-catching appearance that increases visual appeal and marketability.

These same methods can be used to create color contrast within mouthpiece 14. In FIG. 1, mouthpiece 14 is seen to have a U-shaped member 364, a reinforcement member 366 and a sealing flange 246. The shading lines on reinforcement member 366 show that member 366 can be arranged to have a different color and/or color intensity than sealing flange 246. The methods of the present invention can be used to make reinforcement member 366 with a different material and/or a different color than sealing flange 246 (or other different parts of mouthpiece 14) by using more than one material in different phases of an injection molding process, the methods of the present invention also include making mouthpiece 14 with a single material and creating light filtering effects for contrasting color/intensity/translucency by making reinforcement member 366 significantly thicker than other portions of mouthpiece 14 while, using translucent or semi-translucent thermoplastic material and selecting the concentration and/or translucency and/or surface texturing to create visual contrasts in color intensity and/or tone under ordinary ambient light conditions as stated previously. These methods can create stunning and dramatic eye-catching light filtering effects for dramatically effective shelf appeal and marketing advantage.

These methods offer major advantages over the prior art in which both diving mouthpieces and snorkel flex tubes have always been made clear and colorless or completely opaquely colored so that no light illuminating effects or light filtering effects have every been exploited in a method to create a multi-material appearance with a single material that becomes dramatically apparent in ordinary ambient light conditions as provided by the methods of the present invention. Tests have shown that the methods of the present invention create an overwhelming improvement in styling and market appeal for mouthpieces and flex tubes that is so pronounced that the prior art appears antiquated in comparison due to the lack of such methods.

As one example of many possible embodiments, a method for providing mouthpiece 14 with color intensity contrast along U-shaped member 364 between reinforcement member 366 and sealing flange 246 can include:

(a) providing an injection mold cavity that is arranged to form reinforcement member 366 with a significantly greater material thickness than sealing flange 246 so that reinforcement member 366 is provided with a with a predetermined reinforcement member thickness and sealing flange 246 is provided with a predetermined flange thickness in which the predetermined reinforcement member thickness is arranged to be significantly thicker than the predetermined flange thickness;

(b) providing a predetermined translucent thermoplastic material arranged to be injected in a molten state into the injection mold cavity;

(c) providing a predetermined thermoplastic color pigment having a predetermined color and a predetermined level of translucency.

(d) mixing a predetermined concentration of the predetermined thermoplastic color pigment into the predetermined translucent thermoplastic material prior to injection into the mold cavity so as to provide a predetermined pigmented thermoplastic mixture prior to injection;

(e) arranging the predetermined level of translucency and the predetermined concentration of the predetermined color pigment within the predetermined pigmented thermoplastic mixture, and arranging the respective thicknesses of reinforcement member 366 and sealing flange 246 so that the predetermined pigmented thermoplastic mixture within sealing flange 246 is sufficiently translucent enough to permit at least 25% more ambient light to pass through the predetermined thickness of sealing flange 246 than through the thickness of reinforcement member 366 under ordinary indoor or outdoor ambient light conditions, so that sealing flange 246 appears at least 25% lighter in color than reinforcement member 366 under ordinary ambient light conditions so as to create a contrast in color between sealing flange 246 and reinforcement member 366 under such ordinary ambient light conditions.

In preferred embodiments, the above process would be arranged to create an appearance of color contrast that is at least 50%, at least 75%, at least 100%, at least 150%, at least 200%, at least 300%, at least 400% or at least 500% difference in color intensity between sealing flange 246 and reinforcement member 366 when viewed from the outer surface of U-shaped member 364 under ordinary ambient light conditions.

Other portions of mouthpiece 14 and/or flex tube 2 that are described further below in this specification as being molded with a separate material for color contrast can alternatively use the methods of the present invention for light filtering contrast effects under ordinary ambient light conditions as described above when such portions and adjacent regions of mouthpiece 14 and/or flex tube 2 are made with the same material during the same phase of any injection molding process.

FIG. 2 shows a side view of an alternate improved snorkel which is the same as in FIG. 1 except that support members 4 are wedge shaped. Support members 4 are seen to be narrower in width along inward bending surface 25 of flexible tube 2 and wider along outward bending surface 25' of flexible tube 2. This arrangement causes flexible portion 6 between support members 4 to be less wedge-shaped and more parallel in orientation when in bent position 24. In alternate embodiments, support members 4 may have any desired shape, contour, configuration or arrangement. In between bent position 24 and extended position 24, broken lines show an intermediate position 32. In alternate embodiments, flexible tube 2 may be pre-molded in position 24 or 26 or any position in between these positions or outside the range of these positions, or may rest at or between any of these positions while not in use. Any variations may be made to this embodiment shown and described and all variations, combinations, alternate embodiments within this description are incorporated by reference to this embodiment.

FIG. 3 shows a side view of an alternate embodiment snorkel that is similar to the embodiment in FIG. 1, except that the lower portion 10 in FIG. 1 has been replaced by an extended length to flex tube 2. In this embodiment, flex tube 2 has a lower end 34, an opening 36 and a purge valve 38 within lower end 34. The increased length of flex tube 2 can be used to further increase the flexibility of the snorkel. Any length or termination points of flex tube 2 may be used. As in other embodiments in this description, flex tube 2 can be arranged to allow the snorkel to flex between bent position 24 and extended position 26 displayed by broken lines in FIG. 3. Any variations may be made to these embodiments shown and described in FIGS. 1 to 3, and all other variations, combinations, and alternate embodiments within this specification are incorporated by reference to this embodiment.

FIG. 4 shows a side view of the improved flex tube shown in FIG. 1. FIG. 5 shows a cross section view taken along the line 5-5 in FIG. 4. The cross section of support members 4 are seen to have a support member inner surface 46, a support member outer surface 48, and support member lateral portions 50. Flexible portion 6 is seen to have an inner surface 52 and an outer surface 54. Flex tube 2 is seen to have a passageway 55. Flexible portion 6 is seen to be between support member inner surface 46 and inner surface 52 as well as between support member lateral portions of adjacent support members 4. In this embodiment, support members 4 are molded separately and then flexible portion 6 is injection molded around support members 4 so that the material of flexible portion 6 has a flow path between support member lateral portions 50 and underneath support member inner surface 46. This permits increased surface area for the weld bond between support members 4 and flexible portion 6 and also permits the material of flexible portion 6 to flow through such a flow path within the mold from across a major portion of the length of flex tube 2 and, or across the entire length of flex tube 2 and, or to all portions of flex tube 2. This can be used to reduce the number of injection points in the mold; however, many injection points may be used if desired, such as between two or more of the annular support members 4 if desired.

From the cross section view of FIG. 5, the connection ends 8 of are seen to overlap lower portion 10 and upper portion 12 of the snorkel with a contoured mechanical bond 56 having interlocking features such as mating grooves and ridges. This provides a quick, secure and water tight assembly and allows injection molding to be preferable over other methods of manufacture such as extrusion because such other processes would require multiple additional steps of fabricating a separate connection portion and then connecting such connection portion to flex tube 2 in a secure and water tight manner. Furthermore, by injection molding connection ends 8 with an elastic and extensible material, such as preferably used for flexible portion 6, connection ends 8 not only create a secure connection, but also acts as its own gasket for an airtight and watertight seal. While a mechanical bond created through injection molding is a preferred embodiment, any type of bond or connection device may be used to connect flex tube 2 to any part, object or device and can be made with any method of manufacture. Also, while one preferred embodiment provides mechanical bond 56 with interlocking annular grooves and ridges, helical or helical threading may be used or any other suitable mechanical connection. Alternatively, additional mechanical parts such as pipe clamps, zip ties, or any other connection members may be used with or without mechanical bond 56 being present. In addition, connections 8 may alternatively be made with separate semi-rigid or rigid materials that are stiffer than flexible material 6.

Flex tube 2 is seen to have an interior surface 57 along passageway 55. While interior surface 57 is seen to be substantially straight in this embodiment, interior surface 57 may have any shape, including curved, undulating, ribbed, channeled or any other suitable shape.

FIG. 6a to 6d show close up views of alternate support member shapes and molding methods for the support members shown in FIG. 5. Any variations may be made to these embodiments shown and described, and all other variations, combinations, and alternate embodiments within this specification are incorporated by reference to these embodiments.

FIG. 6a shows an enlarged view of the cross section of support member 4 in FIG. 5 in which support member outer surface 48 is seen to be rounded. FIG. 6b shows that lateral portions 50 of support member 4 may have lateral projections 58 which extend beyond lateral portions 50. Projections 58 are preferably created during the injection molding process used to make support members 4. Projections 58 may be of any shape, number, size, length, thickness or configuration. Preferably, projections 58 are used to increase the security of the bond between support members 4 and flexible portion 6. In this embodiment, flexible portion 6 is seen to have a vertical portion 60 that rises up above outer surface 54 and is bonded to lateral portion 50 of support member 4. This increases the surface area of the bond and further increases the durability of such bond.

FIG. 6c, support member 4 is seen to be taller and narrower and inner surface 46 is seen to be flush with inner surface 52 in this particular embodiment. In alternate embodiments, support member 4 may be any height and, or width and support member inner surface 46 may be any distance away from inner surface 52. In this embodiment, lateral projections 58 are seen to be taller; however, any shape may be used.

In FIG. 6d, support member outer surface 48 is seen to be flush with outer surface 54 so that the outer surface of flex tube 2 is smooth; however, support member outer surface 48 may be any distance above or below outer surface 54 of flexible portion 6.

FIGS. 7a to 7i show alternate cross sectional shapes taken along the line 7-7 in FIG. 5. Any variations may be made to these embodiments shown and described, and all other variations, combinations, and alternate embodiments within this specification are incorporated by reference to these embodiments. It is intended that any of the general cross sectional shapes shown in FIGS. 7a to 7i, or any combination or variation of these may be used in any of the embodiments, alternate embodiments, combinations or variations discussed in any or all other parts of this descriptions.

FIG. 7a shows flex tube 2 having a circular cross sectional shape. Flexible portion 6 is seen to be bonded to support member inner surface 46. Because support member 4 resists deformation and collapsing, support member 4 is held stable in the mold and does not move when flexible portion 6 is injection molded to support member inner surface 46. This occurs as the previously molded support member 4 is held in place by the upper and lower portions of outer mold halves and passageway 55 is formed by a tubular mold core and a space exists between support member inner surface 46 and the tubular mold core. This space allows flexible portion 6 to flow through a flow path between the tubular mold core and support member inner surface 46 and form a thermo chemical bond with support member 4. Preferably, for relatively short axial lengths for flex tube 2, flex tube 2 is formed or cast in an enclosed cavity injection mold with contained high pressure injection of thermoplastic material; however, any method of manufacturing or production may be used.

FIGS. 7b to 7i show some examples of the many possible cross sectional shapes that may be used for flex tube 2. This is a major advantage of the present invention because prior art flex tubes for snorkels use a circular cross sectional shape and create high levels of drag. The elongated shapes in FIGS. 7b to 7i can be used to provide reduced drag for snorkels during swimming. Also circular cross sectional shapes of the prior art can oscillate, flutter or buffet during higher swimming speeds and can pull on the swimmer's mask and jaw due to drag. The methods of the present invention can allow flex tube 2 to be more streamlined and produce reduced drag by using an elongated cross sectional shape that is preferably elongated in the direction of intended swimming. The methods of the present invention permit such cross sectional shapes to be used with reduced or eliminated collapsing during bending. In alternate embodiments, these and other cross sectional shapes can be used in any application in which a narrower profile is desired, whether or not a streamlined hydrofoil or airfoil shape is desired or intended.

FIG. 7b shows an alternate oval cross sectional shape which is much more streamlined and hydrofoil shaped than a circular cross sectional shape and is seen to have relatively elongated regions 61 and relatively narrower regions 61'. Preferably, elongated dimension 63 of this oval shape will be substantially oriented in the direction of intended swimming for reducing drag. In this embodiment, support member inner surface 46 has a standoff 62 that extends to inner surface 52. Standoff 62 permits support member 4 to rest against the tubular mold core that forms passageway 55 and serves to help hold support member 4 in place as flexible portion 6 is injection molded to support member 4. Standoff 62 may be used in any number, shape, size, configuration or arrangement or not used at all according to desire and the degree of stiffness or flexibility designed into support member 4. FIG. 7c shows flex tube 2 having an elongated oval cross sectional shape with two opposing substantially flat sides along elongated portions 63 and substantially rounded ends along narrower portions 63'. As example potential variations, this embodiment is seen to have four standoffs 62; however any number or configuration may be used or no standoffs can be used according to desire. FIG. 7d shows the cross section of flex tube 2 may be made substantially D-shaped. Preferably, the flat side would be substantially aligned with the user's face; however, any suitable alignment may be used. FIG. 7e shows a cross sectional shape that is substantially D-shaped with the flatter side being somewhat curved. FIG. 7f shows a variation in which the cross sectional shape is substantially triangular. FIG. 7g shows a cross sectional shape that is tear drop hydrofoil shaped. This embodiment shows a symmetrical hydrofoil shape; however, asymmetrical hydrofoil shapes may be used as well, in which one of the opposing sides is less curved than the other, such as various combinations between the shapes in FIGS. 7d, 7e, 7f and 7g. Preferably, the hydrofoil shape example in FIG. 7g would orient the rounded end in the direction of travel and the more pointed end would be the trailing end. In FIG. 7h, a hydrofoil cross sectional shape is shown in which both ends are relatively pointed; however any arrangement or combination of more rounded edges may be used as well. The cross sectional shape of flex tube 2 may be varied in any manner to form any circular, non-circular, symmetrical or asymmetrical shape. Preferably, when streamlined elongated and, or hydrofoil cross sectional shapes are used for flex tube 2, the other portions of the snorkel joining flex tube 2 will also have a similar hydrofoil shape; however, any combinations of different and or changing shapes along the snorkel may be used. Other alternative cross sectional shapes can include squares, parallelograms, diamonds, elongated diamonds, rhomboids, octagons, pentagons, multi-faceted shapes, rectangles or any other shapes or combinations of shapes whatsoever.

FIG. 7i is seen to have a substantially elongated rectangular cross sectional shape having elongated portions 61 along elongated dimension 63 and relatively narrower portions 61' along narrower dimension 63'. Similarly, the elongated cross sectional shapes in FIGS. 7b to 7i preferably are arranged to have elongated dimension 63 oriented in the direction of relative movement with the water while swimming for reducing drag on flex tube 2; however, the alignment of elongated dimension 63 for any elongated cross sectional shape may be oriented at any angle relative to the direction of intended swimming.

FIGS. 8a to 8b show a method for manufacturing an improved flex tube for a snorkel. Flex tube 2 is the same as shown in FIG. 4 except that flexible portion 6 is seen to be concavely curved between support members 4 in this embodiment as an example of many possible variations. Support members 4 are seen to be joined by an elongated bridge 68 having connections pins 70 that connect bridge 68 to support members 4. Bridge 68 and pins 70 are preferably made with the same material as support members 4 during the same injection molding step used to make support members 4. This allows then entire group of support members 4 to be loaded simultaneously into a subsequent mold in which flexible portion 6 is molded to support members 4 to form flex tube 2. Alternatively, support members 4 could be individually loaded into the subsequent mold; however, bridge 68 and pins 70 are one method for reducing assembly time by permitting a group of support members 4 to be loaded into a mold in one quick step. Preferably, if bridge 68 is used for this purpose, both bridge 68 and pins 70 will lie horizontally along the parting line of the initial mold and subsequent mold to permit loading and demolding. Pins 70 are seen to have abrupt shear points 72 to permit bridge 68 and pins 70 to be cleanly broken off of support members 4 after flexible portion 6 has been molded to support members 4 as shown in FIG. 8b. For example, bridge 68 and pins 70 could be pivoted forward or back, or both in a direction that is transverse to their overall alignment in order to break shear points 72 away from support members 4 so that bridge 68 and pins 70 can disconnected from flex tube 2 in one quick and easy step. Shear points 70 can be shaped in any suitable manner so that support members 4 are relatively clean and any remaining marks on support members 4 are unobtrusive, inconsequential and reasonably unnoticeable. Any variations may be made to these embodiments shown and described, and all other variations, combinations, and alternate embodiments within this specification are incorporated by reference to these embodiments.

FIGS. 9a to 9b show an alternate method for manufacturing an improved flex tube 2. In this embodiment, flex tube 2 is similar to that shown in FIG. 8a except that support members 4 are made with two different materials. In this example, support members 4 alternate in material composition so that support members 4 include a first support member set 74 and a second support member set 76. In FIG. 9a, support member set 74 is connected by a bridge 78 with pins 80, which are all made with the same thermoplastic material. Similarly, support member set 76 is connected to a bridge 82 with pins 84, which are preferably made with a separate thermoplastic material. To illustrate the use of different materials, support member set 74, bridge 78 and pins 80 are drawn with heavier lines than support member set 76, bridge 82 and pins 84, respectively. Support member set 76 and support member 78 can be made with the same material but different colors for styling selections and, or can be made with different levels of stiffness so that one support member set is more flexible or more rigid than the other to adjust bending characteristics of flex tube 2 as desired. Bridges 78 and 82 permit support member sets 74 and 76, respectively, to be loaded simultaneously into a subsequent mold that will injection mold flexible portion 6 to support members 4. The spacing intervals between the support members of support member set 74 and 76 permit this embodiment to have alternating adjustments in the material used for support members 4; however, any arrangement, configuration, interval, spacing, combination, shape, size or material characteristics can be used for alternate embodiments. Pins 80 and 84 have predetermined shear points 86 for allowing the temporary bridges 78 and 82 and pines 80 and 84 to be quickly broken off of support members 4 after flexible portion 6 has been injection molded around and to support members 4 as shown in FIG. 9b. While bridges 68, 78 ad 82 are seen to be straight in the embodiments shown in FIGS. 8a to 9b, such bridges may be bent, curved or any desired shape with or without flex tube 2 being molded in a bent or curved configuration. Any variations may be made to these embodiments shown and described, and all other variations, combinations, and alternate embodiments within this specification are incorporated by reference to these embodiments.

FIG. 10a shows a side view of a set of interconnected and axially spaced apart support members 4 created during a early step in manufacturing. Support members 4 are similar to those in FIG. 4, except in this embodiment, support members 4 are connected together by a series of connections 88 so that a group of support members 4 can be loaded into a subsequent mold in one step. In this embodiment shown in FIG. 10a, connections 88 are seen to have at least one standoff 90; however, in alternate embodiments any number, shape, configuration, arrangement or type of standoffs may be used or no standoffs may be used as desired. Support members 4 are first molded in the configuration shown in FIG. 10a and then this interconnected group of support members 4 are loaded simultaneously into a subsequent mold in which flexible portion 6 is molded onto support members 4.

FIG. 10b shows flex tube 2 after flexible portion 6 has been molded to support members 4. While injection molding is preferred, other methods of molding may be used as well, including compression molding, rotational molding, blow molding, curing molds, lamination or any other type of fabrication process. Connections 88 are visible along a portion of flexible portion 6 because connections 88 are molded to permit connections 88 to be visible; however, in alternate embodiments, connections 88 may be partially visible or completely hidden within flexible portion 6 if desired. In this embodiment, there is no need to break away connections 88 from flex tube 2 as they are made relatively thin and flexible so as to not significantly affect the flexibility or bending resistance of flex tube 2. In one embodiment, the alignment of connections 88 can be oriented along or near the neutral bending surface of flex tube 2 relative to the direction of bending so that connections 88 are subjected to minimal bending forces so as to reduce, minimize or eliminate any bending resistance created by connections 88. In such a situation, connections 88 can be aligned along flex tube 2 along a side of flex tube 2 that is laterally oriented to the plane of bending, such as described in FIG. 1 regarding neutral bending surface 23. In this embodiment in FIG. 10a, support members 4 and connections 88 are preferably made with a thermoplastic material that is relatively stiff when thicker and significantly flexible when made relatively thin and, or with a small cross sectional volume. Preferably, the material for support members 4 and connections 88 is highly flexible when made with a thin and, or small volume cross section.

FIG. 11 shows a cross section view along the line 11-11 in FIG. 11. This cross sectional view allows connections 88 to be seen in relation to the overmolded flexible portion 6. In this embodiment, flexible portion 6 is seen to be laminated on the inside of connection 88 and standoff 90 is seen to extend to inner surface 52 of flexible portion 6. Standoff 90 helps keep connection 88 pushed toward the outer side surface of flex tube 2 so that flexible portion 6 laminates along the inner side of connection 88. In alternate embodiments, this can be reversed so that standoff 90 is aimed outward and flexible portion 6 is laminated along the outer side of connection 88. If standoff 90 is shaped like a small point, then this would cause only a small point to be visible along the outer side of flex tube 2 with most of connection 88 hidden from being seen from the outer side of flex tube 2. Also, in this embodiment, flexible portion 6 and connections 88 are preferably bowed between adjacent support members 4 so as to provide a predetermined amount of looseness between support members 4; however, any degree of looseness or no looseness may be used as well.

FIGS. 12a and 12b show the same support members 4 as in FIG. 10a except that connections 88 are arranged differently than in FIG. 10a. In FIG. 12a, the position of connections 88 are seen to vary between each adjacent support member 4 so as to minimize any potential effect on bending resistance created by connection 88 so that any potential effect, if any, is not concentrated in one area. In this embodiment, the position of connections 88 are progressively rotated approximately 90 degrees from one adjacent support member 4 to another; however any variation in position or positions may be used. Any orientation, alignment, shape, configuration, arrangement, or combinations of connections 88 may be used. In FIG. 12b, a plurality of connections 88 are used between adjacent support members 4. This can further stabilize support members 4 while being loaded into a subsequent mold for overmolding flexible portion 6 to support members 4 as support members 4 will be less likely to need an adjustment to their positioning when being inserted into the subsequent mold. In this example, connections 88 are located at opposite sides of support members 4; however, any positions, orientations, alignments, combinations or configurations may be used. Any variations may be made to these embodiments shown in FIGS. 10a to 12b and described, and all other variations, combinations, and alternate embodiments within this specification are incorporated by reference to these embodiments.

FIG. 13 shows a side view of an alternate embodiment in which support members 4 are separated by support members 92. Support members 92 are thickened portions of flexible portion 6 so that support members 92 are made with the same material as flexible portion 6 and during the same step of injection molding. This embodiment uses a fewer number or support members 4 that are made with a stiffer material than flexible portion 6 and support members 92. Support members 4 effectively reduce or even prevent collapsing of flex tube 2 while flexible portion 6 and support members 92 are arranged to be sufficiently flexible to permit flex tube 2 to bend with relatively low levels of bending resistance.

Figure 14:
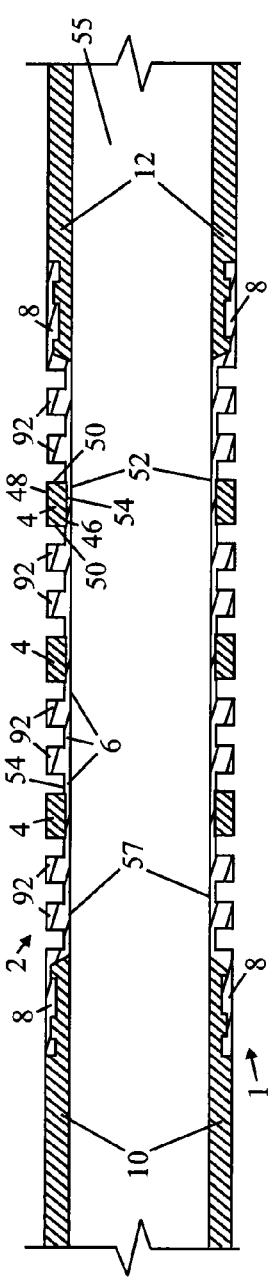
FIG. 14 shows a cross section view taken along the line 14-14 in FIG. 13.

FIG. 14 shows a cross section view taken along the line 14-14 in FIG. 13. In this embodiment, flexible portion 6 is seen to be able to flow through a flow path around support member inner surface 46 of support members 4 to increase bonding surface area and to permit the flow of flexible material 6 along the entire length of flex tube 2 during injection molding.

Figure 15:
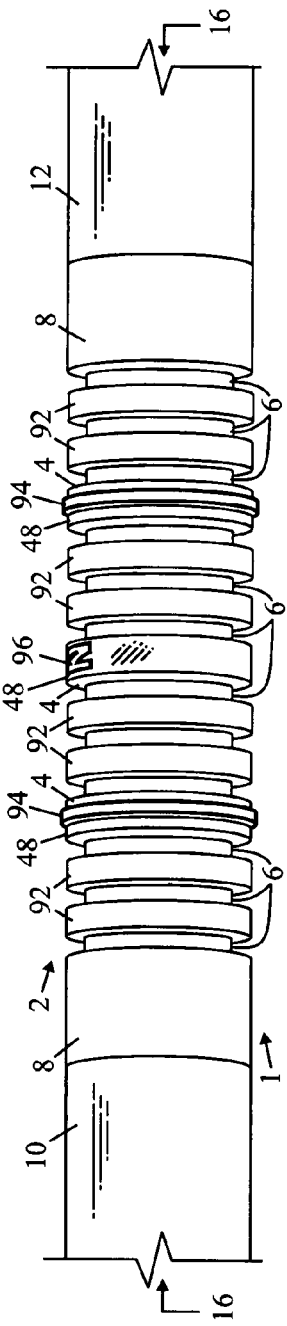
FIG. 15 shows a side view of an alternate embodiment.

FIG. 15 shows a side view of an alternate embodiment of flex tube 2 shown in FIG. 13 in which support members 4 have external overmolding of a different thermoplastic material. Two of support members 4 are seen to have an overmolded portion 94 that is rib shaped in this particular embodiment; however, any overmolded portion 94 may have any shape, contour, positioning, orientation, alignment, or configuration as desired. In one embodiment, overmolded portion 94 can be made with a relatively softer thermoplastic material connected to support member 4 with a thermo chemical bond created during injection molding; however, relatively stiff materials may be used as well. The material of overmolded portion 94 can be selected to vary the overall stiffness or flexibility of support member 4, to create a contrast in color for styling purposes, to create a change in texture or contour for gripping, traction, cushioning, abrasion protection, or any other suitable purpose. If a softer material is used to make overmolded portion 94, such a softer thermoplastic material can be the same material used to make flexible portion 6 and support members 92 during the same phase of injection molding or may be made with a separate material during the same phase or a different phase of injection molding. One of the support members 4 is seen to have an overmolded design 96. The methods of the present invention can permit a contrast in color to exist within at least one of support members 4 in order to permit fabrication of a marketing design, logo or brand name to be visible during the methods of injection molding disclosed. This can increase styling and also permit consumers to identify products using the improved methods of the present invention in comparison to prior art flex tubes in snorkels that are made with one material. Overmolding portion 94 and overmolding design 96 can be molded to the outer portions of support members 4 through a separate gate in the mold or can flow through a small channel, flow path, hole or opening within a support member 4 that permit flexible portion 6 to flow through such channel from underneath at least one support members 4 through to the outer surface 48 of support member 4. Such overmolding portions 94 or overmolding designs 96 on support members 4 themselves can be used on any embodiment using any number of support members 4, with or without softer support members 92 or other combinations of or variations of such structures.

Figure 16:
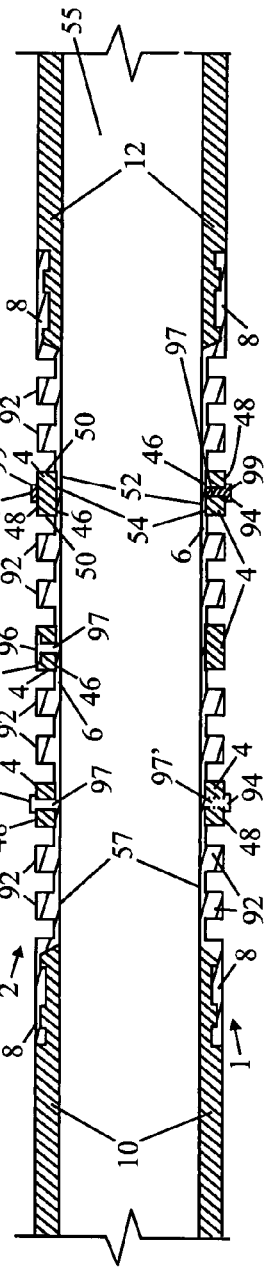
FIG. 16 shows a cross section view taken along the line 16-16 in FIG. 15.

FIG. 16 shows a cross section view taken along the line 16-16 in FIG. 15. This cross section view in FIG. 16 shows various examples of methods for making overmolding portion 94 or overmolding design 96, which are examples of possible overmolded members. A channel 97, which may be any type of opening, flow path, hole, groove or the like, is seen to exist through support member 4 near the upper left portion of flex tube 2. This shows that the material of flexible portion 6 is allowed to flow through support member 4 when forming overmolded portion 94. However, any method of forming overmolded portion 94 may be used. A channel 97' is shown with dotted lines within the lower portion of support member 4 near the lower left portion of flex tube 2 to show that channel 97' is spaced from the plan of this cross sectional view. Channels 97 and 97' can be intermittent spaced apart channels, holes, passageways, cavities, voids or continuous features. In this example, overmolding portion 94 is seen to be raised above support member outer surface 48; however, any arrangement may be used such as being flush or recessed. Overmolding design 96 is seen to be recessed into support member 4 and also be flush with support member outer surface 48; however, any variation or combination may be used as well for overmolding design 96 or overmolding portion 94. Overmolding design 96 is seen in this example to also use channel 97. Channel 97 is seen to extend through to support member inner surface 46; however, any length, depth, size or variation may be used for channel 97. For example, in alternate embodiments, channels 97 or 97' can extend a predetermined distance into support member 4 and not extend all the way through or even provide a connection through support member 4 and this would allow a separate injection or material to fill into channels 97 or 97' to form an improved bond having both chemical and mechanical bonds. Overmolding portion 94 along the right side of flex tube 2 shows another variation in which a separate material 99 is used for overmolding portion 94 rather than the material used to make flexible portion 6. This would allow different material characteristics and properties to be used and would also permit a different color to be used for styling benefits. Material 99 of overmolding portion 94 is seen to be laminated on support member outer surface 48 of support member 4 near the upper right had portion of flex tube 2 in this view. The portion of support member 4 near the lower right portion of flex tube 2 in this view shows that material 99 in overmolding portion 94 extends into channel 97. In this particular embodiment, material 99 contacts the material of flexible portion 6, and this can be achieved by molding material 99 in a separate injection molding step prior to molding flexible portion 6. In alternate embodiments, material 99 can be separated from flexible portion 6 by support member 4 so that both material 99 and flexible portion 6 can be injection molded to support member 4 during the same phase of injection molding through separate gates in the mold for each material. In alternate embodiments, flexible portion 6 can also be made with two or more separate materials injection molded during a single overmolding step or in separate injection molding steps. This can allow the flexibility of flexible portion 6 to be varied as well as provide methods for making variations color contrast and style. For example, in alternate embodiments, support members 4 could completely separate flexible portion 6 into separate segments which are each separately injected with different materials having different predetermined levels of flexibility and, or different colors.

Any variations may be made to these embodiments shown and described in FIGS. 13 to 16, and all other variations, combinations, and alternate embodiments within this specification are incorporated by reference to these embodiments.

FIG. 17 shows a side view of an alternate embodiment in which flex tube 2 is made with softer support members 92 as shown in FIG. 13; however, support member 4 is located in within flexible portion 6 of flex tube 2 to prevent or reduce the potential collapse of flex tube 2. In this embodiment, support member 4 is cylinder shaped; however, any suitable shape may be used. In this embodiment, support member 4 is an insert 97 that is within flex tube 2; however, support member 4 may be configured, arranged, positioned and, or connected to flex tube 2 in any suitable manner. In one embodiment, flex tube 2 may be made in two portions having connecting ends 98, each of which encapsulate a portion of support member 4 and become secured by gripping support member 4 with a mechanical bond and, or a chemical bond. Each of connecting ends 98 have a terminating end 99. In alternate embodiments, the axial dimension of support member 4 may be increased to any desired length and may extend to the outer surface of flex tube 2 so that support member 4 is visible from the exterior of flex tube 2. In such a situation, terminating ends 99 would be axially spaced apart from each other with support member 4 showing at the outer surface of flex tube 2 and being in between such axially spaced apart terminating ends 99.

Alternatively, support member 4 may be connected to flexible portion 6 with a chemical or thermo chemical and, or mechanical bond. For a chemical bond, support member 4 may be secured in place with a chemical adhesive or with a thermo chemical bond. For a thermo chemical bond, support member 4 can be placed into a mold and the material of flexible portion 6 can be molded over support member 4 and secured with a weld bond. In this overmolding situation, flex tube 2 is molded in one piece and support member 4 can have any shape, width, size and, or configuration and a plurality of such narrower inserts can be used and spaced apart in any desirable manner. If flexible portion 6 is made with a translucent or transparent material, then support member 4 can be visible rather than hidden, and if desired, this can permit support member 4 to have a different color or visible design that is visible to consumers.

FIG. 18 shows a cross section view taken along the line 18-18 in FIG. 17 in which support member 4 is seen to be inside of flexible portion 6.

FIG. 19 shows a side view of an alternate embodiment in which support members 4 can be a slotted insert 100 and, or a deformable insert 102 that is manually inserted within flex tube 2. Horizontal dotted lines within slotted insert 100 show a slit 104. In this embodiment, support members 4 may be axially contained by tension from flexible portion 6 and, or may be contained within a cavity along the inner surface of flexible portion 6 that has lateral walls, ribs or edges that axially contain support members 4. In alternate embodiments, any number of support members 4 may exist on the outside of flex tube 2 rather than beneath flexible portion 6 so that the material of support members 4 may be seen from the outside of flex tube 2. Alternate embodiments may also have no slit 104. Also, alternate embodiments can have support members 4 molded to flexible portion 6 with a chemical bond. While support members 4 are seen to have a significantly wide axial dimension relative to the longitudinal alignment of flex tube 2, significantly narrower or wider widths may be used as well.

FIG. 20 shows a cross section view taken along the line 20-20 in FIG. 19 in which a slit 104 exists in insert 100. In FIG. 21, slit 104 is seen to permit insert 100 to constrict in size to a compressed position 106 when a compression force 108 is applied to insert 100, such as by squeezing insert 100 between two fingers. This compressed position 106 permits the size of insert 100 to be reduced so that it can be manually inserted within flex tube 2 and can then expand to an expanded position 110 inside of flex tube 2 when compression force 108 is removed.

FIG. 22 shows a cross section view taken along the lines 22-22 in FIG. 19.

FIG. 23 shows a cross section view of deformable insert 102 shown FIG. 22. In FIG. 23, deformable insert 102 is seen to contract under applied compression forces 108, which can be applied with two fingers and a thumb, or a suitable device with compression forces 108 being applied in one or two dimensions to create a reduction in size to a compressed position 112 for manual insertion into flex tube 2, and then compression forces 108 can be released so that insert 102 expands to expanded position 114 within flex tube 2 to achieve the condition shown in FIG. 19.

Alternatively, inserts 100 and 102 may be relatively rigid and with or without any slit or deformability, and then flexible portion 6 can injection molded over them and secured with a thermo chemical bond created during injection molding. Any variations may be made to these embodiments shown and described in FIGS. 17 to 23, and all other variations, combinations, and alternate embodiments within this specification are incorporated by reference to these embodiments.

Figure 24:
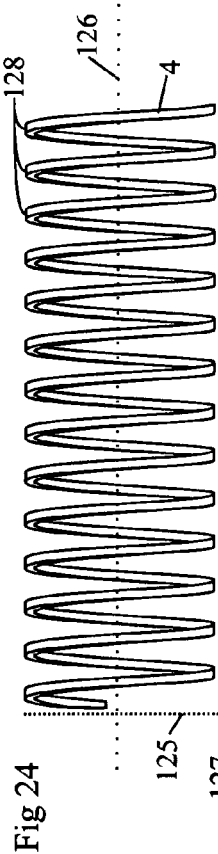
FIG. 24 shows a side view of a helical shaped support member that forms in one piece during an early step in manufacturing.
Figure 25:
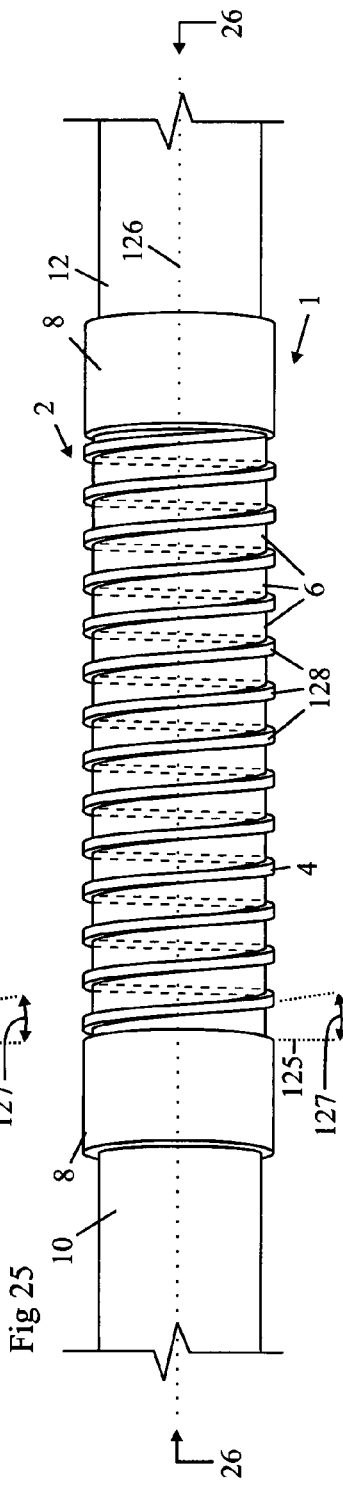
FIG. 25 shows a side view of an alternate embodiment flex tube in which the helical support member in FIG. 24 has had flexible material molded to it during a subsequent step in manufacturing.

FIG. 24 shows a side view of support members 4 that are helical shaped to form one piece during an early step in manufacturing. In alternate embodiments, multiple pieces by be formed separately if desired. Preferably, this process is similar to that shown in FIGS. 10*a* to 12*b*, except that support members 4 are connected by virtue of the helical configuration during an early step of injection molding. Preferably, support member 4 is formed or cast during a phase of an injection molding process; however, any fabrication process may be used. In FIG. 24, the support members 4 are substantially annular in shape but deviate from a radial plan 125 to form a helical rib member or helical reinforcement member. In FIG. 24, a dotted line shows a mold parting line 126, which is a plane extending into the page for the separation portion of two opposing halves of a mold used preferably for injection molding. Mold parting line is seen to be perpendicular to radial plane 125. The plane of mold parting line 126 is seen to be parallel to the longitudinal central axis of flex tube 2, and from the view in this example, line 126 is seen to be at the longitudinal center axis of flex tube 2. Support members 4 are seen to form spiral around flex tube 2 at a predetermined angle 127 relative to radial plane 125. Angle 127 may be formed at any angle during molding. Preferably, angle 127 is selected to create relatively low levels bending resistance about an axis that is transverse to the longitudinal axis of the helical shape of support members 4 while providing sufficiently higher resistance to radial compression forces so as to reduce or prevent support members 4 from collapsing during such bending. Examples of possible ranges can include setting angle 127 to be molded within a range from 3 to 5 degrees, 5 to 7 degrees, 7 to 10 degrees, 10 to 13 degrees, 13 to 15 degrees or greater than 15 degrees. Support member angle 127 permits support member 4 to form a series of axially spaced apart coils 128 which permit a single support member 4 to act like a series of ribs FIG. 25 shows a side view of flex tube 2 in which is produced by taking support members 4 previously molded as a separate part shown in FIG. 24, inserting such helical or helical shaped support members 4 into a subsequent mold, and preferably injection molding flexible portion 6 to support members 4 with a thermo chemical bond created during such injection molding process. Angled dotted lines show support members 4 extending around flex tube 2 in a helical manner. FIG. 25 shows connection portions 8 being molded integrally with flexible portion 6 to form flex tube 2. In alternate embodiments, connections 8 may be made with any material including a separate material than used in flexible portion 6.

In other embodiments, connection portions 8 may be connected to flex tube 2 in a different phase of fabrication, may be made with separate parts, may be connected in any manner and may provide any method of connection to any predetermined body for any use, with or without using mechanical bond 56. However, it is preferred that connection ends 8 are molded integrally with flex tube 2 in order to reduce production and assembly time and costs. In FIG. 25, mold parting line 126 is shown to illustrate that the subsequent mold step used to mold flexible portion 6 to support members 4 may also have parting line 126 exist within a plane that is aligned with the center longitudinal axis of flex tube 2. The exact same parting line 126 may be used, or alternatively, a different parting line may be used as well. In FIG. 24, support members 4 are seen to helical around flex tube 2 at predetermined support member angle 127 from radial plane 125 of flex tube 2. Support member angle 127 may be any desired angle. Support member angle 125 is seen to be formed at angle to radial plane 127, which is substantially normal or perpendicular to mold parting line 126.

A significant benefit to the methods of the present invention for providing flex tube 2 with support members 4 made in a helical shaped configuration along the length of flex tube 2 is that such helical reinforcement places the alignment of each adjacent support member 4 at an angle to radial plane 125. This provides additional reinforcement against torsional forces that attempt to twist flex tube 2 around a longitudinal axis. This is because such torsional forces create compression and tension forces in a diagonal direction that is at an angle to radial plane 125. Consequently, angle 127 combines with the helical shape to reduce buckling or collapsing of flex tube 2 under twisting forces during use and while bending. With support members 4 coiled like a spring, torsional forces along the longitudinal alignment of flex tube 2 will tend to cause support members 4 to either expand longitudinally when twisted in an direction that is opposite to the direction of the coil, or contract longitudinally when twisted in the direction of the coil; and meanwhile, flex tube 2 will have increased protection against buckling under such torsional forces.

In alternate embodiments, support members 4 could be extruded separately and then cut and placed into a separate injection mold to form flexible portion 6. In other embodiments, support members 4 could be extruded and then flexible portion 6 could be laminated as a tubular sheet and bonded to support members 4, or shrink wrapped to support members 4 and connected with a chemical bond. In still other embodiments, support members 4 could be intermittently extruded at specific lengths while flexible portion 6 is also intermittently extruded or continuously extruded so as to permit support members 4 to cease at certain lengths in order to permit connections 8 to be formed.

In alternate embodiments, any or all portions of U-shaped member 364 and/or bite tabs can be made with one predetermined thermoplastic material while any portion or all portions of connection portion 62 is made with a different predetermined thermoplastic material.

In any alternate embodiment, the methods of the present invention can include using two phase injection molding entirely for styling and marketing benefits on or between U-shaped member 364 and connection portion 262 (or any other portion or embodiment or variation disclosed) without achieving or intending to achieve any other of the many possible benefits and methods disclosed in this specification.

Figure 26:
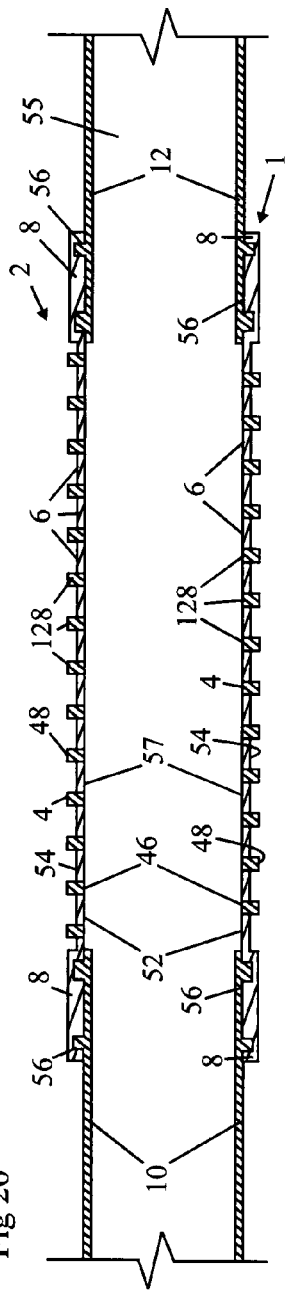
FIG. 26 shows a cross section view taken along the line 26-26 in FIG. 25.

FIG. 26 shows a cross section view taken along the line 26-26 in FIG. 25. In this view, support member inner surface 46 is seen to be flush with inner surface 52 of flexible portion 6. In this example, the material of flexible portion 6 does not flow underneath support members 4, but flows parallel to the helical shape during injection molding. This means that flexible portion 6 may be injected at one end or the center of flex tube 2 and such material will then flow in a helical pattern to all other portions of flex tube 2 that are adjacent to support members 4. In alternate embodiments, flexible material 6 may also flow along support member inner surface 46 and fuse to such support member inner surface 46. The cross sectional shape of support members 4 in FIG. 26 are seen to be substantially square or rectangular; however, any cross sectional shape may be used, including any of the cross sectional shapes shown for support members 4 in FIGS. 6a to 6d, the cross sectional shapes shown in FIGS. 27a to 27d below, or any other cross sectional shape, size, proportion, variation, combination or arrangement.

Figure 27A:
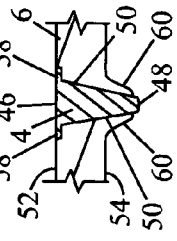
FIGS. 27a to 27d show examples of alternate cross sectional shapes and molding processes for the support members shown in FIG. 26.

FIG. 27a to 27d show close up examples of alternate cross sectional shapes and molding processes for support member 4 and adjacent flexible portion 6 to those shown in FIG. 26. In FIG. 27a, support member 4 is seen to have lateral projections 58, which increase the surface area of the bond between support member 4 and flexible portion 6 while also providing a mechanical hold within flexible portion 6 to prevent support member 4 from separating from flexible portion 6 under stress and loads.

Figure 27B:
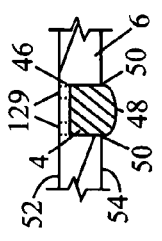

FIG. 27b shows a side view of an alternate embodiment in which includes a support member standoff 129, which permits flexible portion 6 to bond to a major portion of support member inner surface 46 while stabilizing the position of support member 4 within the subsequent mold as flexible portion 6 is injection molded around support member 4. Support member outer surface is seen to have a rounded shape. Support member 4 is sent to have lateral projections 58 extending from lateral portions 50. Dotted lines within lateral projections 58 display perforations 59 which are vertical holes that allow the flexible material of flexible portion 6 to flow through perforations 59 within lateral projections 58 during injection molding. This creates a mechanical bond between support member 4 and flexible portion 6.

Figure 27C:
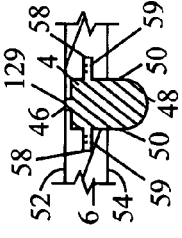

FIG. 27c shows an alternate cross section view of support member 4 in which uses two spaced apart support member standoffs 129 shown by dotted lines to show that such standoffs exist further into the page to show that support member standoffs 129 are intermittent rather than continuous around the entire length of support members 4. Such an intermittent arrangement allows flexible portion 6 to flow along support member inner surface 46 for increased surface area for the chemical bonding, while also allowing increased stabilization of support member 4 within the subsequent mold due to standoffs 129.

Figure 27D:
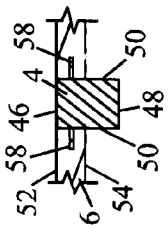

FIG. 27d shows a side view of an alternate embodiment in which support member 4 is slender in an axial direction that is parallel to the longitudinal axis of flex tube 2 and is also elongated in a direction that is radial to the longitudinal center axis of flex tube 2. This permits support member 4 to be relatively flexible in an axial direction and relatively rigid in a radial direction so that support member 4 is flexible to bending forces to permit flex tube 2 to bend with reduced bending resistance, while the rigidity in a radial direction reduces or prevents flex tube 2 from collapsing. Additionally, this configuration can allow support member 4 to be made with increased levels of flexibility to further reduce bending resistance as the increased radial dimension increases radial stiffness like and I-beam. In this embodiment, lateral projections 58 are seen to be flush with inner surface 46. This embodiment also shows lateral portions 50 having alignments that are at a predetermined angle to the overall radial alignment of support member 4. Preferably, at least one of such lateral portions 50 are oriented at a predetermined angle from the radial alignment of support member 4 so that such angle reduces or preferably prevents the existence of an undercut within the upper and/or lower halves of the injection molding cavities (and/or the mold core) so as to permit simple and efficient demolding of parts from the mold cavities at all portions along the helical path of support member 4 about flex tube 2. This method for providing efficient demolding by reducing or eliminating undercuts in the mold through sufficient angling of lateral portions 50 may be used along the lateral portions of any alternate embodiment whatsoever, including when support member 4 is made with flexible material, semi-flexible material, stiff material, multiple materials, or if flex tube 2 is made with a single material during a single step of an injection molding process. In alternate embodiments, increased radial stiffness can be used to permit support member 4 to be held more firmly in the subsequent mold without the use of a stand off along support member inner surface 46 or without support member inner surface 46 being flush with inner surface 52. In this embodiment, flexible portion 6 is seen to extend along support member lateral portions 50 to form vertical portions 60 for increased surface area bonding as well as increased flow during overmolding of portion 6 during injection molding; however, alternate embodiments may use any type of connection. Preferably, vertical portions 60 are seen to have an angled alignment along the outer surfaces so as to improve and facilitate demolding.

FIG. 28 shows a side view of the embodiment shown in FIGS. 27 to 30. In FIG. 28, flex tube and lower portion 10 are seen to be in extended position 26. Flex tube 2 may be pre-molded in position 26 and, or may extend to position 26 when mouthpiece 14 is not in the swimmer's mouth.

FIG. 29 shows a side view of the embodiment in FIGS. 24 to 28. In FIG. 29, flex tube 2 is seen to be in bent position 24 which is positioned to permit mouthpiece 14 to be used by a swimmer to receive breathable air from above the water's surface through upper portion 12 of the snorkel. Flex tube may be pre-molded in bent position 24 and may stay remain substantially close to position 24 when not in use or may extend to or near extended position 26 when not in use. It is preferred that flex tube 2 be sufficiently flexible to flex between positions 24 and 26 with sufficiently low bending resistance to substantially reduce jaw fatigue. Preferably, bending resistance and recoil force will be sufficiently low enough to enable mouthpiece 14 to remain in the swimmer's mouth without having a noticeable tendency to pull out of the mouth when not intended or to permit biting tension on bite tabs 250 to be reduced.

Any variations may be made to these embodiments shown and described in FIGS. 24 through 29, and all other variations, combinations, and alternate embodiments within other portions of this specification are incorporated by reference to these embodiments.

FIG. 30 shows a side view of an alternate embodiment in which adjacent coils of support members 4 are spaced apart from one another at a farther distance than shown in FIG. 25 due to angle 127 in FIG. 30 being greater than that in FIG. 25; however, such spacing and change in alignment may be varied in an manner. While it is preferred that a greater number of coils are used rather than less so that a more flexible material may be used for support members 4 to minimize bending resistance while the increased number of coils created by a reduced angle 127 provide increased radial rigidity and structure, any number of coils, spacing between coils, size of coils and any support member angle 127 may be used to create variations in flex characteristics. Also, it is preferred support members 4 be arranged to have a substantially light spring tension and bending resistance along the length of flex tube 2 while providing relatively high levels of radial bending resistance to reduce or prevent collapsing or buckling of flex tube 2 during bending, under load and, or during use. In the embodiment of FIG. 30, support members 4 are seen to terminate at connection end 8 with a radial coil 130 which is connected to support members 4. Radial coil 130 is preferably molded integrally with support members 4 using the same material as support members 4; however, radial coil 130 may be made with any desired material during any step of fabrication and connected with any chemical and, or mechanical bond. Preferably, radial coil 130 is either a closed loop of any desired cross sectional shape; however, in alternate embodiments radial coil 130 may also be a partially closed loop, an open loop, a closed coil, an open coil, or may have any shape, arrangement or configuration. In this embodiment, radial coil 130 is parallel to radial plane 125; however, any desired alignment, configuration or shape may be used. Coil 130 is seen to be connected to connection 8 near lower portion 10. Preferably, coil 130 is connected to connection 8 with a chemical bond 132 and connection 8 is preferably connected to lower portion 10 with a mechanical bond; however, any chemical and, or mechanical bond may be used. Near upper portion 12, flexible portion 6 is seen to be connected directly to upper portion 12 with a flexible member 134 that is preferably molded integrally with flexible portion 6 using the material of flexible portion 6 and connected to upper portion 12 with a chemical bond 136. In this embodiment, there is no connection end 8 being used to connect flex tube 2 to upper portion 12; however, any chemical and, or mechanical bond may be used.

In this embodiment of FIG. 30, support members 4 can be made with a separate material than used to make upper portion 12 and, or lower portion 10, or alternatively, support members 4 can be molded with the same material as upper portion 12 and formed during the same phase of molding upper portion 12. In such a situation, upper portion 12 can be molded integrally with support members 4 so that support members 4 are connected to and helical off upper portion 12 from an early step in an injection molding process, or other suitable molding process, and then upper portion 12 and support members 4 are inserted into a subsequent mold and flexible member 134, flexible portion 6 and connection end 8 are molded onto upper portion 12 and support members 4 preferably with a thermo chemical bond. This can save steps in assembly and material costs as well as create a streamlined profile and secure water tight connection. However, any other fabrication process or suitable chemical and or, mechanical bond may be used as well. In alternate embodiments, both upper portion 12 and lower portion 10 can be molded integrally with support members 4 with flexible portion 6 molded to such parts during a subsequent step in an injection molding process. Using at least one connection end 8 using a mechanical bond existing along at least one end of flex tube 2 can allow at least one of portions 10 or 12 to have a more complex shape formed in a different mold if desired, or alternatively, both ends of flex tube 2 may use connection ends 8 with or without radial coil 130. In alternate embodiments, lower end 10 may be connected to flex tube 2 with a chemical bond while upper portion 12 is connected to flex tube 2 with connecting end 8. Mold parting line 126 is shown by a dotted line to illustrate a general orientation of mold parting line 126 of the molds used to make flex tube 2 in relation ship to radial plane 125.

FIG. 31 shows a cross section view taken along the line 31-31 in FIG. 28. From the view in FIG. 31, flexible portion 6 is seen to bow between adjacent coils of support member 4 to show a predetermined amount of looseness to reduce bending resistance. Flexible member 134 is seen to wrap around an end 138 of portion 12. In this embodiment, end 138 is seen to have a lip 140 for increasing the surface area of chemical bond 136 and to provide torsional integrity and mechanical leverage to increase the strength of chemical bond 136. In this embodiment, flexible portion 6 is seen to form a laminated portion 144 along inner surface 142 of portion 12 to provide further increased surface area and mechanical leverage to increase the strength and reliability of chemical bond 136. Preferably, laminated portion 144 of flexible portion 6 is disposed within a recess along inner surface 142; however, any type, shape, configuration, arrangement or combinations or chemical and, or mechanical bonds may be used. FIG. 24 also shows the alignment of the coils in support member 4, which is at predetermined angle 127 relative to radial plane 125.

Any variations may be made to these embodiments shown and described in FIGS. 30 through 31, and all other variations, combinations, and alternate embodiments within other portions of this specification are incorporated by reference to these embodiments.

FIG. 32 shows a side view of an alternate embodiment of helical shaped support members 4 that are elongated to form a relatively longer helical and are preferably created during an early phase of an injection molding process as described previously in this description. Each end of the helical forming support members 4 is seen to form into radial coils 130 existing along a radial plane 125 that is substantially perpendicular to mold parting line 126 in at least one dimension or direction. Radial coils 130 can be closed circle. In alternate embodiments, radial coils may be made in any manner of shape, continuity, with any gaps or alternate configurations or may also not be used at all if desired. In alternate embodiments, mold parting line may be at an angle to radial plane 125 in at least one dimension or direction, and still be at a different angle to radial plane 125 than angle 127.

FIG. 33 shows a side view of an improved flex tube in which a more flexible material is molded to the helical support member or rib member in FIG. 32 as previously discussed, preferably during a subsequent step in manufacturing such as injection molding with a substantially longitudinal orientation of mold parting line 126. In this embodiment, connection ends 8 are made with flexible material 6 and are connected to support members 4 with chemical bond 136 to radial coils 130. Radial coils 130 can distribute the load on support members 4 across an increased surface are of connection ends 8 and can improve the durability of flex tube 2; however, any method of connecting support members 4 to connection ends 8 may be used including the use of any part, bond, material, connection or method. Passageway 55 is seen within the outer portion of connection end 8.

Angled dotted lines show the helical path of support members 4 along the hidden side of flex tube 2. Horizontal dotted lines along the upper and lower surfaces of flex tube 2 shows the interior configuration of flex tube 2 in this particular embodiment. Flexible portion 6 is seen to bow with a predetermined amount of looseness between adjacent coils of support members 4; however, any amount of looseness may be used or no looseness may be used as well. Also, in this embodiment, the horizontal lines show the interior of connection ends 8 have mechanical connections 56; however, alternate embodiments may have any type contour for any type of mechanical bond or may have a smooth surface with no mechanical connections 56. Also, connection ends 8 may have any shape or form or may be continuous smooth portions of flex tube 2 that can slide over any suitable mating part or connect in anyway to any predetermined body. Flex tube 2 along with any of the variations discussed in this description and specification may be used for any application whatsoever in which a flexible tube of limited size is desired. The methods of the present invention regarding injection molding processes provide significant advantages over potential extrusion methods when connection ends 8 are desired to have a different shape than the portions of flex tube 2 that are between connection ends 8 as connection ends 8 may be molded integrally to tube 2 during the injection molding process. However, in alternate embodiments, flex tube 2 or any of its parts may be extruded rather than injection molded.

FIG. 34 shows a side view of the flex tube in FIG. 33 being used on a SCUBA inflator and deflator device for a buoyancy compensator. In this embodiment, connecting ends 8 are secured with zip ties 146 to a valve assembly 148 at one end of flex tube 2 and a control portion 150 at the other end of flex tube 2. In alternate embodiments, clamps, threaded mechanical connections, snaps or locks can be used to secure connecting ends 8 to assembly 148 and portion 150. Control portion 150 is coupled to a gas supply hose 152 to permit pressurized gas to be transported along flex tube 2 to valve 148.

Any variations may be made to these embodiments shown and described in FIGS. 32 through 34, and all other variations, combinations, and alternate embodiments within other portions of this specification are incorporated by reference to these embodiments.

Flex tube 2 provides improvements over prior art flex tubes used for inflator hose assemblies as well as other applications for flexible tubes, as the methods of the present invention can permit flex tube 2 to provide increased collapse protection, increased durability, increased flexibility for ease of use, reduced weight and bulk, reduced production costs, reduced material costs, increased marketability from improved manufacturing process that permits increased style and aesthetics, and also permits different materials to be selected for different components having different needs, such as flexibility verses stiffness, rather than being forced to make one material be used for all components.

Figure 35:
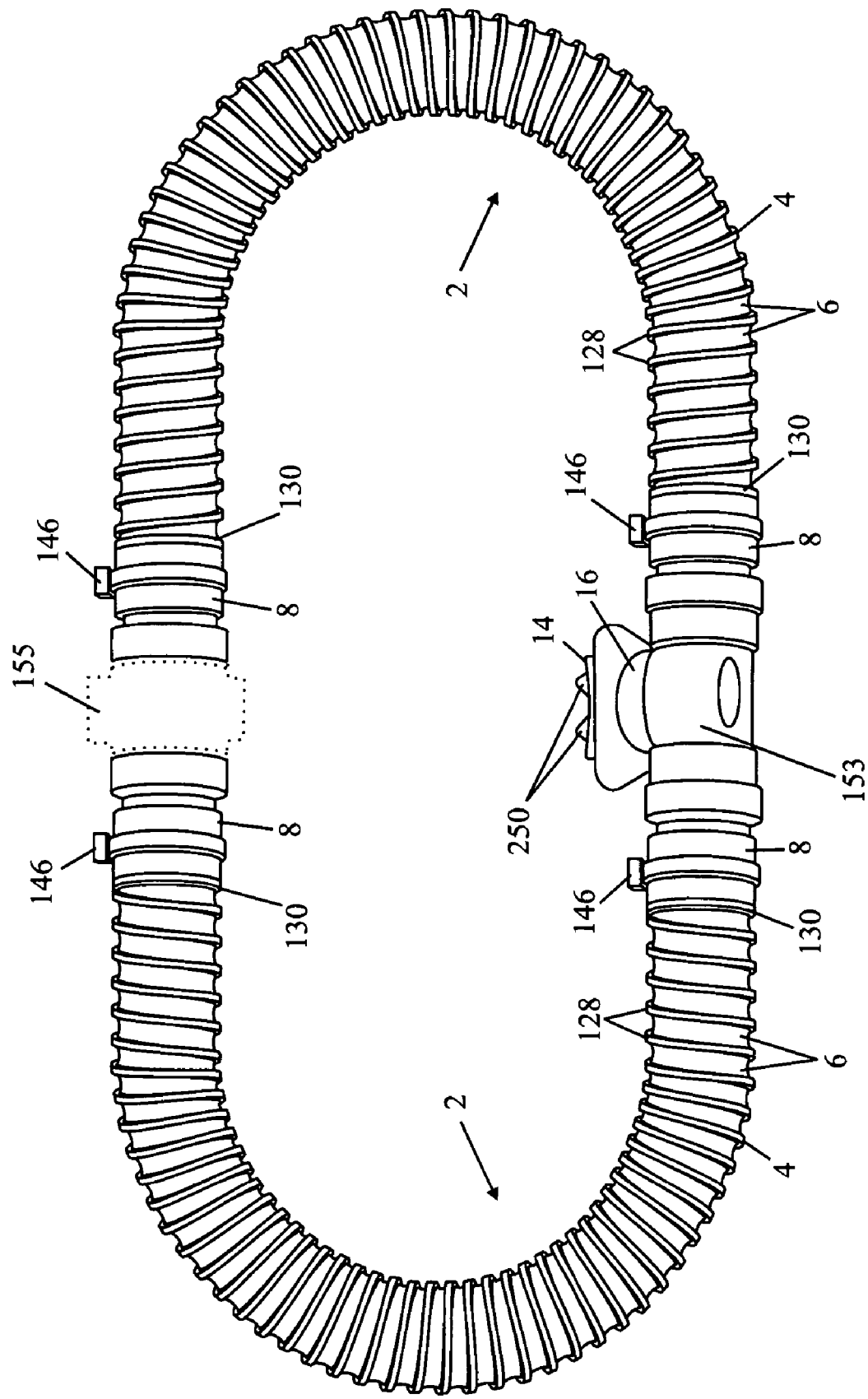
FIG. 35 shows a front perspective view of flex tubes of the present invention being used for an underwater breathing device such as a double hose regulator or a rebreather system.

FIG. 35 shows a front perspective view of flex tubes of the present invention being used for an underwater breathing device such as a double hose regulator or a rebreather system. In the embodiment example in FIG. 35, flex tubes 2 are connected to a second stage breathing device 153 such as second stage SCUBA regulator or a rebreather mouthpiece connection, which is connected to mouthpiece 14 with a breathing tube 16. Dotted lines show a predetermined breathing system 155, such as a first stage SCUBA regulator or a rebreather connection or other suitable gas supply system. In this embodiment, one of flex tubes 2 is used as a breathable gas supply hose while the other of such flex tubes 2 is used as an exhaust hose for exhaled gas.

FIG. 36 shows a side view of flexible tube region 1 having a flexible tube section 2. Flex tube 2 is seen to have support members 92 arranged in a helical configuration, which are separated by flexible portion 6. In this embodiment, support members 92 are thickened portions of flexible portion 6 and are made with the same material as flexible portion 6. This embodiment of flex tube 2 provides major advantages over prior art flex tubes because support member 92 is oriented at angle 127 relative to radial plane 125 to create helical coils 128 which provide flex tube 2 with increased resistance to collapsing under torsional forces that attempt to twist flex tube 2 around a substantially longitudinal axis, either while flex tube 2 is straight or being bent during use. While prior art flex tubes are highly vulnerable to collapsing under torsional forces, the methods of the present invention provide flex tube 2 with significantly increased protection against collapsing under torsional forces. This is because helical coils 128 can tighten when flex tube 2 is twisted in the direction of coils 128, which can cause coils 128 to constrict along a substantially longitudinal axis of flex tube 2, or helical coils 128 will expand if flex tube 2 is twisted in the opposite direction of coils 128, which can cause coils 128 to expand in an substantially longitudinal direction. If coils 128 are sufficiently stiff enough to resist expanding or contracting longitudinally under torsional forces and, or flexible portion 6 resists such expansion or contraction, then coils 128 will still provided improved resistance to collapsing under such torsional forces. This is also because torsional forces apply diagonal forces of tension and compression across the surfaces of flex tube 2, and because coils 128 are oriented at angle 127 relative to radial plane 125, the alignment of coils 128 is able to provide angled reinforcement against such angled forces for improved reinforcement and reduced or even eliminated collapsing during bending. This permits flow through flex tube 2 to be maximized during bending and under torsional forces whereas collapsing can restrict such flow.

Connection ends 8 are preferably molded to flex tube 2 and formed during the same phase of an injection molding process as support members 92 and flexible portion 6, and are preferably connected to upper portion 12 and lower portion 10 with a mechanical bond; however, flex tube 2 may be connected to any predetermined body in any manner and for any purpose or use.

Figure 38:
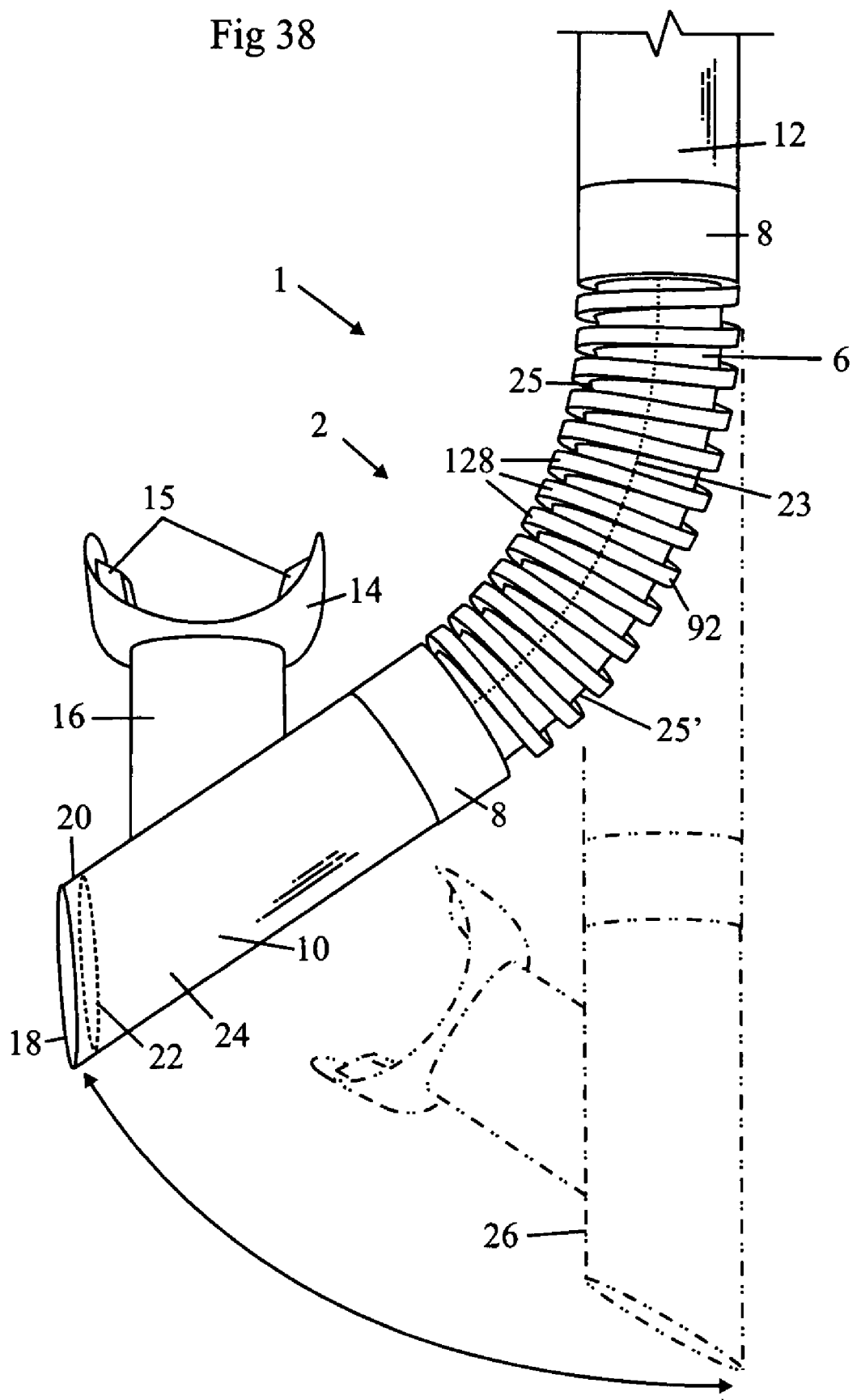
FIG. 38 shows a side view of the flex tube embodiment of FIGS. 36 and 37 being used on a snorkel.

The embodiment in FIG. 38 also provides significant improvements over the prior art for improved ease of manufacture. Because prior art injection molded flex tubes use separate thickened annular ribs made with the same material as the flexible wall portions between such annular ribs, the flow of melted material from one portion of the mold to another and from one annular rib to the next annular during molding is restricted by the narrow flow capacity of the thin wall sections between the separate annular ribs. This causes increased cycle time in the molds and increased machine costs during production and also reduces production volumes and fabrication rates per mold. In contrast, one of the methods of the present invention is to use a helical shape for support members 92 so that each of the adjacent coils are directly interconnected and this allows the injected material to spiral along the entire length of flex tube 2 so that the entire mold is filled at an increased rate of speed for higher production.

During injection molding, the continuous spiral flow of molten material through the helical ribs during molding and also permits thinner, longer and, or looser wall sections to be used between said helical ribs that can provide more bending flexibility to flex tube 2. This is because such walls sections are fed material from each adjacent rib simultaneously. Prior art methods can experience manufacturing difficulty with such improved wall sections because thinner and longer wall section can further restrict flow of molten material during molding and can greatly increase cycle time, machine costs, production costs, and reduce production volumes and rates for prior art injection molded flex tubes. Furthermore, such improved wall section would also likely not be possible because of escalated productions costs as well as the possibility that the material would cool to quickly when passing through the thin wall sections of the mold to cause flow to slow down, separate, leave gaps, cause defects in the product, create regions of weaker material, create stress lines in the material, create undesirable flow lines in the material, cause separated regions of flow to join together below optimum bonding temperature to cause weak points and breakage points, and also flow could potentially stop part way through the mold so that production is halted and ineffective. The methods of the present invention can be used to reduce visible flow lines, wrinkles, creases, gaps, spaces, voids, weak points, splits, folds, flow divisions, flow interface lines, visual inconsistencies, surface inconsistencies, structurally weaker regions, reduced bonding strength, reduced bonding integrity, inconsistencies in surface finish, changes in surface finish, pigment flow lines and cosmetic defects.

The methods of the present invention also permit single injection points or at least a reduced number of injection points in the mold, rather than many injection costs for reduce mold costs, ease of manufacture, improved cosmetics due as multiple injection points typically leave multiple "marks" on the finish of the product; however, any number of injection points may be used in with the methods of the present invention.

FIG. 37 shows a cross section taken along the line 37-37 from FIG. 1. In FIG. 37, flexible portion 6 is preferably bowed between support members 92 with a predetermined amount of looseness; however, in alternate embodiments, any degree or amount of looseness may be used, or no looseness may be used. The alignment of support members 92 relative to radial plane 125 is displayed by support member angle 127, which may be any desired angle. Angle 127 along with the coiled arrangement of support members 92 provides a major improvement over highly flexible prior art flex tubes which are aligned with radial plane 125 rather than at an angle to radial plane 125. In alternate embodiments, flex tube 2 may be formed using any method. Alternate methods to injection molding can include compression molding, blow molding, rotational molding, lamination, extrusion or any other suitable method of manufacture.

In FIG. 37, flexible portion 6 is seen to be significantly thin in comparison to significantly increased thickness used for support member 92 and its coils 128. This permits a significant difference in flexibility to exist between flexible portion 6 and coils 128 so that flexible portion 6 is able to experience significantly levels of bending under relatively light bending forces and loads, while coils 128 provide significantly increased stiffness for reducing or preventing lateral collapse of flex tube 2 during bending of flex tube 2.

FIG. 38 shows a side view of a snorkel embodiment having a flexible tube region 1 that includes an improved flexible tube section 2. The configuration in FIG. 38 is merely an example of one potential embodiment and may be varied in any manner. Flexible tube 2 is seen to have connection ends 8 that connect to a lower snorkel portion 10 and an upper snorkel portion 12. A mouthpiece 14 having bite tabs 250 is connected to lower portion 10 with a mouthpiece breathing tube 16. In this embodiment, lower portion 10 has a lower end 18 that has an opening 20 and a purge valve one-way membrane 22 shown with dotted lines to be recessed within lower end 18. Upper snorkel portion 12 is a tube that extends above the surface to provide a source of breathable air while swimming. In alternate embodiments, connection ends 8 can connect to any predetermined body, which can be any type of device, machinery, part, system. Consequently, the snorkel as well as lower portion 10 and upper portion 12 may be substituted for any such predetermined body.

Connection ends 8 are preferably made with the relatively flexible thermoplastic material of flexible portion 6 during the same phase of injection molding; however, connection ends 8 may be made with any material during any phase of any type of manufacturing process. Preferably, connection ends 8 are made at the same time as flexible portion 6 so that flexible tube 2 is made in two injection molding steps. Connection ends 8 and flexible portion 6 are also preferably made with an elastic material to enable flexible portion 6 to expand and retract during use and to permit connection ends 8 to stretch over the receiving portions of lower portion 10 and upper portion 12 and contract to form an strong bond and a water tight seal. However, non-elastic flexible materials may be used as well. Also, connection ends 8 may also be made with a relatively rigid material that forms a mechanical and, or chemical connection with lower end 10 and, or upper end 12. In such a situation, connection ends 8 may be made with the same stiffer thermoplastic material of support members 4 or out of any separate material or combinations of materials.

FIG. 38 is merely an example of one potential embodiment and may be varied in any manner. Flexible tube 2 is seen to have connection ends 8 that connect to a lower snorkel portion 10 and an upper snorkel portion 12. A mouthpiece 14 having bite tabs 250 is connected to lower portion 10 with a mouthpiece breathing tube 16. In this embodiment, lower portion 10 has a lower end 18 that has an opening 20 and a purge valve one-way membrane 22 shown with dotted lines to be recessed within lower end 18. Upper snorkel portion 12 is a tube that extends above the surface to provide a source of breathable air while swimming. In alternate embodiments, connection ends 8 can connect to any predetermined body, which can be any type of device, machinery, part, system. Consequently, the snorkel as well as lower portion 10 and upper portion 12 may be substituted for any such predetermined body.

In FIG. 38, flexible tube 2 and lower portion 10 are seen to be in a bent position 24 which is arranged to permit a swimmer to place mouthpiece 14 in the mouth for breathing. A dotted line shows extended position 26.

In extended position 26, flexible tube 2 and lower portion 10 have pivoted away from bent position 24 so that mouthpiece 14 and lower portion 10 are spaced from the swimmer's mouth and face when not in use, such as when the swimmer's face is above water or when the swimmer has switched to scuba equipment or another source of breathable air. Being able to flex away from the swimmer's face when not in use such as to extended position 26 is a highly desirable market advantage and is often referred to a "full drop away flex tube". However, the prior art flexible snorkel tubes are plagued with many problems which impede performance.

In this example, a neutral bending surface 23 is shown by a dotted line existing between an inner bending surface 25 and an outer bending surface 25'. Neutral bending surface represents a plane which intersects flex tube 2, and is perpendicular to the plane of bending existing between bent position 24 and extended position 26, which is shown by broken lines. Neutral bending surface 23 represents a location along flex tube 2 in which flexible portion 6 experiences no elongation or compression while flex tube 2 experiences bending between positions 24 and 26. Neutral bending surface 23 may be located near the center axis of flex tube 2 or may be located closer to, or even at either inner bending surface 25 or outer bending surface 25' depending on the degree of elongation, if any, occurring on one of surfaces 25 or 25' relative to the degree of compression, if any, occurring on the opposite of these two opposing surfaces 25 or 25'. For example, neutral bending axis 23 will exist closer to whichever of surfaces 25 or 25' that experience less deformation during use, and will exist near the center axis of flex tube 2 if surfaces 25 and 25' experience similar degrees of deformation during bending. Neutral bending surface 23 may exist at any location, encompass any area and dimension, and may change position during use. While this example distinguishes between inward bending surface 25 and outward bending surface 25' in the drawing, such surfaces are provided as an example relative to the direction of actual bending rather than a static condition; and therefore, their positions may reverse if the relative direction of bending and, or the starting and ending portions of bending are changed.

The methods of the present invention can improve the flow of air through the snorkel when breathing by reducing or eliminating structural collapse of flex tube 2 under bending and, or twisting forces, especially when such forces are applied when flex tube 2 is bent and or twisted during use such as when rotating the mouthpiece of the snorkel or any other part that is connected to flex tube 2.

Preferably, support members 92 and flexible portion 6 made with a suitable thermoplastic material such as thermoplastic PVC, thermoplastic rubber, thermoplastic elastomers, thermoplastic olefins, thermoplastic silicones, EVA, polypropylene, as well as any other suitable material. While injection molding is a preferred manufacturing process, any other suitable manufacturing process may be used including compression molding, catalyst cured molding, room temperature molding, extrusion, lamination, blow molding, rotational molding or any suitable connection or assembly process.

In FIG. 38, the present invention may be molded in bent position 24 for maximum elimination of bending resistance and jaw fatigue while also making flexible portion 6 sufficiently flexible to permit flexible tube 2 and lower portion 10 to experience a "full drop away" to extended position 26 when not being used. Alternatively, flex tube 2 may be molded in extended position 26 while flexible portion 6 is made sufficiently flexible to permit flexible tube 2 and lower portion 10 to bend to bent position 24 during use with sufficiently low bending resistance to provide a significant reduction in jaw fatigue over the prior art. Preferably, bending resistance within flexible tube 2 at position 24 is sufficiently low enough to not create a perceptible outward and, or sideways pulling tension on mouthpiece 14 during use. In alternate embodiments, any degree of bending resistance may be provided. In other alternate embodiments, flexible tube 2 may stay bent and not flex fully away to extended position 26, may come to rest at any intermediate position between positions 24 and 26, or may not flex away from bent position 24 at all when not in use. The methods of the present invention would still provide major improvements over the prior art.

Figure 39:
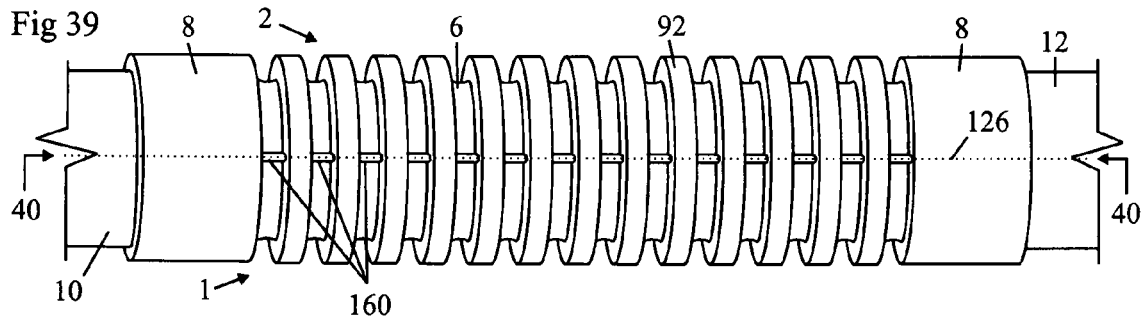
FIG. 39 shows a side view of an alternate embodiment.

FIG. 39 shows a side view of an alternate embodiment of flex tube 2. In this embodiment, support members 92 are annular rib members that are separated by flexible portion 6. Support members 92 are thickened portions of the same material used to make of flexible portion 6; however, support members 92 may also be made with a different thermoplastic material in alternate embodiments. Flexible portion 6 is seen to have a thickened portion 160 that extends between support members 92 in an axial direction. Portion 160 permits increased flow of material between support members 92 during injection molding. This method for increasing flow through the mold during production can reduce the cycle time in the mold, reduce production times, reduce production costs, reduce cooling of the material flowing through the mold to reduce weak points and defects in the product. Also, this increased flow capacity between annular ribs of support members 92 can allow other portions of flexible portion 6 to be thinner and, or wider and, or looser with more loose material because flow is no longer limited by such features. Because portions 160 can be thicker while other portions of flexible portion 6 are made thinner, the thinner sections can provide increased flexibility for flex tube 2 while portions 160 provide improved production and permit increased flexibility to be achieved from the other portions of flexible portion 6 in between adjacent support members 92.

FIG. 39 shows that flex tube 2 is fabricated with a mold parting line 126 that is a plane that extends into the page and is aligned with the central longitudinal axis of flex tube 2; however, mold parting line 126 can exist within any plane that is aligned with the central longitudinal axis of flex tube 2. While portions 160 are seen to be located along parting line 126 in this embodiment, in alternate embodiments, at least one or more of portions 160 can exist at any distance from parting line 126 or at any position along flex tube 2. In alternate embodiments, portions 160 can be located near or along a neutral bending surface relative to a particular direction of bending such as the dotted line of bending surface 23 shown in FIG. 38.

Figure 40:
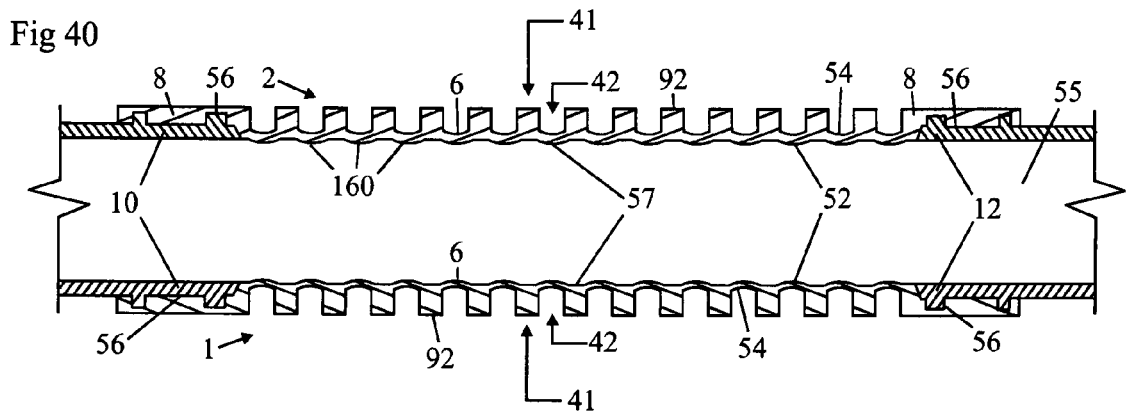
FIG. 40 shows a cross section view taken along the line 40-40 in FIG. 4.

FIG. 40 shows a cross section view taken along the line 40-40 in FIG. 39. In FIG. 40, portion 160 is seen along the upper portion flexible portion 6 in this view and is thicker than flexible portion 160 along the lower portion of flex tube 2 in this view. This view shows that during molding, there is increased flow capacity for material to flow in a substantially axial direction through portion 160 along flex tube 2. This increased flow can improve flow of material to thinner sections of flexible portion 160 and between annular ribs of support members 92.

Figure 41:
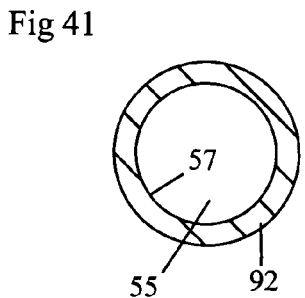
FIG. 41 shows a cross section view taken along the line 41-41 in FIG. 40

FIG. 41 shows a cross section view taken along the line 41-41 in FIG. 40 to show that support member 92 is an annularly thickened portion of flexible portion 6 of flex tube 2.

Figure 42:
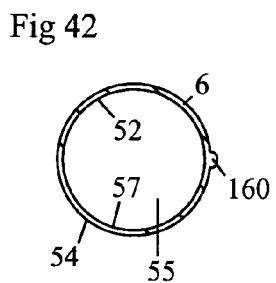
FIG. 42 shows a cross sectional view taken along the line 42-42 in FIG. 41.

FIG. 42 shows a cross section view taken along the line 41-41 in FIG. 40 to show the much thinner flexible portion 6 as well as thickened portion 160.

Figure 43:
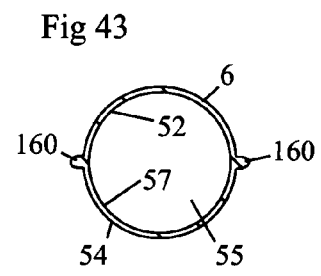
FIG. 43 shows an alternate embodiment of the cross section view shown in FIG. 42.

FIG. 43 shows an alternate embodiment to the cross section shown in FIG. 42 in which a plurality of thickened portions 160 are used between adjacent support members 92 in order to further increase flow of material during molding.

Figure 44:
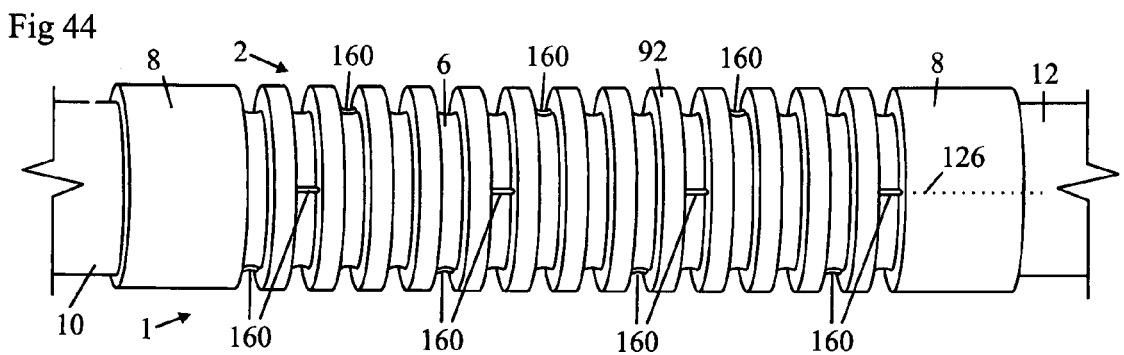
FIG. 44 shows a side view of an alternate embodiment.

FIG. 44 shows a side view of an alternate embodiment in which the positions of thickened portions 160 are alternated between various support members 92. In this embodiment, the alternated locations of portions 160 can be used to reduce any increases in bending resistance along flexible portion 6 between adjacent support members 92. This can distribute any increase in bending resistance to various intervals and, or larger expanses of flex tube 2 so that bending resistance is reduced or minimized. In this embodiment, the position of portions 160 progressively rotates approximately 90 degrees between subsequent support members 92; however, any variation or positioning arrangement may be used. In this view, the positions along flexible portion 6 where portion 160 is out of view represents areas where portion 160 is on the opposite side of flex tube 2 which is not visible from this view.

Figure 45:
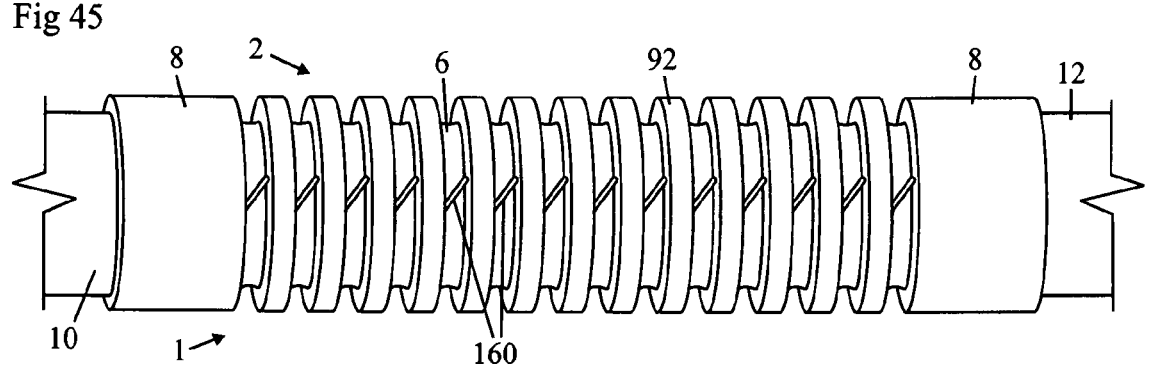
FIG. 45 shows a side view of an alternate embodiment.

FIG. 45 shows a side view of an alternate embodiment in which thickened portions 160 are diagonally aligned relative to the longitudinal axis of flex tube 2. Such an angled orientation can reduce bending resistance along portion 160 and along flexible portion 6 in the areas where portions 160 are located. This is because such an angled orientation can cause axial forces of compression and tension to be applied at an angle to the alignment of portions 160 for reduced resistance to such forces. Also, such thickened portions 160 can be used to increase resistance to collapsing of flex tube 2 under torsion forces which create diagonal forces of tension and compression. In this embodiment, angled portions 160 are positioned in a row along the length of flex tube 2; however, any shape, orientation or angle of portions 160 may be used and, or positioned in any suitable manner along any portion of flex tube 2.

Figure 46:
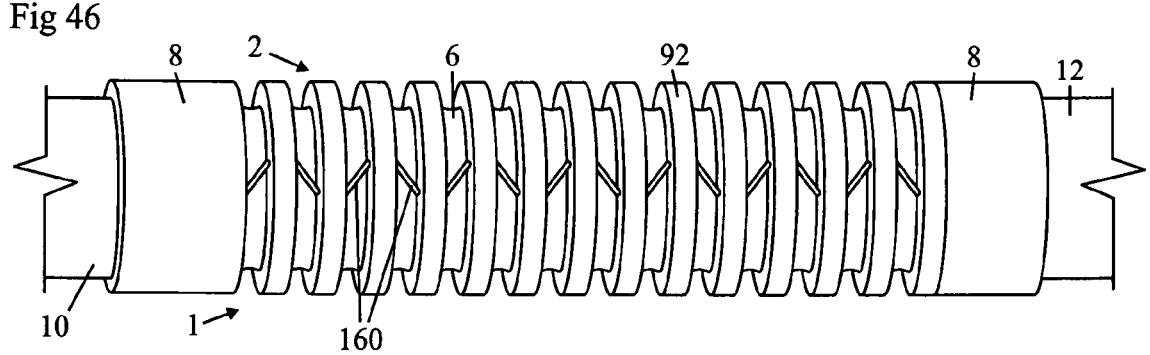
FIG. 46 shows a cross section view along the line 46-46 in FIG. 10.

FIG. 46 shows a side view of an alternate embodiment in which portions 160 are angled and the alignment is seen to alternate between support members 92. Any variations of shape, contour, size, alignment, orientation, positioning, axial dimension, longitudinal dimension, and radial thickness may be used.

FIG. 47 shows a side view of an alternate embodiment in which thickened portion 160 is within the exterior of flex tube 2; however, in alternate embodiments, portion 160 may exist along any interior and, or exterior region of flexible portion 6 of flex tube 2.

FIGS. 48a to 48d show alternate embodiments of cross sectional shapes taken along the line 48-48 in FIG. 47, which is along a support member 92 of flex tube 2. FIG. 48a shows portion 160 extending inward from the inner surface of flex tube 2 along support member 92. In this embodiment, portion 160 is seen to exist along bending surface 23 to reduce, minimize or even eliminate any bending resistance created by portion 160; however, any positioning relative to any neutral bending surface may be used. In FIG. 48b, two portions 160 are seen within the interior of flex tube 2. In FIG. 48c, four portions 160 are shown with the interior of flex tube 2. In FIG. 48d, portion 160 is seen to be formed with a flattened portion of inner surface 57 of flex tube 2. Such a flattened portion creates an increase in thickness for portion 160 to exist.

FIGS. 49a to 49d show alternate embodiments of cross sectional shapes taken along the line 49-49 in FIG. 47 that correspond to the alternate embodiments in FIGS. 48a to 48d, respectively. FIGS. 49a to 49d show alternate embodiment examples of cross section shapes for flexible wall portion 6 next to a support member 92. In FIGS. 49a to 49d, flexible portion 6 is seen to have portions 160 that correspond to the positions of portions 160 in FIGS. 48a to 48d, respectively. The corresponding shapes and positioning of flexible portion 6 can be created an elongated groove with the core portion of the mold that forms hollow passageway 55 during molding.

Figure 50A:
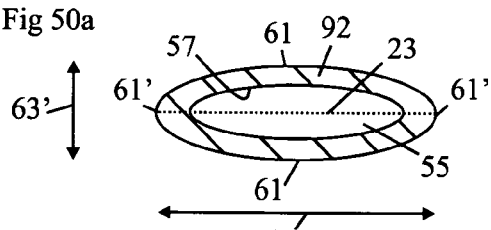
FIGS. 50a to 50l shows cross section views of alternate embodiments taken along the line 50-50 in FIG. 49.

FIGS. 50a to 50l show alternate embodiments of cross sectional shapes taken along the line 50-50 in FIG. 47. FIG. 50a shows an elongated cross section, which has an elongated dimension 63 and narrower dimension 63' that is perpendicular to dimension 63. Elongated portions 61 are relatively broad and narrower portions 61' are seen to by much narrower. In this example in FIG. 50a, flex tube 2 is seen to have an oval shape and the thickness of support member 92 is relatively constant; however, any cross sectional shape may be used with changing thicknesses at different portions of support member 92 or constant thickness. In this embodiment, elongated dimension 63 is seen to be oriented substantially parallel to the plane of neutral bending surface 23. In this view shown in FIG. 50a, the plane of neutral bending surface 23 is along the dotted line and extends across elongated dimension 63 and also extends into the page along an axial direction, such as shown in the side view of FIG. 38. In FIG. 50a, the alignment of neutral bending surface 23 with elongated dimension 63 reduced bending resistance by reducing the vertical height of flexible tube 2 above and, or below neutral surface 23. The lower the vertical distance from the plane of neutral bending surface 23, the lower the amount of elongate and, or compression that must occur within flex tube 2 during bending. By lowering this narrower dimension 63', bending resistance is reduced. By increasing elongated dimension 63 to be significantly longer than narrower dimension 63', the volume of passageway 55 is increased for improved flow capacity for a particular vertical distance from neutral surface 23.

Therefore, the methods of the present invention include using a thickened portion of flex tube 2 to form substantially annular ribs, that may have constant or varied thickness, and providing such annular ribs and flex tube 2 with an elongated cross sectional shape having a predetermined narrower dimension 63 that is significantly narrower than elongated dimension 63 and orienting elongated dimension 63 substantially parallel to a neutral bending surface 23 created during bending in a predetermined direction, and arranging narrower dimension 63' to permit flex tube 2 to experience significantly reduced levels of bending resistance due reduced vertical height from the plane of neutral bending surface 23. Also, it is preferred that such neutral bending surface 23 and elongated dimension 63 are oriented in the direction of intended movement in applications where an improved hydrodynamic or aerodynamic shape is desired to reduce drag on the exterior and profile of flex tube 2 relative to movement within a surrounding fluid medium.

Figure 50B:
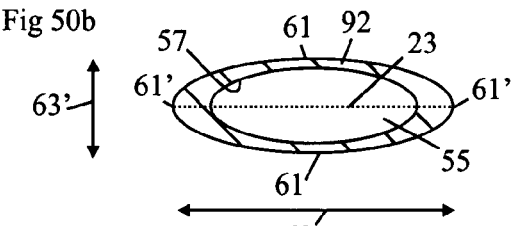
Figure 50C:
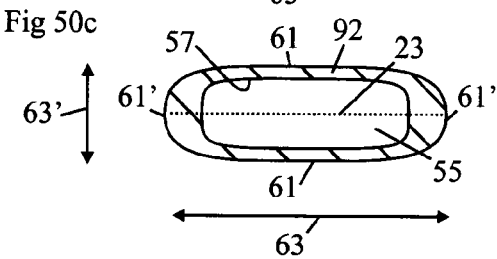
Figure 50D:
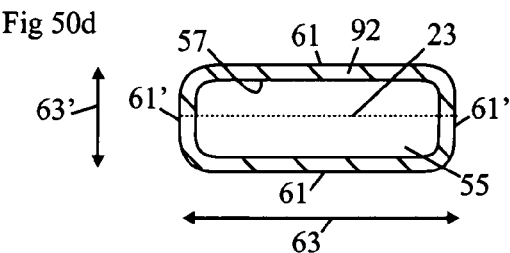
Figure 50E:
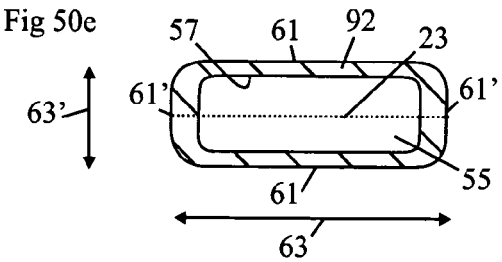
Figure 50F:
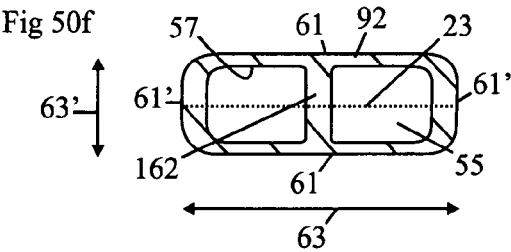

FIG. 50*b* shows an oval cross sectional shape in which the thickness of support member 92 is greater along narrower portions 61' than along elongated portions 61. This increases rigidity in narrower dimension 63' which is substantially perpendicular to the plan of neutral bending surface 23 to reduce collapsing of flex tube 2 and support member 92 along narrower dimension 63' during bending. The reduced thickness of support member 92 along elongated portions 61 permits flex tube 2 to have reduced weight due to reduced need for stiffness along elongated dimension 63 due to the plane of neutral bending surface 23 being parallel to elongated portions 61. This can reduce the weight, product cost, and cycle time in the mold. This reduced thickness of elongated portions 61 in comparison to narrower portions 61' also maximizes the internal volume of passageway 55 and maximizes the streamlined low profile, hydrofoil (or airfoil shape) of flex tube 2 by reducing or minimizing narrower dimension 63'. FIG. 50*c* provides an oval cross sectional shape in which elongated portions 61 are relatively flat and relatively thinner, while and narrower portions 61' are relatively rounded and wider for increased support along narrower dimension 63'. FIG. 50*d* provides a multi-faceted cross sectional shape which is substantially rectangular in this embodiment; however, any multifaceted shape may be used. Such a multi-faced shape creates corners, which may be rounded corners as shown or relatively sharper corners, and such corners can work together with or separately from elongated flattened walls to provide increased stiffness. In FIG. 50*e*, an elongated rectangular shape includes thicker walls along narrower dimension 63' and thinner walls along elongated dimension 63. In FIG. 50*f*, an interior wall 162 is seen within passageway 55 to divide passageway 55 into passageways 55' and 55". In this embodiment, wall 162 extends all the way between elongated portions 61 of support member 92; however, in alternate embodiments, wall 162 can extend a partial distance into passageway 55 without dividing it into separate passageways. Wall 162 works together with the side walls along narrower portions 61' to increase resistance to collapsing along narrower dimension 63' when flex tube 2 is bent relative to the plane of neutral surface 23. Wall 162 may exist within any cross sectional shape. If desired, wall 162 can divide dripping water in a snorkel from the air being inhaled or exhaled, may separate inhaled air from air being exhaled, may be used in any application in which flow is desired to be separated, divided and or arranged to flow in opposing directions.

In alternate embodiments, wall 162 may be made with a different material than used to make support member 92 or flexible portion 6 with any method of fabrication, including injection molding, compression molding, transfer molding, or extrusion.

Figure 50G:
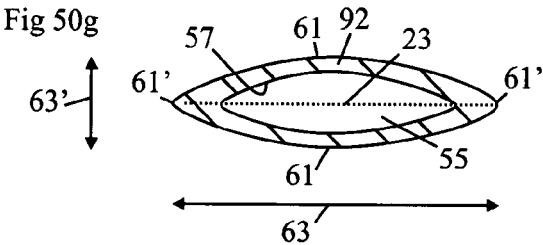
Figure 50H:
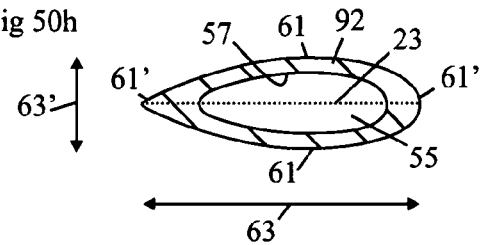
Figure 50I:
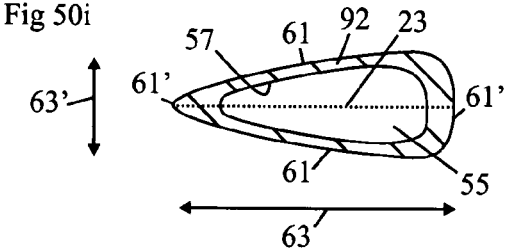
Figure 50J:
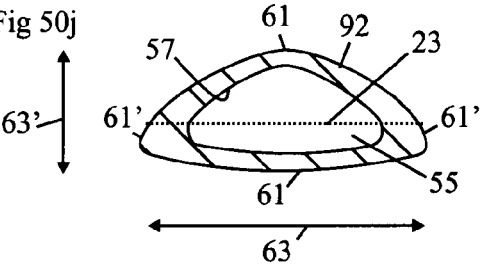
Figure 50K:
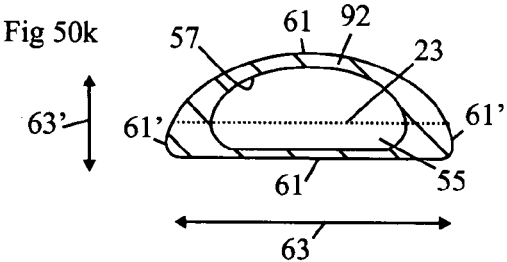
Figure 50L:
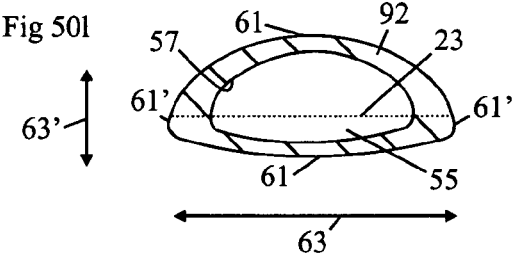

FIG. 50*g* shows an elongated foil shape that is relatively pointed along narrower portions 61' and relatively rounded along elongated portions 61. FIG. 50*h* shows a foil shaped cross sectional shape that is relatively rounded on one of the elongated portions 61' and relatively pointed along the other elongated portion 61'. This creates an efficient foil shape when the rounded end of narrower portion 61' is directed in the direction of relative movement between flex tube 2 and a surrounding fluid medium. FIG. 50*i* shows a substantially triangular foil shaped cross section. FIG. 50*j* shows a substantially triangular asymmetrical cross sectional shape; however, any cross sectional shape can be made asymmetrical if desired relative to neutral bending surface 23 and, or the direction of relative movement within an external fluid medium. FIG. 50*k*, shows a substantially D-shaped cross section, and FIG. 50*l* shows a D-shaped cross section that is curved on both sides. While many of the cross sectional shapes in FIGS. 50*a* to 50*l* have thickened walls along or near narrower portions 61', all such cross sectional shapes, combinations of such shapes or any other cross sectional shapes, or none of such shapes may have thickened regions along narrower portions 61' in comparison to the thickness of the walls along elongated portion 61. Such thickened wall portions can also exist along flexible portion 6 that is adjacent to a support member 92 so that such thickened portion increases axial flow of material through the mold during manufacturing as discussed previously for thickened portion 160 in other embodiments. The cross sectional shapes shown in FIGS. 50*a* to 50*l* as well as any other cross sectional shape, can be used in any embodiment disclosed, including embodiments where helical support members or ribs are used and the wall thicknesses may remain constant or may vary in any suitable manner.

The numerous methods of the present invention includes the method of providing a flexible tube member 2 having a plurality of axially spaced substantially annular rib members 92, that may be annular or substantially annular as in a helical shape and may be made with any suitable material, and providing and a plurality of flexible wall portions 6 between such substantially annular rib members that have relatively thinner wall portions having a predetermined wall thickness which is arranged to provide sufficient flexibility to permit flexible wall portions 6 to experience significant lateral bending between support members 92 under relatively light loads, while also providing flexible wall portions 6 with at least one elongated thickened portion 160 that is arranged to extend in an axial direction between said support members 92 and has a predetermined thickness that is thicker than the predetermined wall thickness of the relatively thinner wall portions of flexible portion 6. Such a method may also include arranging thickened portion 160 to permit the flexible material of flexible portion 6 to flow sufficiently faster through thickened portion 160 than through said relatively thinner wall portions of flexible portion 6 during an injection molding process so as to improve the efficiency of the injection molding process. This can be used as a method to reduce cycle time during molding, to permit smaller thicknesses to be used in the thinner portions of flexible portion 6 for increased flexibility due to improved flow efficiency of thicker portions 160, to reduce cooling in the mold for improved material bonding during molding and reduced structural and cosmetic defects, and to permit the flexible material of flex tube 2 to have an increased Shore A hardness due to the ability to use thinner and, or axially longer and, or looser flexible portions 6 from the increased flow efficiency during molding through thicker portions 160.

The flexible material within flexible portion 6 may have any desired Shore A hardness. For example, the Shore A hardness may be less than 40, between 40 and 70, greater than 70, greater than 75, greater than 80, greater than 85 and greater than 90.

Thickened portions 160 may include at least one helical rib member or helical support member, at least one elongated region that extends between annular ribs or at least one thickened wall portion that extends between annular ribs, or any other method of permitting the material of the flexible material or materials in flex tube 2 to flow with increased efficiency during injection molding through any and, or all portions of flex tube 2. Because the methods of the present invention permit reduced wall thicknesses and, or increased axial flow distances to exist within flexible portion 6, and because this in turn permits higher durometer materials to be used to make flexible portion 6, such increased durometer materials also permit the annular ribs, which can be substantially radial and/or helical, to be much stiffer in embodiments in which the flexible wall portions and such annular ribs are made with the same material during the same phase of an injection molding process. This increased stiffness for the annular ribs can further reduce or even eliminate lateral collapse of flex tubes using the methods of the present invention. Furthermore, such increased stiffness can permit smaller radial heights, axial thicknesses and, or cross sectional volumes of material within support members 92 for a given degree of desired stiffness to create a reduction in the amount of material required to form support members 92 for such a desired amount of stiffness. Such a reduction in material can greatly reduce product weight, material costs, production costs, cycle times for molding, cooling times, demolding times and shipping costs, while also increasing product value, appeal, profits, production volumes and competitive pricing.

Description And Operation—FIGS. 51 to 87

Figure 51:
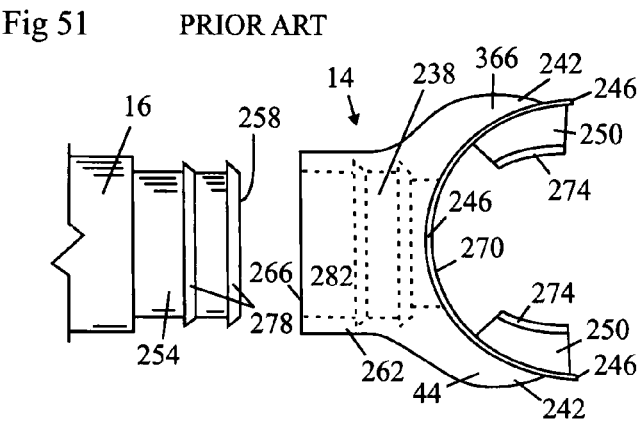
FIG. 51 shows a top view of a prior art diving mouthpiece.

FIG. 51 shows a top view of a prior art diving mouthpiece. A mouthpiece 14 is seen detached from a breathing tube 16. Mouthpiece 14 is seen to have an internal passageway 238, lateral wings 242 having a thickened reinforcement member 366, a sealing flange 246 and bite tabs 15. Breathing tube 16 is seen to have a connection end 245 and an opening 258. Mouthpiece 14 is seen to have a connection portion 262, a forward opening 266 and a rearward opening 270. Bite tabs 15 have vertical flanges 274. Connection end 245 of tube 16 is seen to have ridges 278 and internal passageway 238 of mouthpiece 14 has internal recesses 282 for engaging ridges 278 when connection end 245 of tube 16 is inserted into passageway 238 to create a mechanical connection. From this top view, it can be seen that reinforcement member 366 are significantly thick along wings 242. This is because prior art diving mouthpieces use a very soft material that requires ribs 442 to be significantly thick in order to reduce buckling and collapse of wings 242 when a load is applied to tube 16 and bite tabs 15 are clenched by the mouth of a swimmer. This thickened portion of material for reinforcement member 366 increases weight, material usage, material costs, cooling time of molten material during injection molding, increases cycle time during molding, increases machine time costs during molding, reduces production quantities and volumes, and is still vulnerable to excessive bending, buckling and, or collapse under load.

However, alternate embodiments of the present invention may use such thicker portions of material within mouthpiece 14 in combination with translucent or semi-translucent thermoplastic materials and translucent or semi-translucent thermoplastic pigments in which such combination is arranged to create color contrasts viewable along the outer surface of U-shaped member 364 under ordinary ambient light conditions as provided in the methods described previously in this specification. While longer cycle times, buckling, increased material weight and costs can exist in such embodiments, the light filtering color contrasting methods of the present can produce dramatic visual color contrast that can greatly improve the marketability of single material embodiments so as to significantly counter balance such issues. Similarly, alternate embodiments of the present invention can use the methods for providing multiple colors along mouthpiece 14 from two or more separate materials connected during at least one phase of an injection molding process so as to provide significantly improved shelf appeal, styling and marketability while arranging the flexibility of one or more portions of mouthpiece 14 to experience any degree of bending, buckling, twisting or collapsing during use.

Figure 52:
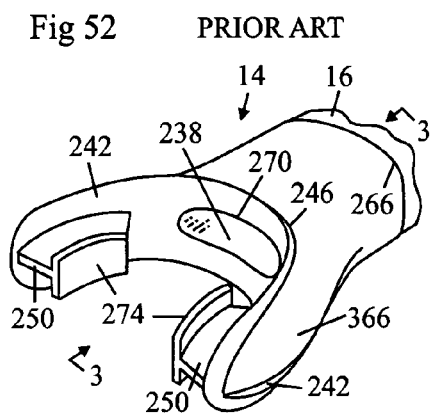
FIG. 52 shows a perspective view of a prior art diving mouthpiece.

FIG. 52 shows a perspective view of the prior art diving mouthpiece shown in FIG. 51 in which mouthpiece 14 is coupled to breathing tube 16.

Figure 53:
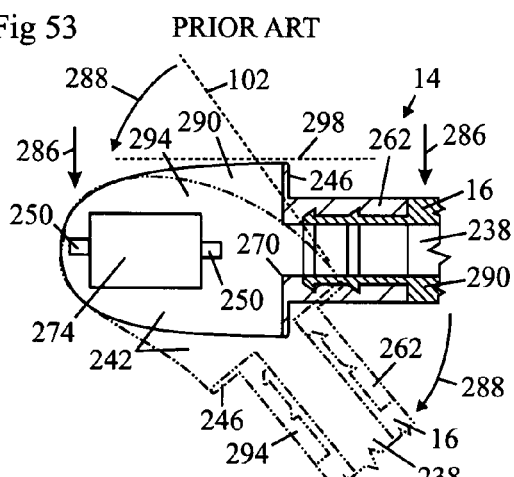
FIG. 53 shows a cross section view of prior art taken along the line 53-53 in FIG. 52.

FIG. 53 shows a cross section view of prior art taken along the line 3-3 in FIG. 52. In FIG. 53, a loading force 286 is being applied to tube 16 which causes tube 16 to experience a deflection 288 from a neutral position 290 to a deflected position 294 around an axis that is transverse to the longitudinal alignment of mouthpiece 14.

Load 286 can be created by the weight of the device that is attached to tube 16 and, or the drag created on such device during relative movement between such device and a surrounding fluid medium. The device connected to tube 16 is often a snorkel or a second stage scuba regulator having pressurized air delivery hose that may also create drag forces and, or weight. In this example, load 286 is seen to occur downward; however, force 286 can occur in any direction depending on the actual orientation of the swimmer in the water and the direction of relative movement between the swimmer and the surrounding water.

Load 286 is transmitted along the length of mouthpiece 14 and is applied to bite tabs 15 as the swimmer bites down during swimming. This causes wings 242 to move from a neutral alignment 298 that is shown with dotted lines to be parallel to the orientation wings 242 near opening 270 while mouthpiece 14 is at neutral position 290, to a deflected alignment 302 which is shown by dotted lines that are parallel to the orientation of wings 242 near opening 270 while mouthpiece 14 is bent to deflected position 294. Therefore, wings 242 experience the same deflection 288 which is seen to occur between neutral alignment 298 and deflected alignment 302.

In FIG. 53, it can be seen that bite tab 15 remains relatively stationary in this view because the user is able to bite down on tabs 15 to hold this portion stationary; however, because wings 242 are able to bend, buckle and, or collapse around a substantially transverse axis under load 286, the other portions of mouthpiece 14 and breathing tube 16 are able to move to deflected position 294 regardless of how hard the user bites down on bite tabs 15.

Figure 54:
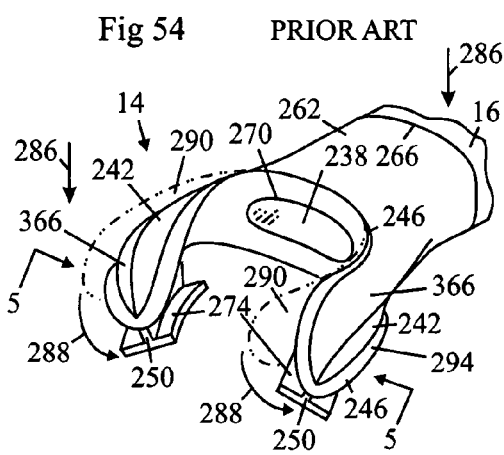
FIG. 54 shows a perspective view of the prior mouthpiece in FIG. 52 that is buckling under load.

FIG. 54 shows a perspective view of the prior mouthpiece in FIG. 52 that is buckling under load. In this view, wings 242 are experiencing deflection 288 as shown in FIG. 53; however, the view in FIG. 54 keeps shows the viewpoint of tube 16 remaining fixed in order to illustrate the movement of wings 242 relative to tube 16 during deflection 288. FIG. 54 illustrates the structural inadequacies and problems of prior art wings 242. Wings 242 are seen to bend downward and twist and away from each other under load 286 from neutral position 290 to deflected position 294. The large thickened portions of wings 242 permit significant levels of bending and twisting under load 286. This forces the swimmer to bite down harder on bite tabs 15 to keep mouthpiece 14 from coming out of the user's mouth; however, the structural inadequacies of the prior art mouthpiece 14 does not permit such increased biting tension to avoid bending and, or structural failure of support reinforcement member 366 and wings 242.

Figure 55A:
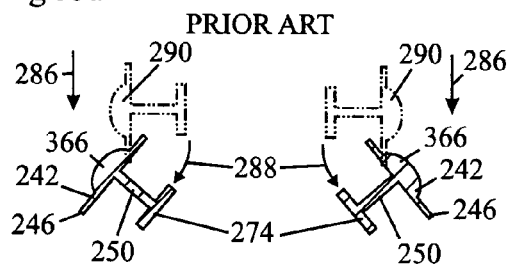
FIGS. 55a and 55b show alternate cross section views of the prior art taken along the line 55-55 in FIG. 54.
Figure 55B:
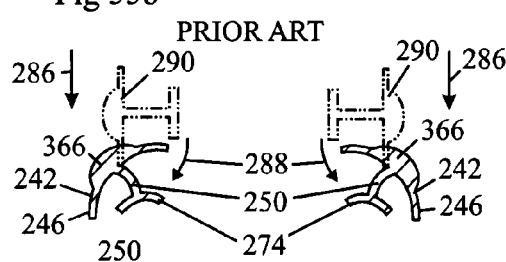

FIG. 55a shows a cross section view taken along the line 55-55 in FIG. 54. In FIG. 55, the soft material used for wings 242, reinforcement member 366, bite tabs 15, flanges 446 and flanges 274 cause these portions to bend downward and twist during deflection 288 under load 286 from neutral position 290 to deflected position 294. FIG. 55b shows the same cross section view as shown in FIG. 55a; however, additional locations of bending are shown to occur within flanges 446, flanges 274, bite tabs 15 and support reinforcement member 366.

Figure 56:
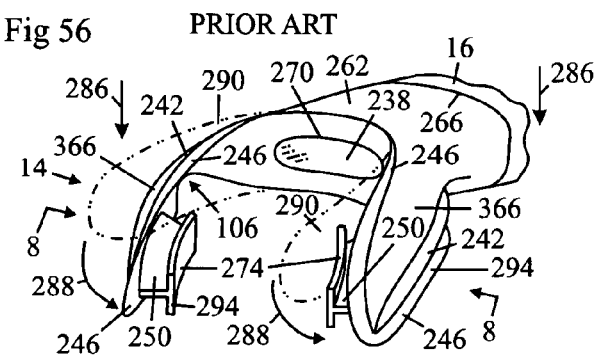
FIG. 56 shows a perspective view of a prior art diving mouthpiece buckling under load.

FIG. 56 shows a perspective view of a prior art diving mouthpiece buckling under load 286 in which bite tabs 15 are prevented from twisting along a lengthwise axis due to the swimmer biting down firmly on bite tabs 15. Although lengthwise twisting is reduced or avoided by biting down firmly on bite tabs 15, wings 242 still experience deflection 288 under load 286 from neutral position 290 to deflected position 294 around a substantially transverse axis relative to the longitudinal alignment of mouthpiece 14. In this view, wings 242 are seen to buckle or collapse at a buckling zone 306 which causes the lower portion of wings 242 relative to the direction of force 286 to buckle outward and the upper portion of wings 242 relative to force 286 to bend inward. This can create discomfort within the swimmer's mouth, cause chaffing and irritation, create point pressures against soft tissues of the mouth from deviated contours, reduce the quality of the water tight seal intended by wings 242 and flange 246, cause jaw fatigue by having to increase biting tension in order to reduce or prevent bite tabs 15 from twisting around a lengthwise axis under load 286.

Figure 57:
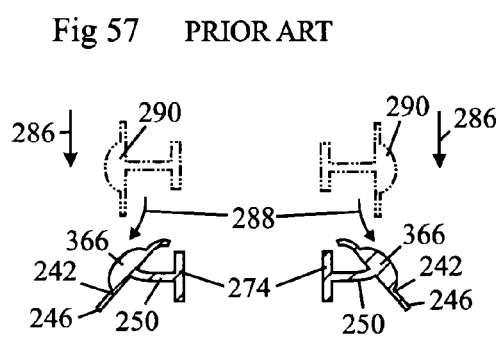
FIG. 57 shows a cross sectional view taken along the line 57-57 in FIG. 56.

FIG. 57 shows a cross sectional view taken along the line 57-57 in FIG. 56. In FIG. 57, bite tabs 15 are seen to avoid twisting around a lengthwise axis by applied biting tension (not shown); however, bite tabs 15 and wings 242 are all seen to bend downward relative to tube 16 (not shown) from neutral position 290 to deflected position 294, and wings 242 are seen to twist along a lengthwise axis during deflection 288 so that the lower portion of wings 242 deflects outward and the upper portion of wings 242 deflects inward within the user's mouth (not shown). In addition to the sensation of mouthpiece 14 deflecting under load 286 creates a desire to bite down harder on bite tabs 15, the tendency for bite tabs 15 to twist around a lengthwise axis to a position that has reduced ability to be retained in the user's mouth causes further increased biting tension just to prevent bite tabs from twisting under load 286. This increases jaw fatigue and still permits deflection 288 to occur which can cause chaffing, irritation and point pressures against the soft tissues of the mouth.

Figure 58:
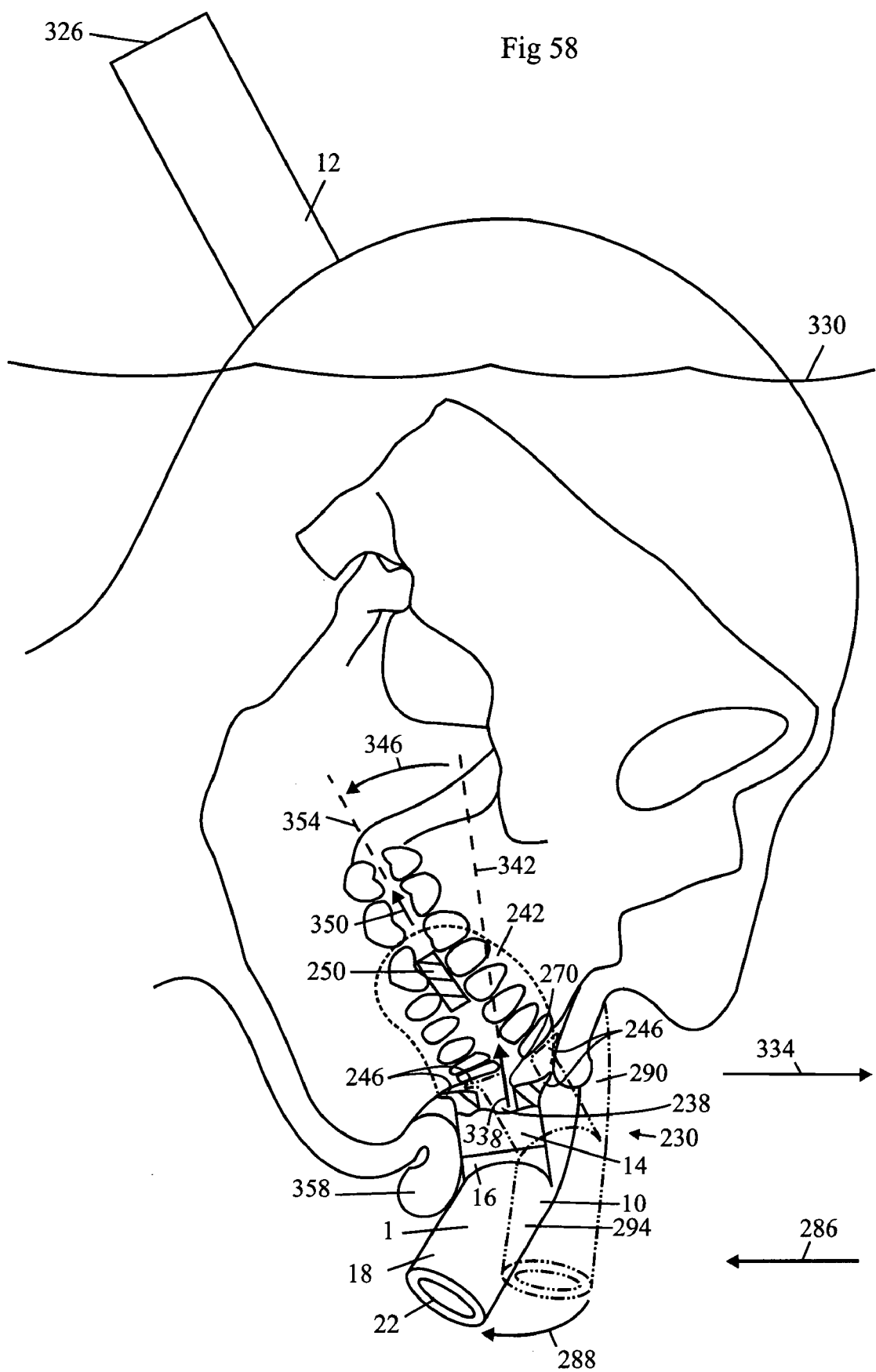
FIG. 58 shows a side view of a prior art diving mouthpiece as it deforms under load in the mouth of a swimmer.

FIG. 58 shows a side view of prior art diving mouthpiece 14 in the mouth of a swimmer while displaying the orientation of mouthpiece 14 relative to the swimmer's internal jaw and mouth structures. In this situation, breathing tube 16 is connected to a snorkel that has a lower portion 18 having a purge valve 22 and an upper portion 12 having an opening 326 that can extend above surface 330 of the surrounding water. Neutral position 290 shown by broken lines can occur when the swimmer has no relative movement to the surrounding water. In this situation, any weight, buoyancy or inertial force of the snorkel within the water is neglected for neutral position 290 in order to provide a comparison to deflected position 294. Because there are no external forces being exerted upon tube 16 during neutral position 290, mouthpiece 14 is seen to have contours that relatively conform to the shape of the user's mouth and sealing flanges 446 can seal against the inside of the swimmer's lips and gums.

Deflected position 294 (shown by broken lines) of the snorkel is created in this situation as the swimmer has a relative movement 334 within the water which in this case is caused by forward directed swimming or opposing an oncoming current or surge within the water. Relative forward movement 334 creates drag on the snorkel in the form of force 286 that is substantially opposite to swimming direction 334. Force 286 causes the snorkel to experience deflection 288 which causes wings 242 (shown by dotted lines) to bend within the swimmer's mouth as the swimmer bites down on bite tabs 15. Deflection 288 is seen to cause mouthpiece 14 to pivot in a downward and backward direction near the front of the swimmer's mouth. In deflected position 294, passageway 238 of mouthpiece 14 is oriented to create a passageway flow direction 338 having a passageway flow alignment 342 shown by broken lines. Passageway flow direction 338 is seen to be at a deflected angle 346 to an airway flow direction 350 within the user's mouth that has an airway flow alignment 354 shown by broken lines. Passageway flow direction 338 is seen to be directed substantially toward the roof of the user's mouth rather than substantially parallel to airway flow alignment 354 and this can reduce flow efficiency, ventilation rates during exertion, and create increased drying of the roof of the mouth. Also, the downward movement of mouthpiece 14 during deflection 288 causes opening 270 to move downward and experience increased flow obstruction by the lower front teeth of the user. This causes an increased amount of rear opening 270 of internal passageway 238 to be blocked by the lower front teeth of the user to reduce airflow capacity which increases work of breathing. In addition, this further increases the deflection of passageway flow alignment 342 as passageway flow direction 338 is deflected upward and then over the front surfaces and upper edges of the lower front teeth of the user.

In addition, while mouthpiece 14 is in deflected position 294, sealing flanges 446 near opening 270 are seen to be misaligned with the user's teeth, gums and lips. This causes the lower flange 246 to dig into the user's lower gums and causes the user's lower lip 358 of the user to be pushed outward and curled downward toward the chin. This can cause the user to experience discomfort and can also cause the user to tighten lip, cheek and chin muscles to compensate, which can increase muscle strain and fatigue. Furthermore, the upper portion of sealing flange 246 is seen to have pulled away from the user's upper teeth and upper gums and is pushing outward and downward against the user's upper lip 362. This increases discomfort, reduces the quality and integrity of the water tight seal intended by sealing flange 246. In addition, a significant portion of mouthpiece 14 is no longer able to properly conform to the contours of the user's mouth and uneven pressure points and chaffing is applied to the soft tissues of the user's mouth.

Muscle strain and discomfort is further heightened as the direction and magnitude of force 286 continually changes with changes in swimming speed, changes in relative direction such as when the swimmer turns his or her head up or down or from side to side relative to a direction of swimming or current, changes in current, oscillating reversals in surge direction as waves approach and then pass by surges, wave chop during surface swimming, and even wind pressure and waves exerted upper portion 12 of snorkel 1. Many of these same changing situations occur when mouthpiece 14 is connected to a second stage scuba regulator, including additional forces from drag on the air supply hoses. Changes in the magnitude and direction of force 286 and, or combinations of alternating forces that make up force 286 can cause mouthpiece 14 to move to new orientations and different locations for deflected position 294 to create additional chaffing and additional muscle strain as different muscle groups need to be tightened and moved. Prior art diving mouthpieces are plagued with many problems.

FIG. 59 shows a top view of an improved diving mouthpiece 14 that is shown to be detached from breathing tube 16. Internal passageway 238 of mouthpiece 14 is seen to have recesses 282 that mate with ridges 278 on tube 16; however, in alternate embodiments, any suitable type of mechanical and, or chemical connection may exist to permit wings 242 to be connected to tube 16 in either a removable or permanent manner. In one example of an alternate embodiment, passageway 238 and connection end 245 of tube 16 may be relatively smooth and a zip tie or other suitable clamping device may be used to wrap around end 262 of mouthpiece 14 and be tightened to provide a secure connection.

In FIG. 59, mouthpiece 14 is seen to have a substantially U-shaped member 364 that is arranged to engage the mouth of a user. While U-shaped member 364 is seen to be relatively U-shaped, in alternate embodiments member 364 may not be U-shaped and may have any shape or combination of shapes whatsoever. In FIG. 59, U-shaped member 364 is seen to have wings 242 a reinforcement member 366, a flexible portion 370 and bite tabs 15. Preferably, reinforcement member 366 is made with a relatively stiffer and, or relatively harder thermoplastic material during an early phase of an injection molding process. Flexible portion 370 is preferably made with a relatively more flexible and, or relatively softer thermoplastic material that is connected to member 366 with a thermo chemical bond created during a subsequent phase of an injection molding process; however, any suitable method of manufacturing may be used as well. In this embodiment, connection portion 262 of mouthpiece 14 is made with the flexible material of flexible portion 370; however, in alternate embodiments, connection portion 262 may be made with any material or combinations of materials, and connection portion 262 may have any shape, configuration, or method of connecting to tube 16 or any other predetermined body.

Preferably, member 366 is relatively flexible for bending around a vertical axis so that the U-shaped configuration of wings 242 may flex to a wider position 374 shown by broken lines in order to accommodate the particular shape of a user's mouth; however, alternate embodiments can be made stiffer so as reduce or eliminate such flexibility around a substantially vertical axis. The use of a relatively thin horizontal wall thickness for member 366, as seen from this top view, can be used to permit flexibility about a vertical axis while a proportionally larger vertical height may be used to member 366 to be relatively less flexible and less able to flex around a transverse axis. Preferably, member 366 is sufficiently stiff enough to reduce or even eliminate excessive collapsing, buckling or bending, especially around a transverse axis; however, in alternate embodiments, member 366 can be arranged to permit any degree of flexibility around a transverse axis. Even with such flexibility and, or buckling, the methods of the present invention can provide significant improvements over the prior art as the relatively stiffer material within member 366 can permit flexible portion 370 to be made with a highly soft material that would otherwise be too structurally weak for all parts of mouthpiece 14; and therefore, the methods of the present invention can greatly increase comfort by permitting much softer materials to be used that can proved increased comfort, cushioning, contouring and reduced chaffing to the soft tissues of the mouth during diving.

The relatively thin horizontal wall thickness shown permits lower amounts of material, lower weight, lower material costs, and reduced machine time during molding than the thickened reinforcement members 366 shown in the prior art of FIG. 51. While it is preferred that the methods of the present invention provide relatively small volumes of material within wings 242, member 366 shown in FIG. 59 may have any horizontal and, or vertical thickness, and may have relatively large thickness and material volumes if desired. Even with similar cross sectional volumes, the methods of the present invention provides greatly improved comfort and structure over the prior art as member 366 provides improved structural reinforcement to reduce or prevent buckling of wings 242 and flexible portion 370 can be made to be highly soft for improved comfort, contouring and reduced chaffing against the soft tissues of the mouth. For example, the stiffer material for member 366 can permit flexible portion 370 to be made with an ultra soft thermoplastic material that has a gel-like consistency that would have very little or no structural integrity without the support of member 366.

In the embodiment in FIG. 59, bite tabs 15 have a relatively softer portion 378 that is made with the relatively softer material of flexible portion 370 during the same phase of an injection molding process; however, in alternate embodiments, softer portion 378 of bite tabs 15 can be made with any desired material having any degree of softness or stiffness during any phase of any type of fabrication process. Preferably, softer portion 378 of bite tabs 15 is made with a significantly soft thermoplastic material to provide improved cushioning and contouring to the surfaces of the user's teeth. Because the methods of the present invention can reduce or even eliminate buckling and, or excessive bending of wings 242 around a transverse axis, bite tabs 15 can be made with a highly flexible and, or soft material for increased comfort without sacrificing the structural integrity of wings 242.

In this embodiment, a bite a tab reinforcement member 382 (shown by broken lines) is seen to exist within the interior of bite tabs 15. In this embodiment, bite tab reinforcement members 378 are connected to member 366 and made with the same material of member 366 during the same phase in injection molding; however, alternate embodiments can permit members 378 to be separate from member 366 and made with any material during any phase of fabrication. Members 378 are preferably made with a material that is relatively stiffer and, or relatively harder than used to for bite tabs 15 and can provide many benefits. One major benefit is that the increased stiffness and strength of members 382 can increase the longevity of bite tabs 15 as the user's teeth will be less able, or even unable to tear through the material of bite tabs 15 over time. In addition to increasing the usable life of mouthpiece 14, this also improves safety as a structural failure of bite tabs 15 can be a hazard during snorkeling or scuba diving as this makes mouthpiece 14 difficult to retain in the user's mouth, especially in strenuous ocean conditions such as large waves, fast moving currents or in deep dives, cave dives or night dives. Also, the use of a significantly stiffer material for members 382 within bite tabs 15 can permit a significantly softer material to be used within softer portion 378 of bite tabs 15 that could be to fragile to otherwise use without the reinforcement provided by members 382. This can allow increased comfort and cushioning in combination with increased structural integrity. Furthermore, members 382 can be arranged to provide sufficient structural reinforcement of bite tabs 15 to reduce or prevent bite tabs 15 from twisting around a lengthwise axis as loads are applied to tube 16 during use. This can significantly reduce jaw fatigue as biting tension can be reduced or even eliminated in order to prevent bite tabs 15 from twisting out of position when loading conditions are applied to tube 16. While it is preferred that bite tabs 15 are arranged to not twist excessively around a lengthwise axis relative to the alignment of mouthpiece 14 and, or wings 242, in alternate embodiments bite tabs 15 may be arranged to experience such twisting in any degree. Even with such twisting, structural integrity, comfort, useable life and reliability are significantly improved.

In FIG. 59, bite tabs 15 are seen to have recesses 386 which can be used to provide gripping points for the user's teeth. In alternate embodiments, raised ridges, bumps, alternate recesses or other any other contours may also be used to provide gripping points for a user's teeth. In this embodiment, recesses 386 extend down to members 382 also serve as a method for holding members 382 in place in a mold as softer portion 378 is molded over members 382; however, any arrangement or method may be used to hold members 386 in place during molding.

FIG. 60 shows a perspective view of the embodiment shown in FIG. 59 coupled to tube 16. From this view, member 366 is seen to have a relatively tall vertical dimension and a relatively thin horizontal thickness; however, member 366 may have any size, shape, dimension, contour, configuration or arrangement. The relatively taller vertical dimension can be used to increase resistance to bending around a transverse axis relative to the lengthwise alignment of mouthpiece 14 and, or wings 242. This can reduce or eliminate transverse bending, buckling and, or collapsing as loads are exerted upon tube 16.

U-shaped member 364 that includes wings 242 is seen to have an inner surface 390 and an outer surface 394. In this embodiment, inner surface 390 is covered with the relatively soft material of flexible portion 370 and dotted lines show the location of member 366 behind inner surface 390. Flexible portion 370 along inner surface 390 can provide cushioning, contouring and reduced chaffing and abrasion against the soft gum tissues within the mouth. Sealing flange 246 is seen to be made with flexible portion 370 for the same reason and to provide a comfortable and conforming water tight seal for mouthpiece 14 during underwater swimming; however, sealing flange 246 may be made with any material, have any degree of flexibility or stiffness, have any shape or size, have any thickness or configuration, and sealing flange 246 also may be not used at all so that the water tight seal is created by U-shaped member 446 without flange 246. Dotted lines also show the shape and location of members 382 within bite tabs 15. In this example, members 382 are shaped similar to the horizontal profile of bite tabs 15; however, members 382 can be of any size or shape. Members 382 are also seen to exist within the middle of bite tabs 15; however, members 382 may exist at any location, near or at either the upper and, or lower surfaces of bite tabs 15 and may exist within any portion of bite tabs 15 or may also be not used at all. In alternate embodiments, members 382 may also be made with a separate material that is relatively stiffer or relatively more flexible than any material used for soft portion 378 or flexible portion 370.

FIG. 61 shows a front view of the embodiment shown in FIG. 59 in which forward opening 266 is viewed.

FIG. 62 shows a rear view of the embodiment shown in FIG. 59 in which rearward opening 270 and the mouth securing portion of member 364 is viewed.

FIG. 63a shows a cross section view taken along the line 63-63 in FIG. 60. Member 366 has an inner surface 398 and an outer surface 402. Flexible portion 370 has an inner surface 406 and an outer surface 410. In this example, flexible portion 370 is laminated along inner surface 398 of member 366 so that outer surface of flexible portion 370 is bonded to inner surface 398 of member 366. From this view, members 382 can be seen within the interior of bite tabs 15 and recess 386 is also visible. Dotted lines along bite tabs 15 show the upper and lower surfaces of bite tabs 15 in front of and, or behind recesses 386. This view shows that the recesses 386 can be used to permit the upper and lower halves of a mold to extend into recesses 386 and clamp down vertically on the upper and lower surfaces of members 382 in order to hold members 382 in place as softer portion 378 is molded above and below members 382. Also from this view, the material of flexible portion 370 is seen to be connected to and made with the same material as softer portion 378. This permits softer portion 378 and flexible portion 370 to be formed during the same phase of an injection molding process using the same material and may flow in a molten state from either portion to the other during molding. In this embodiment, flanges 274 on bite tabs 15 are also seen to be made with the same material as flexible portion 370 and softer portion 378. From this view, members 366 are seen to have upper portions 414 and lower portions 418. In this embodiment, portions 213 and 418 are relatively rounded and are shaped to permit the upper and lower halves of a mold to clamp down vertically on them to help hold member 366 in place as flexible portion 370 is overmolded onto member 366 during a subsequent phase of an injection molding process.

In this embodiment, member 366 is seen to have a relatively planar wall-like shape; however, and shape, contour or configuration may be used. Members 386 are seen to extend substantially perpendicular to member 366 to form a sideways T-shaped configuration between these two parts.

FIG. 63b shows an alternate embodiment of the cross section view in FIG. 63a. In FIG. 63b, member 366 is seen to have a lateral rib member 422. Rib member 422 may be used to further increase the structural integrity of member 366. In this embodiment, rib member 422 and member 366 is seen to form a substantially sideways T-shaped member. Rib member 422 can be used to provide increased structural support for member 366 to reduce or eliminate buckling or collapsing of member 366 under load. Rib member 422 can also be used to provide such increased resistance to collapse so that member 366 may be made with a more flexible material than without rib member 422. The use of relatively more flexible material within member 366 can allow increased contouring and adjustment of shape to the user's mouth for increased comfort if desired. Rib member 422 is seen to have a relatively small cross sectional volume which can provide reduced weight, cycle time in molds, reduced material usage compared to the large thickened rib sections such as reinforcement member 366 shown in FIG. 51; however, in alternate embodiments, rib member 422 shown in FIG. 63b may have any desired cross sectional volume or dimension including large dimensions if desired. This still provides major improvements in structural integrity of the prior aft from members 366 and 422 and the increased softness of flexible portion 370 and, or softer portion 378 for reduced chaffing and improved contouring and comfort as previously described. In this embodiment, rib member 422 is made with the same material as member 366 during the same phase of an injection molding process; however, in alternate embodiments, rib member 422 and member 366 can each be made with different materials during different phases of an injection molding process to create changes in flexibility, stiffness and, or style by use of different colors during different phases of injection molding. This can allow rib member 422 to be made with a significantly stiff material, member 366 to be made with less stiff material, and flexible portion 370 to be made with a softer material. Similarly, rib member 422 can be made with a softer material than member 366, but stiffer than flexible portion 370, or alternatively, rib member 422 can be made with the same material as flexible portion 370 during the same phase of injection molding, or can be made with a softer material that flexible portion 370 during a different phase of injection molding. Any combination, number of materials or number of steps in injection molding may be used. In alternate embodiments, any shape, configuration, size, dimension, arrangement, material combinations or number of rib members 422 may be used, or none may be used.

One of the methods of the present invention is to provide mouthpiece 14 with connection portion 262 for connecting to a predetermined body such as breathing tube 16 for the supply of breathable air in which a predetermined load is exerted on breathing tube 16 during use in which such load is transferred along the length of mouthpiece 14 from connection portion 262 to bite tabs 15, and providing mouthpiece 14 with a reinforcement member 366 existing in an area between connection portion 262 and bite tabs 15 that is made with a relatively stiffer thermoplastic material, and then overmolding a flexible portion 370 made with at least one relatively flexible thermoplastic material onto the relatively stiffer thermoplastic material of reinforced portion 366 with a thermo chemical bond created during a phase of an injection molding process. Preferably, reinforcement member 366 is arranged to be sufficiently less flexible than the flexible portion 370 to create a reduction in bending or deformation along the length of mouthpiece 14 under such load.

One of the methods of the present invention is to provide mouthpiece 14 with connection portion 34 for connecting to a predetermined body such as breathing tube 16 for the supply of breathable air in which a predetermined load is exerted on breathing tube 16 during use, and providing mouthpiece 14 with at least one relatively stiffer portion that can include any stiffer region such as any shape, size, form, combination, or configuration of member 366 and, or member 382, and, or flange 23 and, or any other stiffer portion. Preferably, at least one such relatively stiffer portion can be made with a relatively stiffer and, or relatively harder thermoplastic material that has a Shore A hardness of at least 70 durometer; however, any Shore A hardness may be used. Preferably, mouthpiece 14 is also provided with at least one relatively flexible and, or softer portion that can include any shape, size, form, configuration or combination of flexible portion 370 and, or softer portion 378 and, or any other portion of mouthpiece 14 arranged to be made with such at least one relatively flexible thermoplastic material, which is preferably injection molded to the relatively stiffer portion of mouthpiece 14 with a thermo chemical bond created during a phase of an injection molding process. Preferably, such at least one relatively flexible thermoplastic material of at least one such relatively flexible portion will have a Shore A hardness that is less than 470 durometer; however, any hardness may be used. In some preferred embodiments, the relatively stiffer thermoplastic material will have a Shore A hardness of at least 70 durometer and at least one relatively flexible thermoplastic material will have a Shore A hardness that is less than 70 durometer. In other preferred embodiments, at least one relatively stiffer thermoplastic material will preferably have a Shore A hardness of at least 70 durometer, at least 75 durometer, at least 80 durometer, at least 85 durometer, at least 90 durometer, or at least 95 durometer; and at least one relatively flexible thermoplastic material will preferably have a Shore A hardness that is less than 65 durometer, less than 60 durometer, less than 55 durometer, less than 15 durometer, less than 40 durometer, less than 30 durometer, less than 20 durometer, less than 10 durometer, or less than 5 durometer; and any combination of these or other hardnesses may be used. In other embodiments, at least one relatively stiffer material will have a Shore A hardness of at least 60 durometer and at least one relatively softer material will have a Shore A hardness that is less than 40 durometer, less than 20 durometer or less than 10 durometer.

Preferably, the separate materials being bonded together are made with chemically similar materials such as PVC, thermoplastic silicones, silicone rubber, rubber, thermoplastic rubber, thermoplastic olefins, thermoplastic elastomers, other suitable thermoplastic materials, or any suitable combinations of chemically bondable materials. For example, at least one stiffer portion of mouthpiece 14 can be made with a thermoplastic polypropylene while at least one more flexible portion is made with a suitable thermoplastic rubber or thermoplastic elastomer that is part polypropylene to provide a chemically similar material for creating a weld bond. Any combinations of any types of suitable material may be used, fabricated and bonded in any suitable manner.

Also, any of the different materials molded together may be thermoformable materials so that the mouthpiece may be heated in boiling water, then flash cooled with a quick dip in cool water to create a cooled outer skin to prevent the material from burning the tissues inside the mouth during reforming, and then placing the mouthpiece within the mouth and biting down on bite tabs 15 and holding the mouthpiece within the mouth so that the thermoformable material adjusts its shape and conforms to the contours of the user's teeth and, or mouth. This can include thermoformable thermoplastic silicones for example. Any one material within the mouthpiece can be thermoformable or multiple materials may be thermoformable. One of the many advantages of the methods of the present invention is that bite tab reinforcement members 382 within bite tabs 15 can be made with a stiff material to provide structural rigidity, which can be either thermoformable or not thermoformable, and then softer portion 378 can be made with a highly soft thermoformable material that not only provides custom contouring to the user's teeth, but also provides ongoing compressible cushioning during use after the thermoforming has been completed and this can greatly reduce jaw fatigue and improve comfort. In addition, the methods of the present invention can allow bite tabs 15 to be made with a relatively stiff thermoformable material (or a combination of stiff and soft portions) while sealing flange 246 is allowed to be made with a significantly softer material that significantly reduces chaffing and irritation to the soft tissues of the user's mouth.

In addition, in alternate embodiments, the methods of the present invention can include making U-shaped member 364 in at least two separate phases of an injection molding process even if the same material is used but in different colors as this method provides improved aesthetic appeal and can also be used to mold thicker portions of U-shaped member 364 in at least two portions that reduce the amount of cooling time in the mold for each step in comparison to being molded in a single step, or at least create a similar overall molding time that permits increased style to be manufactured at a comparable costs. Furthermore, improved distribution of shear forces between adjacent overmolded materials can also be used to increase structural integrity like laminated layers that increase the strength of plywood over particle board.

In FIG. 63b, members 382 are seen to be connected to member 366 and rib members 422 and made with the same material during the same phase of injection molding; however, in alternate embodiments members 382 within bite tabs 15 may be made with at least one different material during at least one different phase of injection molding. In the embodiment shown in FIG. 63b, a reinforcement member 426 is seen to exist within vertical flange 274 of bite tab 15. Member 426 can be used to reduce or prevent flange 274 from twisting around a substantially lengthwise axis during use. In this embodiment, member 426 is seen to extend vertically to create a wall shape; however, member 426 and, or flange 274 may extend in any direction or angle. Member 426 is seen to extend over or relatively small distance of the total vertical dimension of flange 274 and this can permit the upper and lower portions of flange 274 to experience some degree of twisting around a lengthwise axis to and adjust to the shape of the user's mouth while reducing abrasion and chaffing. This permits flanges 274 to have a softer portion 430 that can be made with a significantly softer material that provides more comfort and contouring to the soft tissues of the user's mouth. This method permits highly soft materials to be used that would not otherwise provide sufficient structure for retaining the teeth of the user without the added structural support provided by member 426. The use of member 422 can also improve the ability for flange 274 to retain the user's teeth in a transverse direction. At the same time, softer portion 430 can provide increased contouring to the user's teeth, gums and soft tissues in the mouth for increased comfort. In this embodiment, member 382 forms a substantially H-shaped cross section with member 434 and member 366.

FIG. 64 shows a cross section view taken along the line 64-64 in FIG. 60. In this embodiment, the material of flexible portion 370 is seen to be used to make connection portion 262, flange 246, forward opening 270, inner surface 390 of U-shaped member 364, bite tab 15 and flange 274; however, in alternate embodiments, any of these parts may be made from separate materials during different or the same phases of an injection molding process. From this view, member 366 is seen to have a flange 434 to provide a mechanical bond between flexible portion 370 within sealing flange 246 and connection portion 262 of mouthpiece 14. Flange 434 is preferably used to increase the surface area of a preferred thermo chemical bond created during injection molding and to provide mechanical leverage for increased bonding strength. Flange 434 can be used in any direction and along any portion of mouthpiece 14 where two different materials are being bonded together. Flange 434 is preferably an elongated ridge that is relatively thin; however, any shape, configuration, alignment, size or contour of flange 434 may be used in any mating surfaces between different materials.

Figure 65:
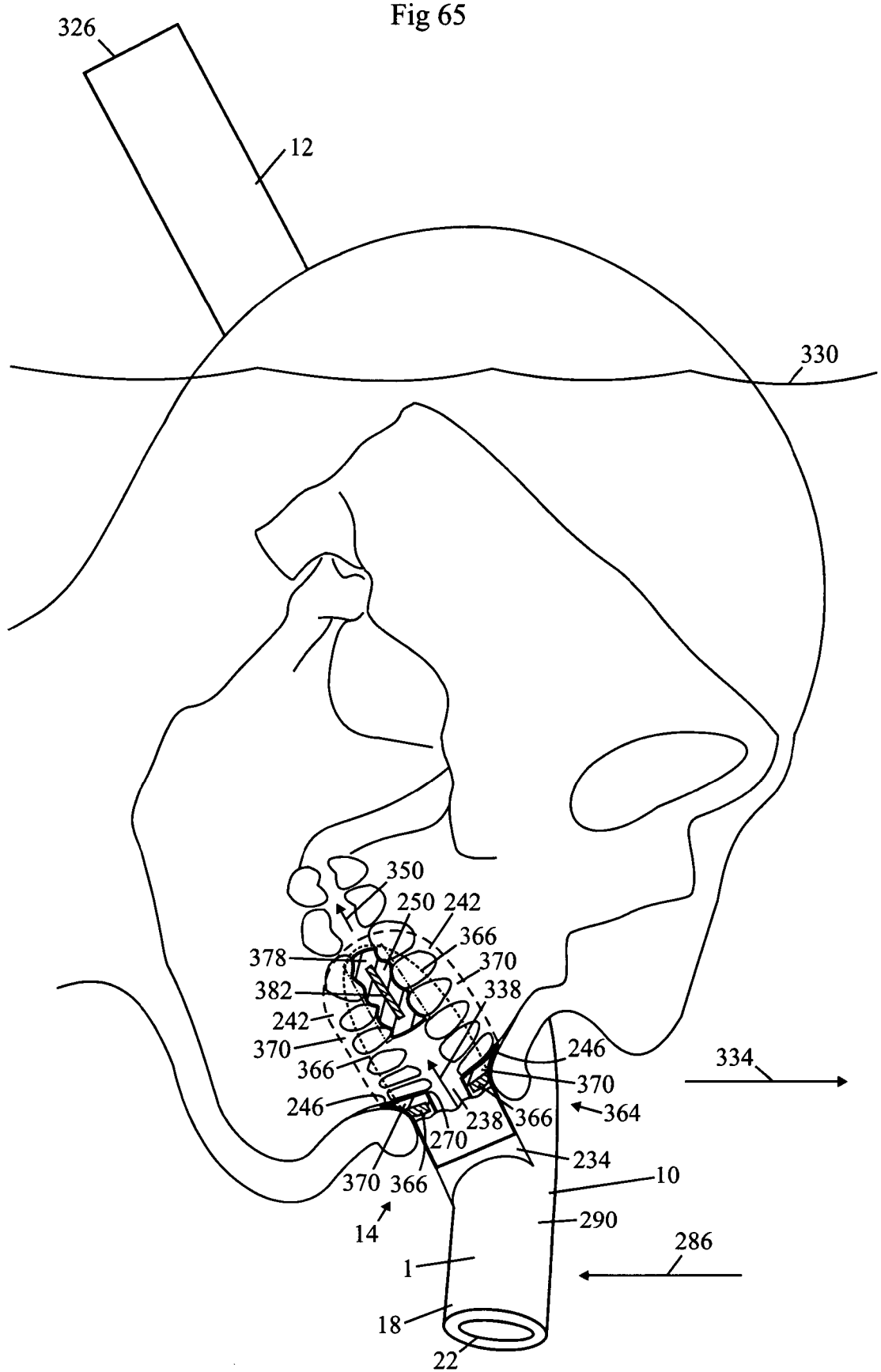
FIG. 65 shows a side view of a mouthpiece of the present invention in the mouth of a swimmer.

FIG. 65 shows a side view of a mouthpiece of the present invention in the mouth of a swimmer. This cut-away view permits the orientation of mouthpiece 14 to be seen within the user's mouth. In this view, the swimmer has relative forward movement 334 relative to the surrounding water which causes force 286 to be exerted on snorkel 1. The larger dotted lines show the position of sealing flanges 446 and wings 242 that are made with flexible portion 370. The smaller dotted lines show the position of reinforcement member 366. This cut-away view shows member 366 and flexible portion 370 near rear opening 270 of mouthpiece 14. This cut-away view also shows bite tab 15 having softer portion 378 and reinforcement member 382. In this embodiment, the material of softer portion 378 is seen to be relatively thick and significantly soft and conforms and contours to the user's teeth as softer portion 378 compresses from a neutral position 438 shown by broken lines, to a compressed position 442 shown by a thickened line to illustrate contouring to the user's teeth. It is preferred that at least a portion of bite tabs 15 is made significantly compressible to the user's teeth under relatively low biting pressure. This can significantly increase comfort by distributing pressure points and providing cushioning. Also, the use of highly soft materials to provide contouring to teeth under relatively light biting pressure can permit increased gripping of the teeth on bite tab 15 as the contouring provides traction and leverage to hold bite tab 15 and mouthpiece 14 stable in the mouth.

Even though force 286 is exerted on the snorkel which transmits force 286 to breathing tube 16 and then along mouthpiece 14 to bite tabs 15, the methods of the present invention permit mouthpiece 14 to remain stable within the mouth and wings 242 are seen to avoid excessive bending, buckling or collapse. This permits force 286 to be evenly distributed throughout the mouth as the contours of mouthpiece 14 remain substantially aligned with the contours of the user's mouth. While reinforcement member 366 improves structural integrity to reduce or prevent bending or buckling of wings 242, flexible portion 370 provides cushioning and contouring to the soft tissues of the user's mouth and sealing flange 274 conforms to the user's gums, lips and cheeks to provide a comfortable water tight seal. Because mouthpiece 14 is structurally stable under force 286, jaw fatigue is reduced as additional biting tension is not needed to compensate for structural collapse of wings 242.

Also, the forward portions of U-shaped member 364 of mouthpiece 14 that are near rear opening 270 of internal passageway 238 are seen to be relatively centered and aligned with the user's gums and teeth to provide improved seal and comfort. Because these forward portions of mouthpiece 14 near rear opening 270 of passageway 238 experience reduced or even eliminated pivoting under force 286, the methods of the present invention can be used to reduce or prevent these forward portions of mouthpiece 14 from digging into the gums of the user's mouth and deforming the user's lips. This increases comfort, reduces chaffing and point pressures, improves the water tight seal and reduces or even eliminates the need to tighten lip, chin and, or cheek muscles to compensate or oppose such pivoting. Furthermore, the reduction or elimination of pivoting permits passageway flow direction 338 to remain substantially aligned with airway flow alignment 350 within the user's mouth to increase ventilation efficiency when force 286 is exerted on snorkel 1. In addition, the reduction or elimination of undesirable pivoting permits opening 270 of passageway 238 to remain relatively centered between the user's teeth so that increased blocking of airflow from the user's teeth is reduced or eliminated.

In addition, reinforcement member 382 within bite tab 15 is arranged to provide increased leverage and control over the position of mouthpiece 14 so that less biting tension is required to exert such control. For example, the significant longitudinal dimension of member 382 provides increased longitudinal leverage against pivoting of mouthpiece 14 around a transverse axis. The longitudinal dimension of member 382 and, or bite tab 15 may be any length in alternate embodiments. It is preferred that member 382 is connected to member 366 to provide additional torsional stability to reduce or eliminate twisting around a lengthwise axis and to permit member 382 to substantially maintain alignment with member 366 so that so that when the user's teeth exert control over bite tab 15, increased control is exerted on member 366 and the orientation of mouthpiece 14 within the user's mouth. The increased control and leverage can reduce the biting tension needed to control the position of mouthpiece 14 and this can reduce jaw fatigue during diving. In addition, the reduced pivoting and deformation of mouthpiece 14 reduces chaffing and abrasion. Furthermore, the increased cushioning and contouring of the flexible material within flexible portion 370 can distribute pressure more evenly and adaptively to the shape of the user's mouth and soft tissues for increased comfort and control.

As a separate benefit that can be used with or without member 366 or other parts, the use of highly soft materials in softer portion 378 to provide contouring to teeth under relatively light biting pressure can permit increased gripping of the teeth on bite tab 15 as the contouring provides traction and leverage to hold bite tab 15 and mouthpiece 14 stable in the mouth. This benefit can also combine with increased structural support and, or increased tear resistance from member 382 to greatly improve comfort, security, stability, structural integrity, resistance to collapsing, resistance to excess bending or deformation, durability, control, leverage reduced jaw fatigue and improved shaping to different teeth shapes and configurations of different users.

While FIG. 65 shows an example of breathing tube 16 being connected to snorkel 1, similar conditions exist when alternate sources of breathable air are used, including second stage scuba regulators having air supply hoses, dual hose regulators, surface supplied air hoses, and rebreather ventilations hoses.

While the embodiment in FIG. 65 shows a preferred embodiment in which no pivoting of snorkel 1, tube 16 or mouthpiece 14 occurs under force 286, in alternate embodiments, pivoting bending and, or buckling may be allowed to occur for mouthpiece 14. In other embodiments, pivoting, bending and, or buckling of mouthpiece 14 may be allowed to occur with some reduction in some degree, position or direction of such conditions. In alternate embodiments, such pivoting, bending and, or buckling may be allowed to occur while the methods of the present invention are used to create benefits other than to reduce or eliminate such pivoting and, or buckling. Such other methods and benefits may include increased comfort, reduced abrasion and chaffing due to flexible portion 370, increased useful life due to member 382, increased softness of softer portion 378 due to the support of reinforcement member 382, improved seal along sealing flange 246 due to increased flexibility of flexible portion 370, increased aesthetic appeal created by the fabrication methods of the present invention, or any other benefit and provided by the methods of the present invention.

Figure 66:
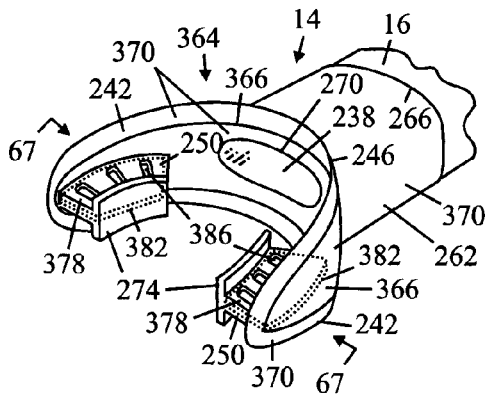
FIG. 66 shows a perspective view of an alternate embodiment.

FIG. 66 shows a perspective view of an alternate embodiment in which member 366 is visible along both inner surface 390 and outer surface 394 of U-shaped member 364.

Figure 67A:
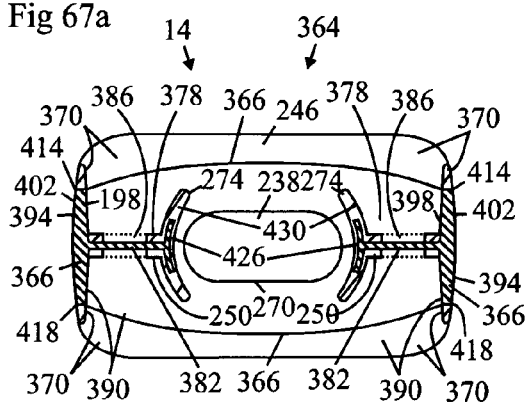
FIGS. 67a to 67d show alternate cross section views taken along the line 67-67 in FIG. 66.

FIGS. 67a to 67d show alternate cross section views taken along the line 67-67 in FIG. 66. In FIG. 67a, member 366 is seen to have a cross sectional shape that is wider in the middle and narrower on upper and lower ends. This cross sectional shape can help hold member 366 within the mold when the mold parting line is arranged to be positioned substantially along the center axial plane of members 382 as flexible portion 370 is molded above and below member 366 during a subsequent phase of an injection molding process. The use of flexible portion 370 above and below member 366 can reduce point pressures and chaffing to the gums of the user and provide an improved water tight seal. In this embodiment, vertical flanges 274 of bite tabs 15 are seen to be angled inward and curved. This can improve the contouring to the internal shape of a user's mouth, to further improve the distribution of load forces on mouthpiece 14, reduce point pressures, reduce chaffing, improve comfort and improve leverage and control over mouthpiece 14. In the embodiment shown in FIG. 67a, the material used to form flexible portion 370 is used to form softer portions 382 and softer portions 430 of bite tabs 15; however, in alternate embodiments, different materials can be used for any portion of mouthpiece 14 during any number of phases of fabrication.

Figure 67B:
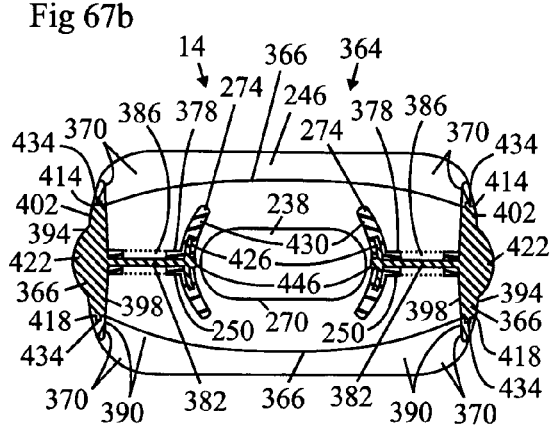

FIG. 67b shows an alternate embodiment of the cross sectional view shown in FIG. 67a. In FIG. 67b, member 366 is seen to have lateral rib member 422 that is relatively large. Lateral rib member 422 can help hold member 366 vertically in the mold when flexible portion 370 is overmolded to member 366 during a subsequent phase of injection molding. Lateral rib member can also be used to increase the structural integrity of member 366 and can also permit member 366 to be made with a more flexible material. The cross sectional view shows that the upper and lower portions of member 366 in this embodiment have flange 434 to improve the strength of the bond between member 366 and flexible portion 370 that is bonded to the upper and lower portions of member 366. Flange 434 increases the surface area of the preferred thermo chemical bond and provides mechanical leverage and distributes shear forces. Also, reinforcement members 426 within vertical flanges 274 are seen to have an outcropping member 446, which is used to provide a mechanical feature for the upper and lower halves of the mold to clamp down upon so as to provide a method for holding member 382 and, or member 426 in place within the mold during overmolding of different material onto mouthpiece 14. In alternate embodiments, outcropping member 446 may have any shape, configuration, arrangement, alignment, size, volume or position. Outcropping member 446 can be arranged to reduce or avoid potential irritation to the user's tongue (which can exist between flanges 274 during use) by having smooth, rounded, curved or chamfered edges and can also be arranged to have a relatively small outcropped size.

In alternate embodiments, any mechanical feature can be used permit any portion or portions of mouthpiece 14 that is made in an early step of injection molding to be held in place in a mold during a subsequent phase of injection molding in which another material is molded to such portion or portions. In other embodiments, any other method of holding any portion of mouthpiece 14 stable in the mold may be used with or without mechanical features being used. For example, any portion of mouthpiece 14 may be held in place with a suction or vacuum force exerted on such portion by a port or opening in a mold arranged to apply such a suction or vacuum force upon such portion.

In FIG. 67b, softer portions 378 and 430 of bite tabs 15 are seen to be made with different material than flexible portion 370 as shown by the different hatching within the cross section view. In this embodiment, softer portions 378 and 430 are preferably molded during an injection molding process in which member 366 and its connected parts are molded from a first thermoplastic material during an early phase of an injection molding process and then inserted into a subsequent mold that is arranged to simultaneously inject a second thermoplastic material to form flexible portion 370 and a third thermoplastic material is injection molded to members 382 and, or members 426 to form softer portions 378 and 430. Alternatively, such second and third thermoplastic material may also be formed during three separate phases of an injection molding process rather than two phases as previously described. In other embodiments, softer portions 430 of flanges 274 can be formed from a different material than softer portions 378 either during simultaneous or different phases of injection molding.

In alternate embodiments in which member 426 and, or member 382 are not used, bite tabs 15 can be made with a third thermoplastic material that is simultaneously injected molded to inner surface 398 of member 366 as a second thermoplastic material is injection molded to from flexible portion 370 along upper portions 414 and lower portions 418 of member 366.

Figure 67C:
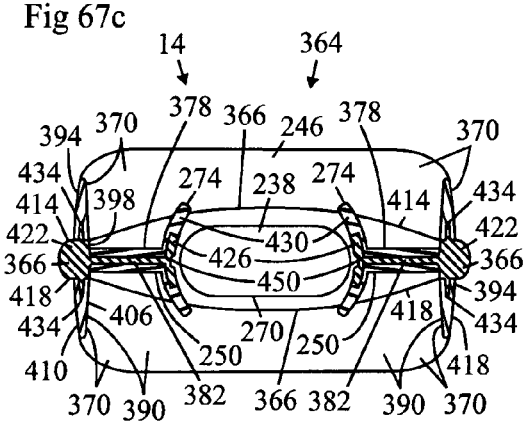

FIG. 67c shows an alternate embodiment of the cross sectional view shown in FIG. 67a. In FIG. 67c, member 366 is seen to primarily be lateral rib member 422. In this embodiment, member 422 is seen to have flanges 434 that extend above and below member 422 into flexible portion 370. In this embodiment, flanges 434 are seen to be relatively long and taper toward their tips. Any length, size shape, or configuration may be used for flanges 434 or member 422 can be also be made without any flanges 434. The elongated and tapered arrangement of flanges 434 shown in FIG. 67c can be used to provide a smooth transition in flexibility from the stiffer member 422 to upper and lower portions of flexible portion 370. The tapering can provide increased flexibility with increased distance from rib member 422 if desired. Also, in FIG. 67c, member 426 in vertical flange 274 of bite tab 15 is seen to have a recess 450. In this embodiment, the lengthwise central core of the mold that extends between flanges 274 is arranged to have mating outcroppings that fit into recesses 450 in member 426. This can allow member 426 and, or member 382 to be held stable within the mold as different material is overmolded to mouthpiece 14. Recess 450 can also reduce or avoid potential irritation to the user's tongue (which can exist between flanges 274 during use) as it is inset and can have smooth, rounded, curved or chamfered edges. In the embodiment shown in FIG. 67c, bite tabs 15 are seen to be without recesses 386 (not shown) as shown in FIG. 67a. This is to show that recess 450 can be used to stabilize member 382 in the mold during overmolding when recesses 386 (not shown) are not used in bite tabs 15, or if such recesses are used but do not extend to member 382 for clamping in position, or if other surface features or contours are used within the external surfaces of bite tabs 15 and, or softer portion 378.

Figure 67D:
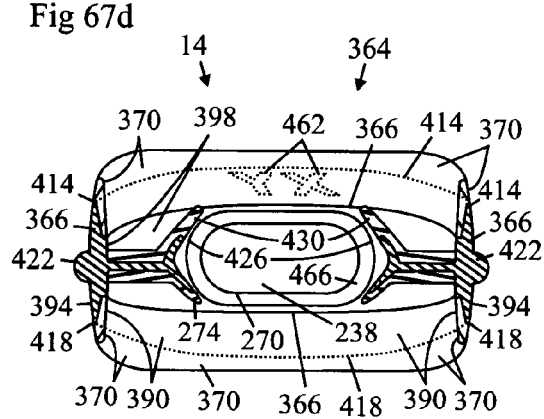

FIG. 67d shows an alternate embodiment of the cross sectional view shown in FIG. 67a. The embodiment in FIG. 67d is seen to have an offset arrangement of bite tabs 15 in which the lower horizontal surfaces of bite tabs 15 have a longer transverse dimension than the upper horizontal surfaces of bite tabs 15. This permits bite tabs 15 to accommodate the offset arrangement of a user's teeth in which the upper teeth over bite the lower teeth to create an offset alignment. Also, an outer surface 454 of member 426 is seen to be flush with an outer surface 458 of vertical flange 274. In addition, outer surface 454 of member 426 is angled or cupped in a concave manner so that the central core within the mold that fits between flanges 274 can hold outer surface 454 of members 426 as well as members 382 stable in the mold as softer portions 378 and 430 are injection molded to onto members 382 and 426.

In this embodiment, a portion of member 366 is seen to be exposed along inner surface 390 of U-shaped member 364 above and below passageway 238. In between these exposed portions of member 366 above and below passageway 238 and passageway 238 is a flexible rim 466 which in this example, is made with the same material as flexible portion 370 during the same phase of an injection molding process; however, flexible rim 466 may be made with the same material as soft portions 378 and, or 430, or may be made with any other material during any phase of an injection molding process.

In FIG. 67d, member 366 is seen to have a relatively small and rounded lateral rib member 422. In this embodiment, upper portions 414 and lower portions 418 of member 366 are seen to be tapered and outer surface 402 of member 366 is flush with outer surface 394 of U-shaped member 364. In this embodiment, inner surface 398 of member 366 is arranged to be flush with inner surface 390 of member 364 near bite tabs 15 and then spaced from inner surface 390 along the tapered portions of member 366 so that inner surface 398 along the tapered portion of member 366 is laminated to outer surface 410 of flexible portion 370. This increases the surface are of the bond between member 366 and flexible portion 370, increases mechanical bonding strength, distributes and reduces shear forces on the bond and the tapered shape of member 366 provides a smooth transition in flexibility between member 422 and the upper and lower edges of flexible portion 370.

Also, because outer surfaces 410 of flexible portion 370 is laminated to inner surfaces 398 along the tapered portions of member 366, upper end 414 and lower end 418 of member 366 is displayed by dotted lines along the inner surface 390 of U-shaped member 364 near passageway 238 from the view shown in FIG. 67d. In between the dotted line of upper portion 414 and passageway 238 are dotted lines showing the outline of a cutout pattern 462 which creates voids or openings within member 366 that, in this particular example, are shaped as an "X" and a "Y". Cutout pattern 462 can be of any shape, size, pattern, design, letters, wording, symbol or combinations of such. In this situation, cutout pattern 462 is arranged to permit the material of flexible portion 370 to flow through member 366 from inner surface 390 of U-shaped member 364 to outer surface 394 (not shown) of U-shaped member 364.

Figure 68:
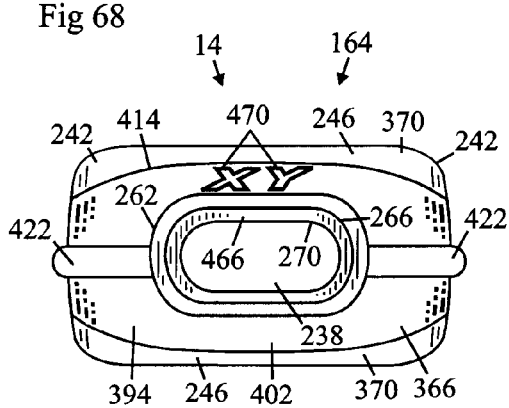
FIG. 68 shows a front view of the embodiment shown in FIG. 67d.

FIG. 68 shows a front view of the embodiment shown in FIG. 67d. In FIG. 68, an overmolding pattern 470 is seen along outer side 394 of member 364, in which overmolding pattern is seen in this example to be made with the flexible material of flexible portion 370 and is overmolded to member 366. In this example, overmolded pattern 470 is in the form of the letters "XY" and is made with flexible material of flexible portion 370 surrounded by the stiffer material of member 366; however, in alternate embodiments overmolding pattern 470 may have any form, shape, composition, design, color, arrangement, size, configuration and may be made with any material along any portion of mouthpiece 14. When comparing FIG. 68 to FIG. 67d, this embodiment of overmolding pattern 470 in FIG. 68 is seen to correspond to the size, shape and placement of cutout pattern 462 in FIG. 67d; however, in alternate embodiments, cutout pattern 462 of FIG. 67d may have any size, shape and, or placement in relation to overmolded pattern 470 shown in FIG. 68. In this example, cutout 462 shown in FIG. 67d permits the flexible material of flexible portion 370 to flow through cutout 462 from inner surface 390 of member 364 to outer surface 394 shown in FIG. 68 to form overmolding pattern 470. Overmolding pattern 470 can be arranged to be flush with outer surface 394 or may be raised or recessed from outer surface 394.

In alternate embodiments, overmolding pattern 470 can also be reversed so that overmolding pattern 470 is made with a stiffer material such as used for member 366 and the material surrounding overmolding pattern 470 along outer surface 394 can be a more flexible material such as that used for flexible portion 370. In such a situation, at least one portion of member 366 can have flexible portion 370 laminated to the outer surface of member 366 so that this laminated portion of flexible portion 370 appears along at least one portion of outer surface 394 (or any other outer surface of mouthpiece 14 that can be viewable) and overmolding pattern 470 is a raised area along the outer surface of member 366 that extends to outer surface 394 to be viewable, while at least one other portion of member 366 around such raised area remains hidden below flexible portion 370 to provide contrast when different colors are used for the stiffer and more flexible material. In other alternate embodiments, similar or the same material can be used with different colors to create contrast and visibility to overmolding pattern 470. In alternate embodiments, any method of producing overmolding pattern 470 may be used along any position of mouthpiece 14.

FIG. 69 shows a perspective views of an alternate embodiment in which reinforcement member 364 is separated into a plurality of separate portions on either side of passageway 238. Member 364 is seen to have a connection portion support members 474 that, in this example, extend longitudinally along connecting portion 262 and are preferably connected to connection portion 262 with a thermo chemical bond created during a phase of an injection molding process. Preferably, at least a portion of such a chemical bond will include at least one mechanical bond; however, any chemical and or mechanical bond may be used. In this example, member 474 includes lateral rib member 422 that has a relatively planar shape; however, in alternate embodiments, member 474 may have any shape, combinations of shapes, combinations of structural support features, alignment, arrangement, size, orientation or configuration. Member 474 can be used to increase the structural integrity of member 366 and increase leverage and control over tube 16 by the user's teeth and mouth. In embodiments where connection portion 262 is arranged to be elastic so that it can expand and then contract around tube 16 during assembly, it is preferred that members 474 are made with a relatively yieldable material and, or that the portions of flexible portion 370 between such members 474 are sufficiently extensible to enable such assembly without much or any flexing from members 474.

In this embodiment, bite tabs 15 are seen to extend to rearward opening 270 of passageway 238. In this embodiment, members 382 within bite tabs 15 also extend to rearward opening 270. This can increase leverage and control over the positioning and grip of mouthpiece 14 by the user's teeth and jaw, and can reduce jaw fatigue and increase comfort. Also, this can further distribute biting tension over a larger area so that extremely soft material may be used if desired for softer portion 378 of bite tabs 15. This can also be used as a method to further increase the structural integrity of member 366 so as to reduce or eliminate excessive bending, buckling and, or collapse of member 366.

In this example, member 366 along U-shaped member 364 is seen to be lateral rib member 422; however, member 366 may have any shape or form.

FIG. 70 shows a perspective view of an alternate embodiment to the example shown in FIG. 69. In FIG. 70, members 474 includes a transverse member 478, which in this example, extends along the upper surface of connection portion 262. In alternate embodiments, transverse member 478 may exist at any position and may have any shape, size, dimension, or configuration. Transverse member 478 may have any degree of connectedness to member 366 and, or member 474, or may be completely separate from member 366 and, or member 474. In this embodiment, transverse member 478 has overmolding pattern 470 in the form of the letters "XY" so that the methods of the present invention can permit transverse member 478 and flexible portion 370 that exists within overmolding pattern 470 may be injection molded with different colors to provide styling and contrast for greatly improved aesthetics that can increase improve marketing and sales volumes.

FIG. 71 shows a perspective view of an alternate embodiment to the embodiment shown in FIG. 69. In FIG. 71, members 474 are seen to include both a panel member 482 and lateral rib member 422. In this example, panel member 474 is connected to member 474 along the lateral sides of connection portion 262; however, any position, alignment, shape, size or configuration may be used. In this embodiment, panel 482 is preferably connected to connection portion 262 in any suitable manner, including chemical bonds, mechanical bonds, lamination bonds, weld bonds, thermo chemical bonds, edge to edge bonds or any combinations of bonds. Panel member 482 can be used to distribute loads exerted on member 474 over an increased surface area. In this example, panel member 482 has overmolding pattern 470, which can be formed in any suitable manner and have any shape or configuration.

In this example, member 366 along U-shaped member 364 is seen to be elongated in a vertical direction and also have lateral rib member 422 and also provides a connection between members 474. This embodiment has bite tabs 15 made with a single material; however, any number of materials may be used.

FIG. 72 shows a perspective view of an alternate embodiment to the embodiment shown in FIG. 71. In this example, member 474 has panel member 482 and does not use lateral rib member 422 as shown in FIG. 71 along connection portion 262 or U-shaped member 364; however, any arrangement can be used. The embodiment in FIG. 72 uses member 382 within bite tabs 15.

FIG. 73 shows a perspective view of an alternate embodiment to the embodiment shown in FIG. 71. In FIG. 73, member 474 includes planar member 482 located along the upper surface of connection portion 262 with overmolding pattern 470 existing along this surface as well. This alternate positioning of members 482 can be used to provide additional structural support to reduce or prevent excessive bending, buckling or collapse of U-shaped member 364 when loads are applied to tube 16. In this embodiment, member 482 is connected to member 366 along U-shaped member 364 near rearward opening 270 of passageway 238; however, in alternate embodiments, member 482 may be connected to any portion of mouthpiece 14.

FIGS. 69 to 73 show a few of the many variations, combinations and alternate embodiments that may be used. Any of the embodiments and individual variations in any portion of this specification and description may be used alone and, or combined and, or varied in any manner.

FIG. 74a shows a portion of an alternate embodiment that is made during at least one early phase of an injection molding process. In this example, member 366, connection portion 262, bite tabs 15 and flanges 274 are made with at least one initial thermoplastic material 486. FIG. 74b shows the same part shown in FIG. 74a, except that in FIG. 74b flexible portion 370 and sealing flange 246 is made with at least one different thermoplastic material 490 that is overmolded onto material 486 during at least one subsequent phase of an injection molding process.

FIG. 75a shows a portion of an alternate embodiment that is made during at least one early phase of an injection molding process in which U-shaped member 364, member 366 and connection portion 262 are made with initial thermoplastic material 486. FIG. 75b shows the same part shown in FIG. 75a, except that in FIG. 75b bite tabs 15 are made with different thermoplastic material 490 during at least one subsequent phase of an injection molding process.

FIG. 76a shows a portion of an alternate embodiment that is made during at least one early phase of an injection molding process in which member 366 is made with first thermoplastic material 486 and FIG. 76b shows the same part shown in FIG. 76a, except that in FIG. 76b sealing flange 246, connection portion 262, bite tabs 15 and flanges 274 are made with at least one different thermoplastic material 490 during at least one subsequent phase of an injection molding process.

FIG. 77a shows a portion of an alternate embodiment that is made during at least one early phase of an injection molding process in which separate reinforcement members 366 are made with at least one first thermoplastic material 486 during at least one early phase of an injection molding process, and FIG. 77b shows the same part shown in FIG. 77a except that in FIG. 77b connection portion 262, sealing flange 246, bite tabs 15 and flanges 274 are made with at least one different thermoplastic material 490 during at least one subsequent phase of an injection molding process.

In FIGS. 74a through 77b, it is preferred that at least one different thermoplastic material 490 used during at least one subsequent phase of the injection molding process is relatively softer and, or relatively more flexible than at least one first thermoplastic material 486 used during the earlier phase of the injection molding process; however, any combinations or variations in softness, hardness, flexibility and, or number of injection molding phases may be used for any individual component within any of the embodiments shown here or in any other embodiment discussed in this description or may be varied in any other manner.

In FIG. 77b, the outer surface of reinforcement member 366 is seen to have diagonal lines to illustrate a potential use of color contrast and/or translucent illumination contrast in alternate embodiments. In embodiments using one material rather than two or more materials to make mouthpiece 14, reinforcement member 366 can be a raised rib-like member along the outside surface of U-shaped member 364 which is thicker than sealing flange 246 so as to be less luminescent under ambient light than sealing flange 246.

In other embodiments using one material along the outer surface of U-shaped member 364, the diagonal lines along the outside of member 366 can be the result of a darker band, stripe or pattern of color appearing along the outer surface of U-shaped member 364 that is partially, mostly or solely created by optical filtering and reduced luminescence as ambient light is highly filtered as it passes transversely through bite tabs 250 from the inner ends of bite tabs 250 to the outer surface of U-shaped member 364. In such examples, the methods of the present invention for arranging the translucency of the material and pigment within mouthpiece 14 along while arranging the concentration of translucent pigment, can be used to permit sealing flange 246 to illuminate under ambient lighting conditions while the ambient light passing through bite tabs 250 is arranged to create a deeper or darker or color band, stripe or predetermined pattern to appear along the outer surface of U-shaped member 364 under ordinary levels of ambient light conditions to provide a method for increased shelf appeal, styling and marketability.

Figure 78:
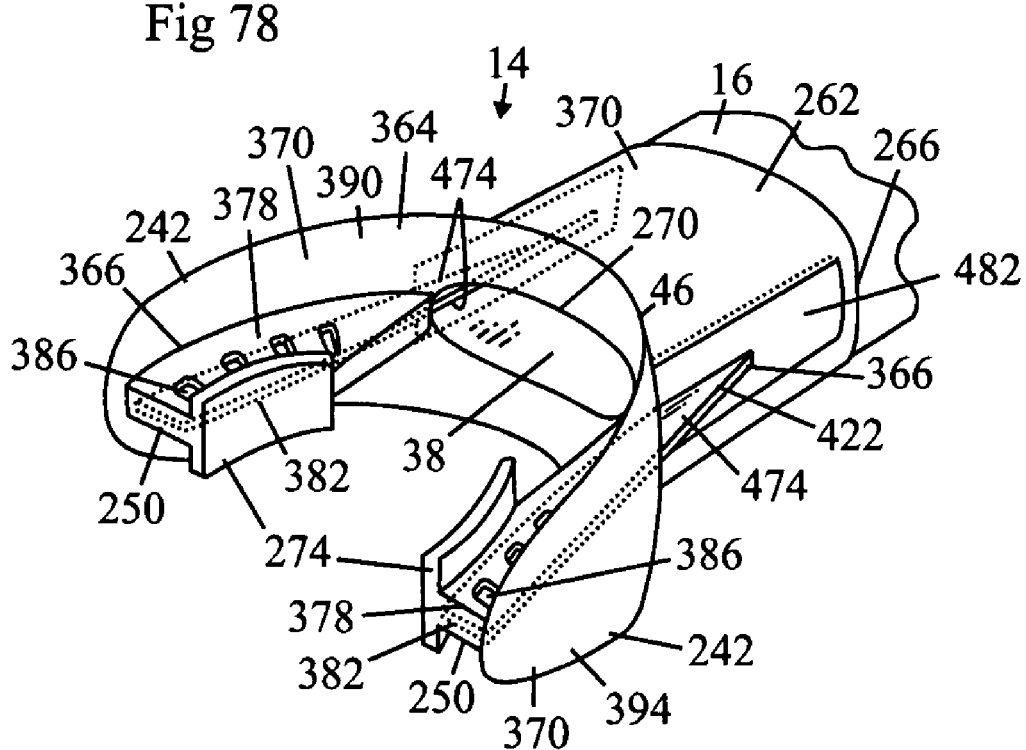
FIG. 78 shows a perspective view of an alternate embodiment.

FIG. 78 shows a perspective view of an alternate embodiment in which member 366 is separated and extends to form members 382 through bite tabs 15 and as shown by dotted lines which illustrate one potential outlined shape. In alternate embodiments, members 382 and 466 may have any shape, contour, size, length, width, thickness or configuration. In this embodiment, member 366 is not positioned within any significant length of wings 242 of U-shaped member 364; however, member 366 can have any form, shape, arrangement, placement, positioning, alignment, configuration, size or length, including also existing within or on any portion of U-shaped member and, or wings 242. In this embodiment, members 382 within bite tabs 15 are seen to be relatively flat and planar; however, any cross sectional shape may be used for members 382. Examples of some of the many possible cross sectional shapes can include rod shaped, I-beam shaped, H-shaped, L-shaped, T-shaped, sideways T-shaped, U-shaped, tubular, ovular, curved or any other suitable cross sectional shape. In alternate embodiments, member 366 within tabs 15 may include a plurality of support structures having any alignments, sizes, configurations, shapes or arrangements.

In the embodiment shown in FIG. 78, members 366 form members 382 within bite tabs 15 behind U-shaped member 364 extend forward of U-shaped member 364 to form connection portion support members 474. In this example, members 474 include both lateral rib member 422 and panel member 482; however, members 474 may have any shape, form, configuration, size, positioning, arrangement, alignment or contour. In this example, the structural integrity provided by members 366 and members 382 can be used to reduce or eliminate undesirable bending and deformation of mouthpiece 14 when a predetermined loading force is applied to tube 16, even if U-shaped member 364 and wings 242 are highly flexible and vulnerable to deformation. This can allow wings 242 to be made very soft and flexible for increased contouring, comfort and, or water tight sealing against the soft tissues of the user's mouth. This can be achieved, it desired, with a reduced need for additional structural support within wings 242; however, in alternate embodiments, any type, structure, method, or degree of structural support can also exist within wings 242 or any other portion of U-shaped member 364. In addition to the increased structural support provided by members 366 and members 382, softer portion 378 can be made relatively soft and relatively compressible to provide comfort, cushioning, contouring and gripping for the teeth of the user.

Figure 79:
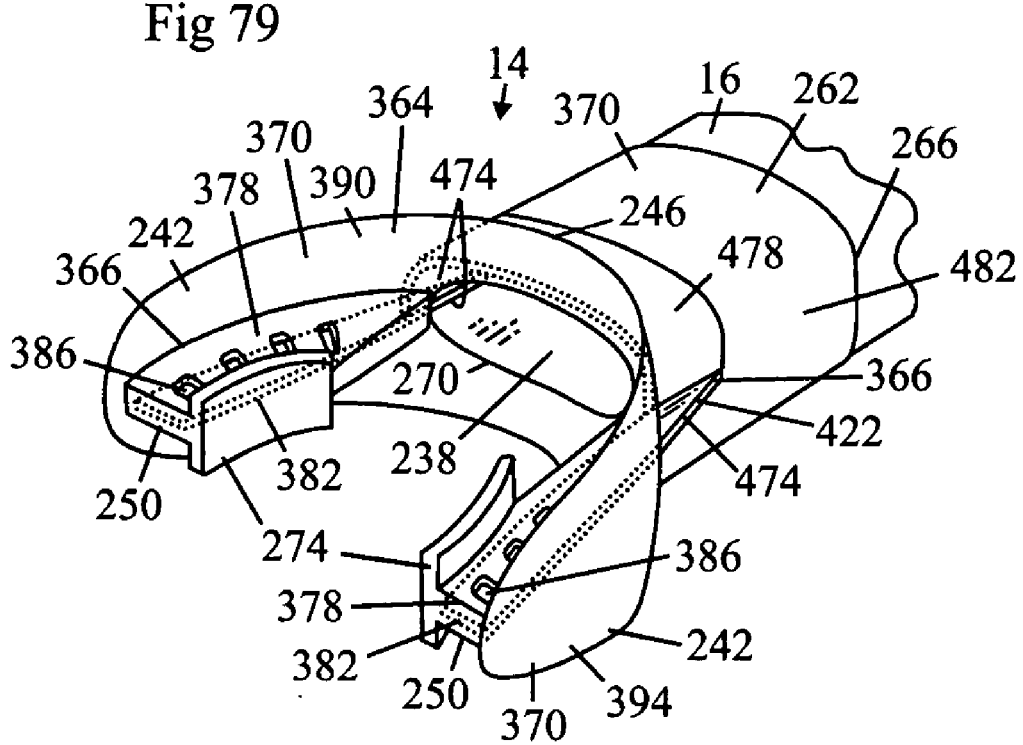
FIG. 79 shows a perspective view of an alternate embodiment.

FIG. 79 shows a perspective view of an alternate embodiment of the embodiment shown in FIG. 78; however, in FIG. 79 member 474 along member 366 includes lateral rib member 422 and transverse member 478. Transverse member 478 connects the spaced apart members 474. In this embodiment, transverse member 478 is seen to only cover the upper portion and part of the lateral portions of connection end 262 of mouthpiece 14; however, transverse member 478 may have any size, dimension, configuration, shape, placement, contour and may extend around a larger or smaller portion of the circumference of connection portion 262 that surrounds passageway 238 and my extend all the way around the circumference of connection end 262 to form a reinforced tube section if desired.

Figure 80:
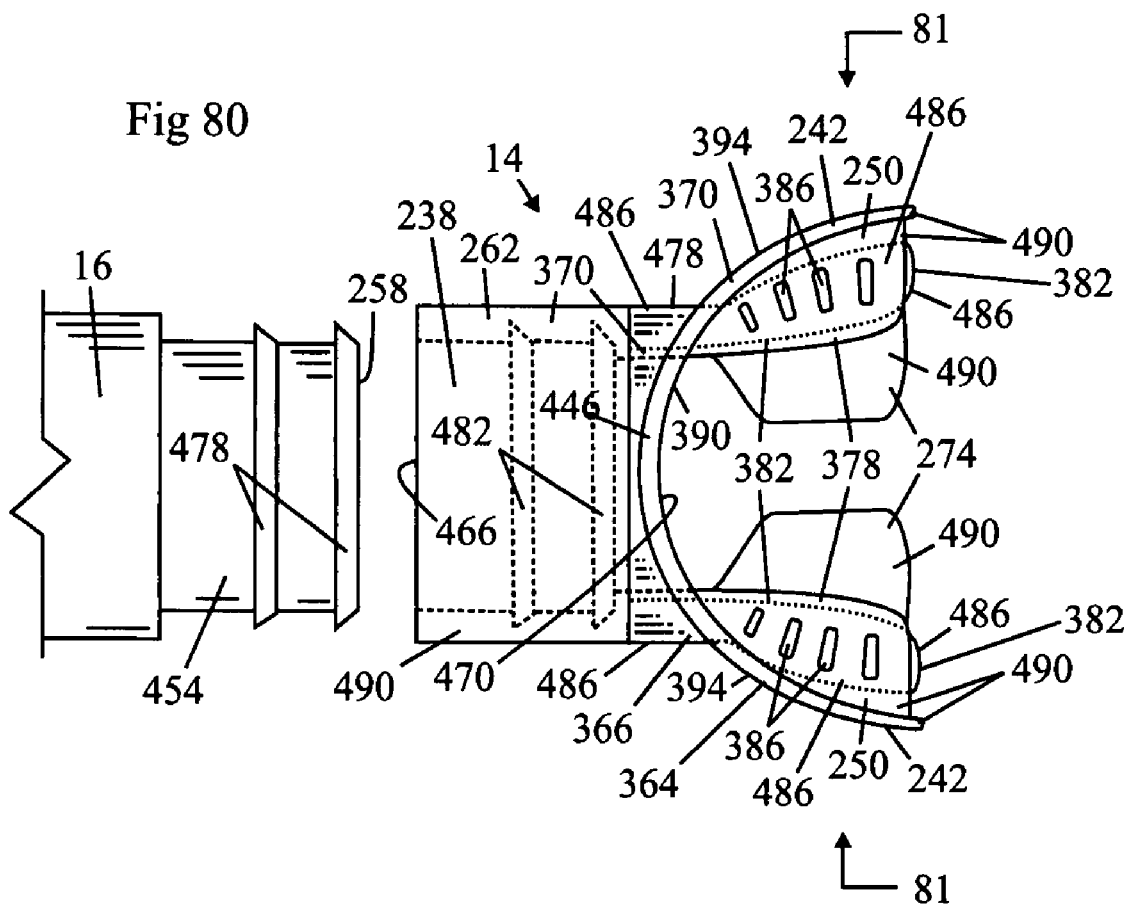
FIG. 80 shows a top view of an alternate embodiment.

FIG. 80 shows a top view of an alternate embodiment in which transverse member 478 which is seen to exist behind the portion of connection end 262 of mouthpiece 14 that conforms to the position of opening 258 of connection portion 254 of tube 16 when tube 16 is coupled to connection end 262. This can permit the portions of connection end 262 of mouthpiece 14 that are in front of transverse member 478 to flex around and then grip connection end 245 of tube 16 for quick and easy coupling.

In the embodiment shown in FIG. 80, members 382 are seen to extend rearward and be visibly exposed behind bite tabs 15. This can allow this portion of members 382 to be clamped vertically within the mold when softer portion 378 is molded over members 382. This can allow recesses 386 to not extend all the way down to members 382 if desired; however, any method of holding members 382 and, or members 366 stable within a mold during overmolding may be used. In addition, recesses 386 may have any configuration or form and can also not be used at all if desired.

In this embodiment, flanges 274 are seen to be significantly large and extend inwardly from bite tabs 15. Flanges 274 can have any shape, thickness, dimension, size, contour, alignment, configuration, consistency, positioning or arrangement.

Figure 81:
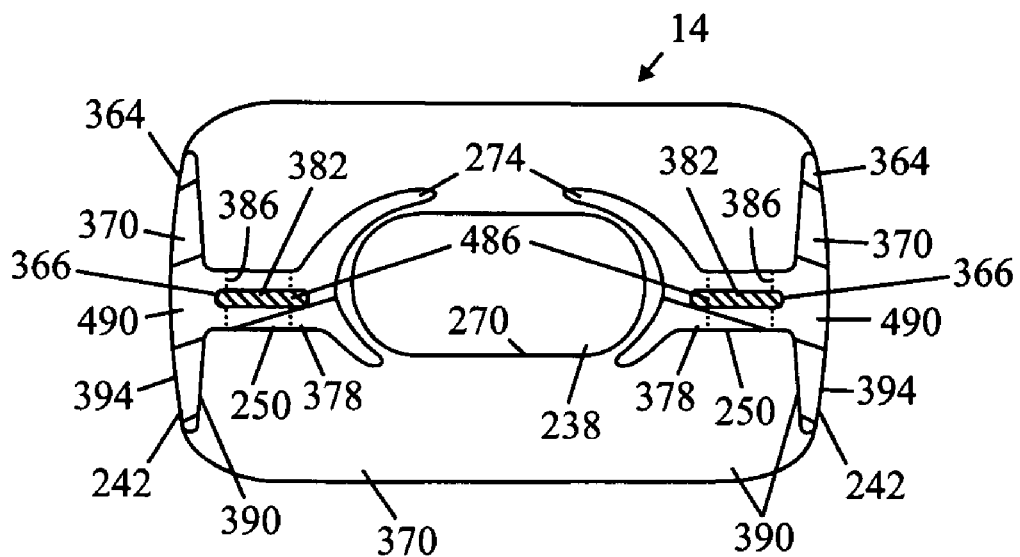
FIG. 81 shows a cross section view taken along the line 81-81 in FIG. 80.

FIG. 81 shows a cross section view taken along the line 81-81 in FIG. 80. In FIG. 81, members 382 are seen to be positioned within the center of bite tabs 15; however, members 382 may exist near or at the upper and, or lower surfaces of bite tabs 15 and may have any configuration, contour, shape, positioning, size, thickness, cross sectional shape, flexibility, stiffness or consistency. Members 382 are also seen to not be located within wings In this cross section view, Recesses 386 are shown be dotted lines because recesses 386 are behind the plane of the line 81-81 in FIG. 80. In this embodiment shown in FIG. 81, vertical flanges 274 are seen to be angled and, or curved in an inward direction from bite tabs 15. This can increase contouring to the shape of the mouth of a swimmer. In this example, the upper portions of flanges 274 are seen to be significantly large; however, any size, configuration, shapes or combinations of shapes for flanges 274 may be used in alternate embodiments.

Figure 82:
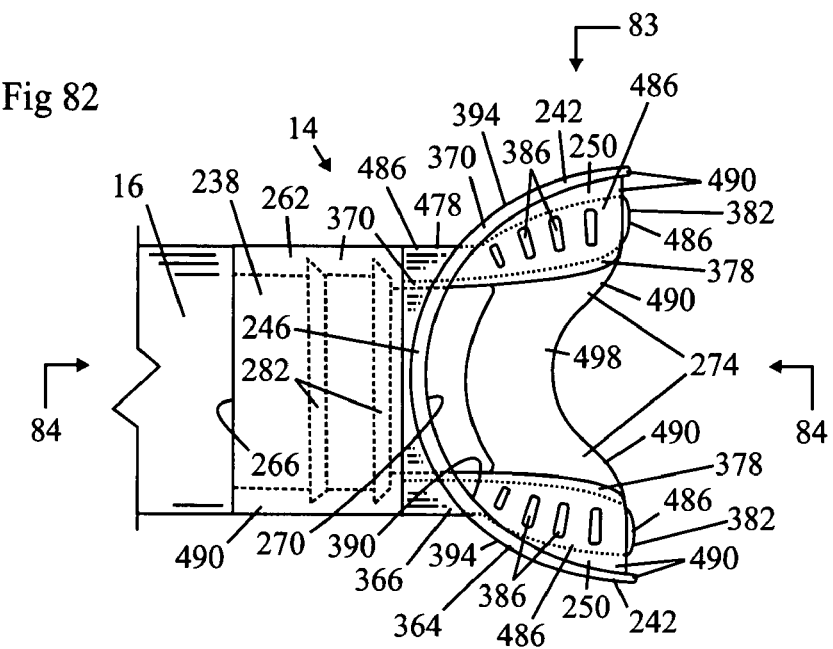
FIG. 82 shows a top view of an alternate embodiment.

FIG. 82 shows a top view of an alternate version of the embodiment shown in FIGS. 80 and 81. In FIG. 82, flanges 274 extend inward from bite tabs 15 and connect to form a bridge member 498 that is arranged to press up against the roof of the mouth of the user.

Figure 83:
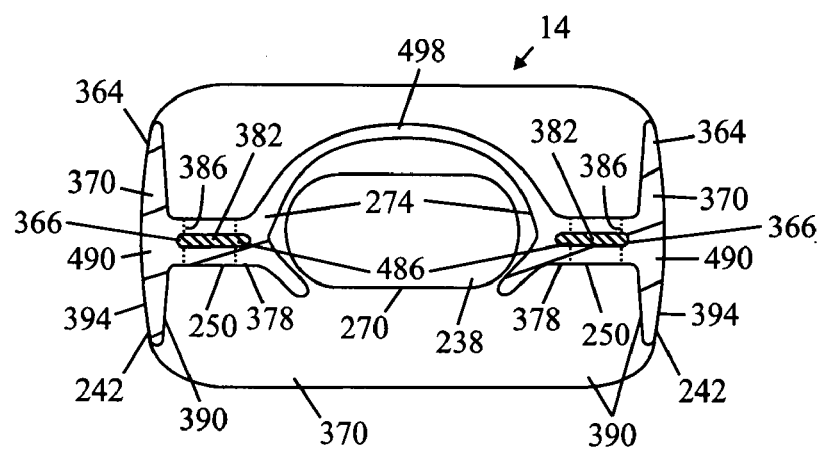
FIG. 83 shows a cross section view taken along the line 83-83 in FIG. 82.

FIG. 83 shows a cross section view taken along the line 83-83 in FIG. 82. In FIG. 83, the upper surface of bridge member 498 is seen to be convexly curved to shape to the roof of the mouth of a swimmer and press up against such roof of the mouth to provide support for mouthpiece 14. Because the methods of the present invention permit mouthpiece 14 and, or bite tabs 15 to have greater stability and resistance to deformation, when the roof of the mouth of the user presses down on the upper surface of bridge member 498, bridge member 498 has improved support against such downward pressure due to the increased structure provided by member 366 and, or members 382 within bite tabs 15.

Figure 84:
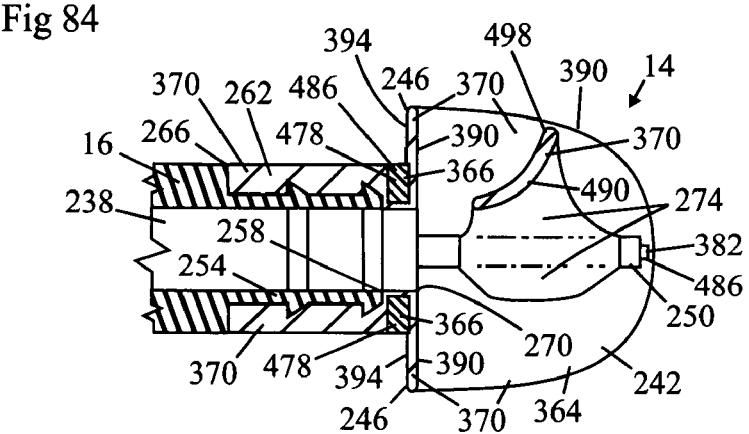
FIG. 84 shows a cross section view taken along the line 84-84 in FIG. 82.

FIG. 84 shows a cross section view taken along the line 84-84 in FIG. 82. In the lengthwise cross section view in FIG. 84, bridge member 498 is seen to be concavely curved along its upper surface and is angled upward in a rearward direction. This is to shape to the roof of the mouth of the user having such contours; however, in alternate embodiments, bridge member 498 may have any desirable shape or contour. In alternate embodiments, bridge member 498 may be arranged to press against the lower surface of the mouth of user in addition to, or rather than, being arranged to press against the roof of the mouth of the user.

In the cross section view of FIG. 84, transverse member 478 is seen to be relatively close to and behind opening 258 of tube 16; however, transverse member 478 may have any positioning or configuration. The configuration in FIG. 84 can permit connection portion 262 to be significantly flexible while transverse member 478 can exert leverage against opening 258 of tube 16 for structural stability.

Figure 85:
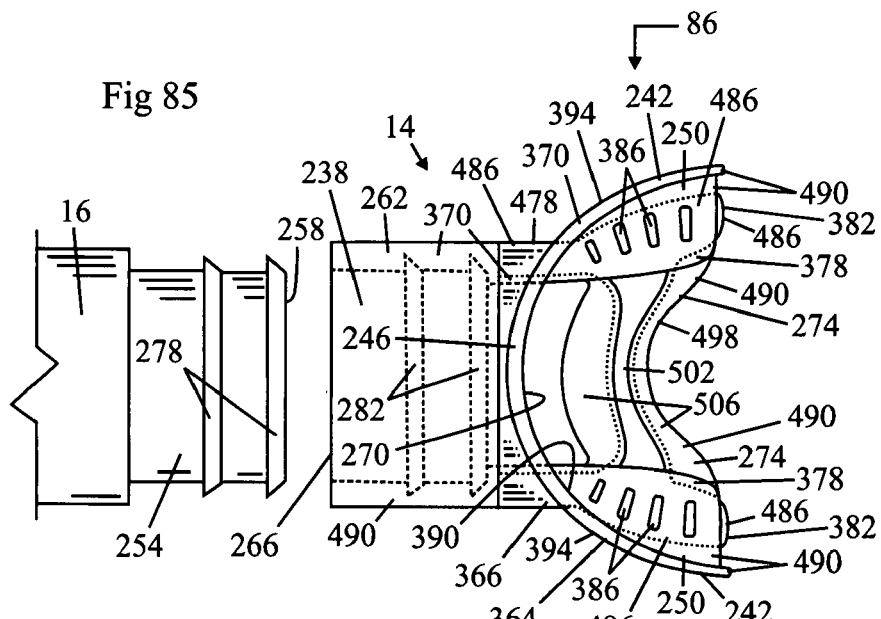
FIG. 85 shows a top view of an alternate embodiment.

FIG. 85 shows a top view of an alternate version of the embodiment shown in FIGS. 82 to 84. In FIG. 85, members 382 within bite tabs 15 extend inward from bite tabs 15 and across bridge member 498 to form a bridge reinforcement member 502. In alternate embodiments, member 502 may extend over a portion of bridge 498 rather than the entire width of bridge 498. In this example, bridge reinforcement member 502 is wider near bite tabs 15 and narrower near the center of bridge member 498 and this can be used to provide increased flexibility for reinforcement member 502 near the axial center of bridge member 498 for permitting contouring to the roof of the user's mouth, while the wider portions of member 502 near bite tabs 15 provide reduced flexibility for increased structural integrity and distribution of loading forces. However, in alternate embodiments, member 502 may have any size, length, width, contour, thickness, shape, configuration or arrangement. Bridge member 498 is also seen to have softer bridge portions 506 adjacent to bridge reinforcement member 502. The dotted lines along the forward and rear edges of member 502 show portions of member 502 that are hidden below the upper surface of member 502 to provide a laminated edge that can provide both a mechanical and a thermo chemical bond during molding softer portion 506 is molded onto at least one initial bridge member 502 during a phase of an injection molding process.

Figure 86:
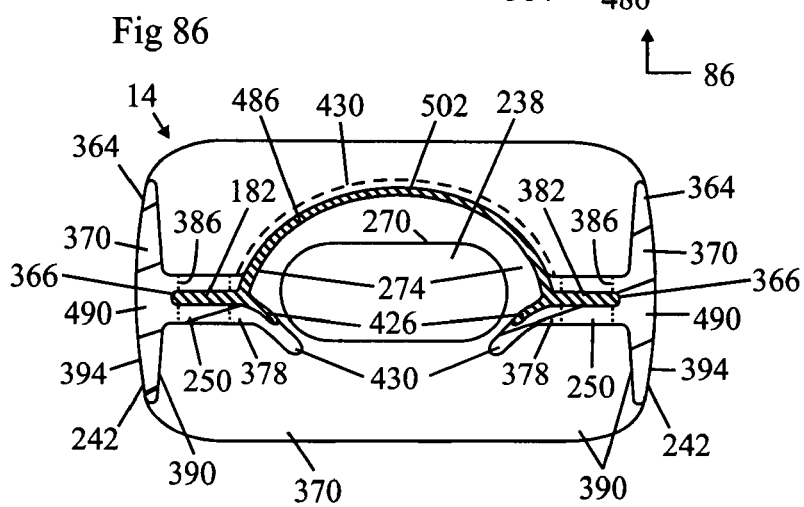
FIG. 86 shows a cross section view taken along the line 86-86 in FIG. 85.

FIG. 86 shows a cross section view taken along the line 86-86 in FIG. 85. In FIG. 86, member 502 is seen to be made with the same material 486 as members 382 and members 426; however, in alternate embodiments, bridge member 502 may be made with a separate thermoplastic material that is different from members 382, members 366 and, or members 466. The dotted lines above bridge member 502 show one example of a possible relative position of softer portion 506 that is spaced into the page from the plane of the cross section in this view. This dotted line shows that in this embodiment, softer portion 506 can be thicker than reinforcement member 502 to provide additional cushioning and structure and member 502 can be thinner. Such a reduced thickness for member 502 can permit member 506 to laminate over the upper surface of the forward and rearward edges of member 502 for improved bonding and can also permit the mold to clamp member 502 in position as softer portion 506 is molded to member 502. Preferably, bridge member 502 is less flexible than softer portion 506 and this permits bridge reinforcement member 502 to provide improved structural stability and reduced deformation of bridge 498 as the roof of the user's mouth presses downward on bridge 498.

Figure 87:
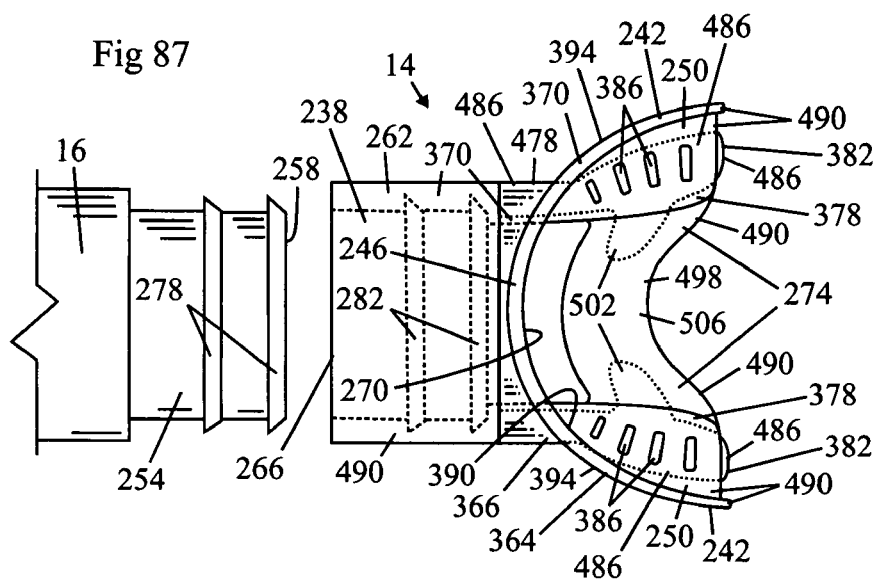
FIG. 87 shows a top view of an alternate embodiment.

FIG. 87 shows a top view of an alternate version of the embodiment shown in FIGS. 85 and 86, in which the embodiment in FIG. 87 uses separated bridge reinforcement members 502 which extend inwardly from bite tabs 15 and extend partially across the transverse dimension of bridge member 498. This can permit the central portion of bridge member 498 to have increased flexibility along its center axis to permit flexing to the contours of the roof of the user's mouth, while members 502 provide increased structural support to reduce buckling, collapsing or excessive bending of bridge member 498 during use. In this example, dotted lines show the position of bridge reinforcement members 502 below the upper surface of bridge member 498 in order to permit softer portion 506 to provide cushioning to the roof of the user's mouth along the upper surface of bridge ember 498 above members 502. In alternate embodiments, members 502 may be visible along the upper surface of bridge member 498 if desired.

While it is preferred that mouthpiece 14 be reinforced along its length to reduce deformation around a transverse axis during use, the improvements to flanges 274, bite tabs 15 and, or bridge member 498 provided by overmolded reinforcement and cushioning to flanges 274, bite tabs 15 and, or bridge member 498 may be used with or without longitudinal support structures along the length of mouthpiece 14 because such structural improvements to flanges 274, bite tabs 15 and, or bridge member 498 provide major advantages in comfort, control, leverage, structural integrity, styling fabrication methods, contouring, cushioning, reinforcement and, or reduced jaw fatigue and mouth pain. Any of the individual embodiments and variations disclosed may be combined with any of the other individual embodiments and variations in any manner, amount, degree, configuration and, or arrangement.

SUMMARY, RAMIFICATIONS, AND SCOPE

Although the description above contains many specificities, these should not be construed as limiting the scope of the invention but as merely providing illustrations of some of the presently preferred embodiments of this invention.

For example, the reader will see that the methods of the present invention can be used to improve the performance of molded flexible tubes, including injection molded flexible tubes used for snorkels, breathing tubes, dive equipment as well as any other application.

The reader will also see that the methods of the present invention can also be used in any application that can benefit from a relatively short tube that can fit within an injection mold. Any of the embodiments in the present invention may be molded in a pre-bent configuration or a straight configuration. Any combination of features in one or more embodiments can be combined in any order with other embodiments, features or variations and all such embodiments are incorporated by reference to each other embodiment, feature and embodiment described. Longer versions with integral connection ends 8 of any type can also be made in any manner whatsoever. Variations of flex tube 2 may be injection molded with the methods of the present invention and used for any portion of diving equipment, surface supply hoses, gas delivery hoses, liquid delivery hoses or any other suitable variations.

Variations of the present invention may also be used for flexible tubing in automobiles or other machinery for conveying air, gas, fluids, transporting objects through such tubing or for containing or bundling parts such as wires, chords, cables, fibers and the like.

While one of the preferred methods of fabrication is injection molding, flexible tubes of the present invention can also be fabricated by compression molding, blow molding, rotational molding, extrusion, transfer molding, or any other desired method of fabrication.

The methods of the methods of the present invention can be used to create a significant reduction in production costs, assembly times, product weight, manufacturing time, and mold cycle times while increasing the strength, integrity, flexibility, reliability and aesthetics in comparison to flex tubes of the prior art.

The methods of the present invention can also be used to make flexible tubes that are intended to be sufficiently flexible to be able to collapse or buckle during use wherein the methods of the present invention can provide improved eye catching styling and/or color contrast for increased marketing advantages to such alternate embodiments.

Also, while the description gives examples for diving mouthpieces, in alternate embodiments, any of the methods of the present invention can be used for any type of mouthpiece that is connected to any type of tube that can exert a force, including weight and, or drag upon the mouthpiece. This can include ventilation tubes, tracheal tubes, feeding tubes, or any other type of device connected to a mouthpiece.

In alternate embodiments, the mouthpiece can have a removable reinforcement insert and, or attachment that provides increased structural support when inserted and increased flexibility when removed. Similarly, alternate embodiments can also have a removably attachable cushioning portion, attachment and, or insert that provides increased cushioning when attached and reduced cushioning when removed.

In alternate embodiments, the mouthpiece can have any form, shape, contour, arrangement or configuration suitable for allowing the user to retain the mouthpiece within the mouth. For example, in alternate embodiments, the bite tabs may have any shape, size, arrangement or configuration or may be not used at all. In addition, the use of a U-shaped member can be substituted for any suitable mouth engaging member that can provide a usable connection with the user's mouth. In addition, a U-shaped member can be provided by inserting a flexible planar or non-U-shaped member into the mouth, which becomes U-shaped after inserted into the mouth due to flexing and contouring to the user's mouth. In other embodiments where a U-shaped member is avoided entirely, the structural reinforcement methods, cushioning and, or contouring methods may be used to provide improved benefits without any U-shaped member. For example, reinforced and cushioned bite tabs can extend from the opening of a breathing tube or from any predetermined body arranged to provide breathable air, without any U-shaped member or sealing flange and the user's lips can be used to create a water tight seal around such breathing tube or predetermined body in any suitable manner.

The methods of the present invention can also be used to provide improved mouthpieces for non-diving applications such as sports, medical breathing and feeding tubes, or any other type of mouthpiece.

The methods of the present invention can also be used to make mouthpieces that are intended to be sufficiently flexible to be able to collapse or buckle during use wherein the methods of the present invention can provide improved eye catching styling and/or color contrast for increased marketing advantages to such alternate embodiments.

Accordingly, the scope of the invention should not be determined not by the embodiments illustrated and described, but by the appended claims and their legal equivalents.

I claim:

1. A method for improving a flexible tube member, comprising
   (a) providing a predetermined body having an internal passageway and a tube receiving portion;
   (b) providing a flexible tube member having a connection portion made with an elastic thermoplastic material arranged to experience coupling with said receiving portion with a predetermined mechanical bond, said connecting portion is arranged to experience expansion and retraction during said coupling and form a water tight seal around said receiving portion when said coupling has occurred said flexible tube member having a tube member internal passageway;
   (c) connecting at least one stiffer to said connection portion, said stiffer member being made with a predetermined harder thermoplastic material that is relatively harder than said elastic thermoplastic material, at least one portion of said stiffer member being arranged to extend around a predetermined portion of the circumference of said tube member in a radial direction so as to form at least one gap in said stiffer member along said circumference, said connection member having at least one complementary circumference portion that is made with said elastic thermoplastic material and is arranged to fill said gap, said stiffer member and said flexible tube member forming a reinforced tube member; and
   (d) providing a U-shaped mouthpiece having a mouthpiece internal passageway, said U-shaped mouthpiece being connected to said reinforced tube member wherein said mouthpiece internal passageway is arranged to be in fluid communication with said tube member internal passageway and said internal passageway.

2. The method of claim 1 wherein said stiffer member is arranged to improve said mechanical bond.

3. The method of claim 1 wherein said stiffer member has stiffer member inward and outward surface portions and said elastic thermoplastic material is arranged to form at least one lamination bond one at least one of said stiffer member inward and outward surface portions.

4. The method of claim 1 wherein said stiffer member is substantially C-shaped in said radial direction.

5. The method of claim 1 wherein said elastic thermoplastic material is connected to said harder thermoplastic member with a thermal-chemical bond created during at least one phase of an injection molding process.

6. The method of claim 1 wherein said receiving portion has a forward receiving portion end near said predetermined body and a rearward receiving portion end that is spaced from said predetermined body and said forward receiving portion end, said receiving portion having a predetermined receiving portion length between said forward receiving portion and said rearward receiving portion end, said connection portion having a forward connection portion end and a rearward connection portion end with a predetermined connection portion length extending between said forward connection portion end said rearward connection portion end, said predetermined connection portion length being arranged to coaxially overlap said predetermined receiving portion length during said coupling so that said forward connection portion end is adjacent said forward receiving portion end and said rearward connection portion end is adjacent said rearward receiving portion end when said coupling has occurred so as to create a coaxial overlapping mechanical bond, at least one portion of said stiffer member being connected to said connection portion in an area that extends significantly forward of said rearward connection portion end in an amount sufficient to reinforce said coaxial overlapping mechanical bond.

7. The method of claim 1 wherein said flexible tube member comprises a connecting portion of a predetermined diving mouthpiece.

8. The method of claim 1 wherein, said U-shaped member having a U-shaped member forward portion proximate said internal passageway and two rearward distal ends wherein bite tab members are connected to the inside portion of said U-shaped member proximate said distal ends, said bite tab members having a rearward bite tab portion proximate distal ends and a forward bite tab portion that is spaced from said rearward bite tab portion and said distal ends wherein said bite tab members have a predetermined bite tab longitudinal dimension between said forward bite tab portion and said rearward bite tab portion, said diving mouthpiece having a harder member made with a relatively harder thermoplastic material that is relatively harder than said elastic material, said harder member having a harder member forward portion that is near said U-shaped member forward portion proximate said internal passageway and two rearward harder member distal ends that have a predetermined harder member longitudinal dimension between said harder member forward portion and said harder member rearward distal ends wherein said predetermined harder member longitudinal dimension extends a significant distance behind said forward bite tab portion and extends along a significant portion of said predetermined bite tab longitudinal dimension, said U-shaped member and said bite tab members forming a mouthpiece region and at least one portion of said mouthpiece region is made with a relatively softer thermoplastic material that is relatively softer than said relatively harder thermoplastic material of said harder member, said relatively softer thermoplastic material being connected to said relatively harder thermoplastic material with a thermal-chemical bond created during at least one phase of an injection molding process.

9. A method for improving a mouthpiece member, comprising the steps of:
(a) providing a mouthpiece member having a connection member arranged to connect said mouthpiece to a predetermined body, said connection member being a substantially tubular member having an internal passageway arranged to deliver breathable gas from said predetermined body to said mouthpiece;
(b) providing a U-shaped member, said U-shaped member having a U-shaped member forward portion proximate said internal passageway and two rearward distal ends wherein bite tab members are connected to the inside portion of said U-shaped member proximate said distal ends, said U-shaped member having U-shaped member vertical surface portions that extend vertically away from said bite tab members to form U-shaped member outer surface portions and U-shaped member inward facing surface portions, said U-shaped member vertical surface portions having a U-shaped member vertical portion upper end and a U-shaped member vertical portion lower end, said U-shaped member having a predetermined U-shaped member vertical height between said U-shaped member vertical portion upper end and said U-shaped member vertical portion lower end for a given position along said U-shaped member, said bite tab members having a rearward bite tab portion proximate distal ends and a forward bite tab portion that is spaced from said rearward bite tab portion and said distal ends, said bite tab members having a predetermined bite tab longitudinal dimension between said forward bite tab portion and said rearward bite tab portion;
(c) providing said U-shaped member with a relatively harder member made with a relatively hard thermoplastic material during at least one phase of an injection molding process, said harder member having a harder member forward portion that is near said U-shaped member forward portion proximate said internal passageway and two rearward harder member distal ends that have a predetermined harder member longitudinal dimension between said harder member forward portion and said harder member rearward distal ends, said predetermined harder member longitudinal dimension extending a significant distance behind said forward bite tab portion and extending along a significant portion of said predetermined bite tab longitudinal dimension, said harder member having a predetermined harder member planar shaped vertical portion that extends in a vertical direction along a significant portion of said predetermined U-shaped member vertical height, said harder member planar shaped vertical portion having a harder member upper end and a harder member lower end, said harder member having a predetermined harder member vertical height between said harder member upper end and said harder member lower end for a given position along said harder member, said harder member upper and being spaced a predetermined upper end vertical distance from said U-shaped member vertical portion upper end so as form a U-shaped member upper end complementary portion that lacks said harder member, and said harder member lower end being spaced a predetermined distance from said U-shaped member vertical portion lower end so as to form a U-shaped Member lower end complementary portion that lacks said harder member, said harder member occupying a partial portion of the circumference of said tubular member adjacent forward portion;

(d) placing said harder member into a subsequent enclosed mold configuration that is arranged to contact a plurality of predetermined surface portions of said harder portion in an amount effective to substantially prevent a significant portion of said harder member from shifting excessively within said subsequent enclosed mold configuration during a subsequent phase of said injection molding process; and (e) injection molding a relatively softer thermoplastic material onto said harder member with a thermal-chemical bond created during said subsequent phase of said injection molding process so as to form a softer U-shaped member portion that fills said U-shaped member upper end complementary portion and said U-shaped member lower end complimentary portion, said softer U-shaped member portion being arranged to contact the user's soft tissue gum region within the user's mouth.

10. The method of claim 9 wherein said harder member is arranged to be sufficiently stiff enough to reduce the tendency for said U-shaped member to deflect around a transverse axis within a user's mouth under loading threes created during use.

11. The method of claim 9 wherein at least one portion of said softer U-shaped member portion is arranged to vertically overlap with at least one region of said predetermined harder member planar shaped vertical portion so as to form at least one vertically oriented lamination bond having sufficient surface area to significantly increase the strength of said thermal-chemical bond.

12. The method of claim 9 wherein softer U-shaped member portion is arranged to be sufficiently flexible to provide significantly improved comfort against the soft tissue gum region within the user's mouth.

13. The method of claim 9 wherein at least one portion of said harder member is connected to a significant portion of said connection member.

14. The method of claim 9 wherein at least one portion of said harder member extends within a significant portion of said bite tab members, at least one portion of said harder member forms a harder portion bite tab member having harder portion bite tab member upper and lower surfaces, and said softer thermoplastic material is molded onto said harder portion bite tab member upper and lower surfaces in an amount effective to provide significant cushioning for the teeth of the user.

15. The method of claim 14 wherein at least one portion of said harder member forms a harder portion bite tab member having harder portion bite tab member upper and lower surfaces, and said softer thermoplastic material is molded onto said harder portion bite tab member upper and lower surfaces in an amount effective to provide cushioning for the teeth of the user, at least one exposed portion of said harder portion bite tab member upper and lower surfaces is exposed without being covered by said softer thermoplastic material so that the mold used to inject said softer thermoplastic material is arranged to vertically clamp said at least one exposed portion so as to prevent said harder member from shifting excessively within said mold during said subsequent phase of said injection molding.

16. The method of claim 9 wherein said bite tab members have an inward directed bite tab ends and have predetermined substantially vertical bite tab members connected to said bite tab members proximate said inward directed bite tab ends, said bite tab members having predetermined upper and lower bite tab surface portions and said predetermined substantially vertical bite tab members extending vertically from at least one portion of at least one of said predetermined upper and lower bite tab surface portions, at least one portion of said harder member being connected to at least one region of said predetermined substantially vertical bite tab members.

17. The method of claim 9 wherein an outer visible portion of said harder member is arranged to be exposed and visible along a significant portion of said U-shaped member outer surface portion with said softer U-shaped portion being visible above and below said at least one outer visible portion of said harder member.

18. The method of claim 17 wherein at least one portion of said outer visible portion of said harder member is arranged to have upper and lower visible portion surfaces that are arranged to permit said subsequent mold configuration to clamp verbally down on said upper and lower visible portion surfaces in an amount effect to prevent said harder member from shifting vertically within said subsequent mold configuration during said subsequent phase of said injection molding process in which said softer thermoplastic material is injected onto predetermined bonding regions of said harder member.

19. A method for making a tube member, comprising:

(a) providing a tube member made with a flexible thermoplastic material that is arranged to create at least one significantly flexible wall portion along said tube member, said tube member having two distal ends and a predetermined longitudinal length between said distal ends;

(b) connecting at least one stiffer member to said tube member, said stiffer member being made with a harder thermoplastic material that is relatively harder than said flexible thermoplastic material, at least one portion of said stiffer member being arranged to extend partially along at least one predetermined radial portion of the circumference of said tube member in a radial direction that is perpendicular to said predetermined longitudinal length of said tube member so as to form a partial radial reinforced region, said flexible wall portion having at least one complementary circumference portion in said radial direction that is not covered by said partial radial reinforced region, said flexible thermoplastic material being connected to said relatively harder thermoplastic material with a thermal-chemical bond created during at least one phase of an injection molding process said stiffer member and said tube forming a reinforced tube member; and (c) providing a diving mouthpiece member having a mouthpiece member internal passageway, said diving mouthpiece member having a predetermined connection with said reinforced tube member wherein said mouthpiece member internal passageway is arranged to be in fluid communication with said tube member internal passageway.

20. The method of claim 19 wherein at least one surface portion of said stiffer member is arranged to overlap with at least one portion of said flexible wall portion so as to form at least one lamination bond that is sufficient to significantly increase the strength of said thermal-chemical bond.

21. The method of claim 19 wherein said tube member comprises a connecting portion of a predetermined member selected from the group consisting of said diving mouthpiece member, a snorkel flexible tube used for a snorkel, and a scuba diving buoyancy control inflator hose.

22. The method of claim 19 wherein said tube member comprises a connecting portion of said predetermined diving mouthpiece.

23. The method of claim 19 wherein said tube member comprises a connecting portion of said predetermined diving mouthpiece member, said diving mouthpiece member having a U-shaped member, said U-shaped member having a U-shaped member forward portion proximate said internal passageway and two rearward distal ends wherein bite tab members are connected to the inside portion of said U-shaped member proximate said distal ends, said bite tab members having a rearward bite tab portion proximate distal ends and a forward bite tab portion that is spaced from said rearward bite tab portion and said distal ends wherein said bite tab members have a predetermined bite tab longitudinal dimension between said forward bite tab portion and said rearward bite tab portion, said diving mouthpiece having a harder member made with a relatively harder thermoplastic material that is relatively harder than said elastic material, said harder member having a harder member forward portion that is near said U-shaped member forward portion proximate said internal passageway and two rearward harder member distal ends that have a predetermined harder member longitudinal dimension between said harder member forward portion and said harder member rearward distal ends wherein said predetermined harder member longitudinal dimension extends a significant distance behind said forward bite tab portion and extends along a significant portion of said predetermined bite tab longitudinal dimension, said U-shaped member and said bite tab members forming a mouthpiece region and at least one portion of said mouthpiece region is made with a relatively softer thermoplastic material that is relatively softer than said relatively harder thermoplastic material of said harder member, said relatively softer thermoplastic material being connected to said relatively harder thermoplastic material with a thermal-chemical bond created during at least one phase of an injection molding process.

24. A method for making an improved flexible tube, comprising:
(a) providing a first enclosed cavity mold for injection molding a plurality of axially spaced apart annular stiffening members made with a relatively stiff thermoplastic material, said first enclosed cavity mold being arranged to have first mold upper half portion and first mold lower half portion for molding annular stiffening member outer surface portions of said annular stiffening members, said first mold having a substantially cylindrical first mold internal core for molding annular stiffening member inner surface portions of said annular stiffening members, said first mold being arranged to create predetermined annular member radial thicknesses between said annular member outer surface portions and said annular member inner surface portions and being arranged to form a plurality of predetermined vertical surface annular member portions that extend in a substantially radial direction along a predetermined portion of said annular stiffening members;
(b) injection molding said plurality of axially spaced apart annular stiffening members within said first mold during a relative first phase of an injection molding process that is arranged to occur prior to a subsequent phase of said injection molding process;
(c) providing at least one subsequent enclosed cavity mold for molding a flexible tube member having connection end portions that have at least one predetermined connection and contour which is arranged to connect to a predetermined body, said flexible tube member having at least one predetermined intermediate region contour that is arranged to be different from said at least one predetermined connection end contour, said subsequent enclosed cavity mold being arranged to have a subsequent mold upper half portion and a subsequent mold lower half portion for forming flexible tube member outer surface portions, said subsequent mold having a substantially cylindrical subsequent mold internal core for forming flexible tube member inner surface portions, said subsequent mold being separate from said flexible tube member wherein said flexible tube member is arranged to be removed from said subsequent mold after the step of forming said flexible tube member;
(d) arranging said subsequent mold to permit retaining said plurality of axially spaced apart annular stiffening members in a predetermined axially spaced apart configuration within said subsequent mold prior to and during said subsequent phase of said injection molding process, said subsequent mold upper half portion and said subsequent mold lower half portion each being arranged to have subsequent mold annular member outer surface contacting regions that vertically clamp down on said annular member outer surface portions so as to substantially prevent said annular stiffening members from shifting in a substantially radial direction within said subsequent mold, said subsequent mold having predetermined substantially vertical subsequent mold surface portions that have predetermined annular member vertical surface contacting regions that are arranged to sufficiently mate with said plurality of substantially vertical surface annular member portions so as to substantially prevent said annular stiffening members from shifting in a substantially axial direction in said subsequent mold prior to and during said subsequent phase of said injection molding, said subsequent mold having substantially axially spaced apart annular gaps within said subsequent mold in the areas between said plurality of axially spaced apart annular stiffening members prior to said subsequent phase of said injection molding;
(e) arranging said substantially cylindrical subsequent mold internal core to be spaced a predetermined radial distance from at least one region of said annular member inner surface portions so as to form a predetermined radially spaced inner surface gap between said annular member inner surface portions and said substantially cylindrical subsequent mold internal core;
(f) injection molding a relatively flexible thermoplastic material onto predetermined bonding surfaces of said plurality of axially spaced apart annular stiffening members wherein said flexible thermoplastic material is connected to said relatively stiff thermoplastic material along said predetermined bonding surfaces with a thermal-chemical bond created within said subsequent mold during said subsequent phase of said injection molding process, said flexible thermoplastic material being arranged to fill said substantially axially spaced apart annular gaps in said subsequent mold so as to form a plurality of complimentary axially spaced apart flexible wall portions in between said plurality of axially spaced apart annular stiffening members, said flexible thermoplastic material being arranged to simultaneously fill said predetermined radially spaced inner surface gap between said annular member inner surface portions and said substantially cylindrical subsequent mold internal core so as to form a complimentary flexible tube member inner surface portion that is occupied by said flexible thermoplastic material, said complimentary flexible tube member inner surface portion and said plurality of complimentary axially spaced apart flexible wall portions being arranged to be molded integrally together in an amount sufficient to significantly increase the surface area and strength of said thermal-chemical bond so as to substantially prevent delamination during use along said predetermined bonding surfaces between said plurality of axially spaced apart annular stiffening members, said complimentary flexible tube member inner surface portion and said plurality of complimentary axially spaced apart at least one of said annular stiffening members extending around a partial portion of the radial circumference of said flexible tube member;

(g) arranging said subsequent mold annular member outer surface contacting regions to block the flow of said flexible thermoplastic material during said subsequent phase of said injection molding process in an amount effective to cause a significant portion of said annular member outer surface portions to be visible along said flexible tube member outer surface portions when said flexible tube member is removed from said subsequent mold, said flexible tube member having a tube member internal passageway, said flexible tube member and said annular stiffening members forming a reinforced tube member; and (h) providing a diving mouthpiece member having a mouthpiece member internal passageway, said diving mouthpiece member having a predetermined connection with said reinforced tube member wherein said mouthpiece member internal passageway is arranged to be in fluid communication with said tube member internal passageway.

25. The method of claim 24 wherein said complimentary flexible tube inner surface portion is arranged to form a complimentary inner surface connection region between adjacent regions of said complimentary axially spaced apart flexible wall portions.

26. The method of claim 24 wherein said annular stiffening members are connected to said plurality or complimentary axially spaced apart flexible wall portions with a plurality of edge to edge bonds, and said complimentary flexible tube member inner surface portion is arranged to form a lamination bond with said annular stiffening members that is sufficient to significantly reduce stress on said edge to edge bonds.

27. The method of claim 26 wherein said edge to edge bonds further include at least one mechanical bonding member.

28. The method of claim 26 wherein said at least one mechanical bonding member includes substantially axially directed surface portion arranged to form at least one axially directed lamination bond during said subsequent phase of said injection molding process.

29. The method of claim 24 wherein said injection molded connection end portions are formed simultaneously with said injection molding of said plurality of complimentary axially spaced apart flexible wall portions and said complimentary flexible tube member inner surface portion during the same said subsequent phase of said injection molding process with the same said subsequent mold.

30. The method of claim 24 further providing at least one axially directed bridge member made of said relatively harder thermoplastic material that is arranged to provide a predetermined connection between said plurality of axially spaced apart annular stiffening members during said first phase of said injection molding process, said axially directed bridge member being molded integrally with said plurality of axially spaced apart annular stiffening members to form a predetermined interconnected first phase assembly, said predetermined interconnected first phase assembly being arranged to substantially maintain the respective positions of said plurality of axially spaced apart annular stiffening members relative to one another when said first phase assembly is removed from said first mold and inserted into said subsequent mold.

31. The method of claim 30 wherein said axially directed harder portion bridge member is laterally spaced from said flexible tube outer surface portion and is substantially parallel to said axially spaced apart annular stiffening members, said harder portion bridge member being connected to said axially spaced apart annular stiffening members with a plurality of predetermined radially directed connection members that are part of said interconnected first phase assembly, said flexible tube member being formed in said subsequent mold during said subsequent phase with said harder portion bridge and said predetermined radially directed connection members being substantially radially spaced from said flexible tube member outer surface portion, and further including the step of removing said harder portion bridge and said predetermined radially directed connection members so that the finished condition of said flexible tube member is substantially without said harder portion bridge and said predetermined axially directed connection members.

32. The method of claim 24 wherein said plurality of axially spaced apart annular stiffening members are substantially independent ring-shaped annular stiffening members that have an annular alignment that is perpendicular to the axial alignment of said flexible tube member.

33. The method of claim 24 wherein said annular member inner surface portions are arranged to have a plurality of spaced apart standoff members that are made with said harder thermoplastic material during said relative first phase of said injection molding process and extend in an inward radial direction from said annular member inner surface portions across said predetermined radially spaced inner surface gap and contact said substantially cylindrical subsequent mold internal core in an amount effective to significantly prevent said annular stiffening members from shifting within said subsequent mold during said subsequent phase of said injection molding process.

34. The method of claim 33 wherein said plurality of axially spaced apart annular stiffening members comprise a helical stiffening member.

35. The method of claim 34 wherein said helical stiffening member has a predetermined cross sectional shape that has lateral side portions which extend vertically above the outer surface of said complimentary axially spaced apart flexible wall portions, said lateral side portions being arranged to be oriented at a predetermined inwardly angled alignment from the radial alignment of said flexible tube member, said predetermined inwardly angled alignment being sufficient to prevent an undercut within said subsequent mold upper and lower surfaces so as to permit significantly efficient demolding of said flexible tube member from said subsequent mold so that helical path of said lateral side portions does not become caught within mating cavities within said subsequent mold.

36. The method of claim 34 said helical stiffening member terminates at two opposing ends, said two opposing ends having a radial loop member that has a radial alignment that is perpendicular to the axial alignment of said flexible tube member, said radial loop being arranged to distribute the load created on said helical member over an increased circumference region of said connection end portions of said flexible tube member.

* * * * *